United States Patent

Tanabe et al.

[11] Patent Number: 6,000,931
[45] Date of Patent: Dec. 14, 1999

[54] GAS SAFETY CONTROL SYSTEM

[75] Inventors: Minoru Tanabe, Nara; Kunihiko Yamashita, Ikoma; Toshihiko Yasui, Nara; Shirou Honma, Osaka, all of Japan

[73] Assignee: Matsushita Electric Industrial Co., Ltd., Osaka, Japan

[21] Appl. No.: 08/952,480

[22] PCT Filed: May 17, 1996

[86] PCT No.: PCT/JP96/01305

§ 371 Date: Jan. 29, 1998

§ 102(e) Date: Jan. 29, 1998

[87] PCT Pub. No.: WO96/36853

PCT Pub. Date: Nov. 21, 1996

[30] Foreign Application Priority Data

May 19, 1995 [JP] Japan .................................. 7-120972
Jul. 31, 1995 [JP] Japan .................................. 7-194558

[51] Int. Cl.⁶ .................................................. F23N 5/24
[52] U.S. Cl. .............................. 431/22; 136/460; 431/89
[58] Field of Search ............................. 137/458, 459, 137/460; 431/89, 22; 48/192

[56] References Cited

U.S. PATENT DOCUMENTS

| 4,881,948 | 11/1989 | Nakane et al. | 137/460 |
| 4,928,728 | 5/1990 | Nakane et al. | 137/460 |

FOREIGN PATENT DOCUMENTS

| 60-189756 | 12/1985 | Japan . |
| 61-239762 | 10/1986 | Japan . |
| 63-12292 | 1/1988 | Japan . |
| 63-156924 | 6/1988 | Japan . |
| 63-172098 | 7/1988 | Japan . |
| 02047522 | 2/1990 | Japan . |
| 02105300 | 4/1990 | Japan . |
| 02282896 | 11/1990 | Japan . |
| 04169833 | 6/1992 | Japan . |
| 4-100652 | 8/1992 | Japan . |
| 04308999 | 10/1992 | Japan . |
| 05020568 | 1/1993 | Japan . |
| 05290288 | 11/1993 | Japan . |
| 06002785 | 1/1994 | Japan . |
| 06011072 | 1/1994 | Japan . |
| 06018027 | 1/1994 | Japan . |
| 06152774 | 5/1994 | Japan . |
| 07035593 | 2/1995 | Japan . |
| 07083723 | 3/1995 | Japan . |

Primary Examiner—Carroll B. Dority
Attorney, Agent, or Firm—Wenderoth, Lind & Ponack, L.L.P.

[57] ABSTRACT

The present invention relates to a gas safety control system for supplying a gas that is forwarded from a gas supply source through an inspection meter to one or more gas appliances. The inspection meter comprises a cutoff valve for cutting off supply of the gas from the gas supply source, a detection unit for detecting such abnormal condition as gas leakage and abnormal flow rate of the gas, a valve control unit for actuating the cutoff valve when the detection unit detects an abnormality and a meter communication unit for outputting cutoff information indicating that the supply of gas is cut off by the cutoff valve. The gas appliance comprises an appliance communication unit for communicating with the meter communication unit and a combustion disabling unit for switching the gas appliance to a combustion disabled state, if it is in a combustion enabled state, when the cutoff information is received through the appliance communication unit. In the gas safety control system constituted in such manner, because the supply of gas and operation of the gas appliance are automatically discontinued when such abnormality as gas leakage is detected, gas explosion, gas poisoning and like accidents can be prevented.

39 Claims, 38 Drawing Sheets

GAS SAFETY CONTROL SYSTEM

TECHNICAL FIELD OF THE INVENTION

The present invention relates to a gas safety control system comprising an inspection meter which is connected with such gas supply source as city gas supply source and gas tank and one or more gas appliances receiving supply of the gas through the inspection meter, particularly a gas safety control system capable of automatically cutting off supply of the gas and disabling operation of gas appliances, when such abnormal condition as gas leakage is detected, for preventing gas explosion, gas poisoning and other accidents.

BACKGROUND OF THE INVENTION

A conventional gas control system is shown in FIG. 36. In the gas control system, an inspection meter 50 incorporating a microcomputer is provided with a valve 52. The valve 52 is connected at an inlet 54 thereof with a city gas supply source or a gas tank through a gas supply pipe 56, and at an outlet 58 thereof with such gas appliance 62 as hot water supply system through a gas distribution pipe 60, so that a gas forwarded from a gas supply source is supplied through the valve 52 to the gas appliance 62. The inspection meter 50 is also provided with a control unit (not shown) for cutting off supply of the gas by closing the valve 52 when such abnormal condition as gas leakage and abnormal pressure or flow rate of the gas is detected and a reset button (not shown) for returning the valve in a closed position to an open position. On the other hand, the gas appliance 62 is connected with a remote controller 64, and can be controlled by means of a command from the remote controller 64.

Another conventional gas control system is shown in FIG. 37. The gas control system comprises a terminal network controller 70 for communicating with a remote control center 68 through such communication medium 66 as telephone line, and an inspection meter 50 and a gas appliance 62 are connected with the terminal network controller 70 by communication media 72, 74, respectively, so that information obtained from the inspection meter 50, that is, information on a consumption of gas and information of abnormality in the gas appliance can be communicated to the remote control center 68.

However, any of the gas control systems is not constituted in such manner that the inspection meter and gas appliance are controlled according to information from one another, and the gas appliance is maintained in a combustion enabled state even after the valve is closed due to such abnormal condition as abnormal flow rate of the gas. Thus, it has been hard to say that a sufficient level of safety can be assured in such gas safety control systems. In addition, when the valve is closed, since no gas is supplied to the gas appliance, an abnormal condition (error) is caused, which is regarded as abnormality in the gas appliance even though no abnormality is present in the gas appliance, and it has been required to turn on the power again in order to restore operation of the appliance. It has also been a problem that an operating state of the gas appliances as well as that of the inspection meter cannot be easily known.

OBJECT OF THE INVENTION

The invention contemplates solving such problems of the prior art, and it is an object of the invention to provide a gas safety control system offering superior safety and operativity, and arranged in such manner that operation of a gas appliance connected with an inspection meter is disabled, when such abnormal condition is detected as a consumption of gas exceeding an amount that is considered to be consumed in a normal condition (that is, abnormal flow rate and leakage of gas), in response to the information detected.

In order to achieve the object, a gas safety control system for supplying a gas that is forwarded from a gas supply source through an inspection meter to one or more gas appliances is characterized in that:

(a) the inspection meter is provided with
   valve means for cutting off supply of the gas from the gas supply source;
   detection means for detecting an abnormality;
   valve control means for actuating the valve means when the detection means detects an abnormality; and
   meter communication means, and
(b) the gas appliance is provided with
   appliance communication means; and
   disabling means for switching the gas appliance to a combustion disabled state, if the appliance is in a combustion enabled state, when cutoff information is directly or indirectly received through the appliance communication means.

According to the gas safety control system, when the gas flowing through the inspection meter and the like exceeds a predetermined amount, or such abnormality as gas leakage is detected, since supply of the gas is cut off by the valve means in the inspection meter, and the gas appliance is switched to a combustion disabled state by cutting off supply of the gas to the appliance, a higher level of safety can be provided in the event of an abnormal condition. In addition, even when supply of the gas is restored after the abnormal condition is removed, no leakage of gas can be caused from the gas appliance.

A gas safety control system according to a second mode of the invention is characterized in that:

(a) an inspection meter is provided with
   valve means for cutting off supply of a gas from a gas supply source;
   detection means for detecting an abnormality;
   valve control means for actuating the valve means when the detection means detects an abnormality; and
   meter communication means,
(b) a gas appliance is provided with appliance communication means for directly or indirectly communicating with the meter communication means, and
(c) the gas safety control system further comprises a controller, which is provided with controller communication means for communicating with the meter communication means or appliance communication means and display means for displaying information that is inputted to the controller communication means.

According to the gas safety control system, a higher level of safety is provided in the event of such abnormality as gas leakage, and the system is more conveniently operated, because an operating state of the inspection meter and gas appliance can be checked through the display means in the controller.

A gas safety control system according to a third mode of the invention is characterized in that:

(a) an inspection meter is provided with
   valve means for cutting off supply of a gas from a gas supply source;
   detection means for detecting an abnormality;

valve control means for actuating the valve means when the detection means detects an abnormality; and meter communication means, (b) a gas appliance is provided with appliance communication means for communicating with the other apparatus; and disabling means for switching the gas appliance to a combustion disabled state, if the appliance is in a combustion enabled state, when cutoff information is received through the appliance communication means, and (c) the safety control system further comprises a relay unit, which provides connection between the meter communication means and appliance communication means for allowing communication between them.

According to the gas safety control system, a higher level of safety is provided in the event of such abnormality as gas leakage, and the system can be given an extendibility, because communication can be achieved between an inspection meter and a gas appliance using different communication modes.

A gas safety control system according to a fourth mode of the invention is characterized in that:

(a) an inspection meter is provided with valve means for cutting off supply of a gas from a gas supply source;

inspection means for inspecting an amount of the gas that passes through the valve means;

detection means for detecting an abnormality;

valve control means for actuating the valve means when the detection means detects an abnormality; and meter communication means, (b) a gas appliance is provided with appliance communication means for communicating with the other apparatus; and disabling means for switching the gas appliance to a combustion disabled state, if the appliance is in a combustion enabled state, when a cutoff signal is received through the appliance communication means, and (c) the gas safety control system further comprises a terminal network controller for communicating with so-called remote control center that is equipped with a communication system connected through a communication medium, said terminal network controller providing connection between the meter communication means and appliance communication means for allowing communication between them.

In the gas safety control system, a higher level of safety is provided in the event of such abnormal condition as gas leakage, and the system is given an extendibility, since communication can be achieved even when an inspection meter and a gas appliance using different communication modes are connected with each other through the terminal network controller. In addition, the valve means in the inspection meter and combustion disabling means in the gas appliance can be operated in response to a command from the remote control center. A reading of the inspection means can be also communicated to the remote control center in response to a read command from the remote control center.

A gas safety control system according to a fifth mode of the invention is characterized in that:

(a) an inspection meter is provided with valve means for cutting off supply of a gas from a gas supply source;

inspection means for inspecting an amount of the gas that passes through the valve means;

detection means for detecting an abnormality;

valve control means for actuating the valve means when the detection means detects an abnormality; and meter communication means for communicating with the other apparatus, (b) a gas appliance is provided with appliance communication means for communicating with the other apparatus; and combustion disabling means for switching the gas appliance to a combustion disabled state, if the appliance is in a combustion enabled state, when a cutoff signal is received through the appliance communication means, (c) the safety system also comprises a relay unit, which provides connection between the meter communication means and appliance communication means for allowing communication between them, and (d) the safety system further comprises a terminal network controller for communicating with a remote control center, said terminal network controller providing connection between the remote control center and the relay unit for allowing communication between them.

In the gas safety control system, a higher level of safety is provided in the event of such abnormal condition as gas leakage, and the system is given an extendibility, because communication can be achieved even when an inspection meter and a gas appliance using different communication modes are connected with each other through the relay unit. In addition, the valve means in the inspection meter and combustion disabling means in the gas appliance can be operated in response to a command from the remote control center. A reading of the inspection means can be also communicated to the remote control center in response to a read command from the remote control center.

A gas safety control system according to a sixth mode of the invention is characterized in that:

(a) an inspection meter is provided with valve means for cutting off supply of a gas from a gas supply source;

inspection means for inspecting an amount of the gas that passes through the valve means;

detection means for detecting an abnormality;

valve control means for actuating the valve means when the detection means detects an abnormality; and meter communication means for communicating with the other apparatus, (b) a gas appliance is provided with appliance communication means for communicating with the meter communication means; and combustion disabling means for switching the gas appliance to a combustion disabled state, if the appliance is in a combustion enabled state, when cutoff information is received through the appliance communication means, and (c) the safety control system further comprises a terminal network controller for communicating with a remote control center, said terminal network controller providing connection between the remote control center and the inspection meter for allowing communication between them.

In the gas safety control system, a higher level of safety is provided in the event of such abnormal condition as gas leakage, and the valve means in the inspection meter and combustion disabling means in the gas appliance can be operated in response to a command from the remote control center. A reading of the inspection means can also be communicated to the remote control center in response to a read command from the remote control center.

A gas safety control system according to a seventh mode of the invention is characterized in that:
(a) an inspection meter is provided with
  valve means for cutting off supply of a gas from a gas supply source;
  detection means for detecting an abnormality;
  valve control means for actuating the valve means when the detection means detects an abnormality; and
  meter communication means,
(b) a gas appliance is provided with appliance communication means for communicating with the other apparatus,
(c) the gas safety control system also comprises a relay unit, which provides connection between the meter communication means and appliance communication means for allowing communication between them, and
(d) the gas safety control system further comprises a controller, which is provided with controller communication means for communicating with the inspection meter, gas appliance or relay unit and display means for displaying information inputted to the controller communication means.

In the gas safety control system, a higher level of safety is provided in the event of such abnormal condition as gas leakage, and the system is given an extendibility, as communication can be achieved by the relay unit even when an inspection meter and a gas appliance using different communication modes are employed. In addition, because an operating state of the appliances can be checked by means of the controller, the system is more conveniently operated.

A gas safety control system according to an eighth mode of the invention is characterized in that:
(a) an inspection meter is provided with
  valve means for cutting off supply of a gas from a gas supply source;
  inspection means for inspecting an amount of the gas that passes through the valve means;
  detection means for detecting an abnormality;
  valve control means for actuating the valve means when the detection means detects an abnormality; and
  meter communication means for communicating with the other apparatus,
(b) a gas appliance is provided with appliance communication means for communicating with the other apparatus,
(c) the safety control system also comprises a terminal network controller for communicating with a remote control center, said terminal network controller providing connection between the meter communication means and appliance communication means for allowing communication between them, and
(d) the safety management further comprises a controller, which is provided with controller communication means for communicating with the inspection meter, gas appliance or terminal network controller and display means for displaying information inputted to the controller communication means.

In the gas safety control system, a higher level of safety is provided in the event of such abnormal condition as gas leakage, and the system is given an extendibility, because communication can be achieved even when an inspection meter and a gas appliance using different communication modes are connected with each other through the terminal network controller. In addition, the valve means in the inspection meter and combustion disabling means in the gas appliance can be operated in response to a command from the remote control center. A reading of the inspection means can also be communicated to the remote control center in response to a read command from the remote control center. Besides, an operating state of the inspection meter and gas appliance and a command from the remote control center can be displayed in the controller, the system is more conveniently operated.

A gas safety control system according to a ninth mode of the invention is characterized in that:
(a) an inspection meter is provided with
  valve means for cutting off supply of a gas from a gas supply source;
  inspection means for inspecting an amount of the gas that passes through the valve means;
  detection means for detecting an abnormality;
  valve control means for actuating the valve means when the detection means detects an abnormality; and
  meter communication means for communicating with the other apparatus,
(b) a gas appliance is provided with appliance communication means for communicating with the other apparatus,
(c) the gas safety control system also comprises a relay unit, which provides connection between the meter communication means and appliance communication means for allowing communication between them,
(d) the gas safety control system further comprises a terminal network controller for communicating with a remote control center, said terminal network controller providing connection between the remote control center and the relay unit for allowing communication between them, and
(e) the gas safety control system still further comprises a controller, which is provided with controller communication means for communicating with the inspection meter, gas appliance, relay unit and terminal network controller and display means for displaying information inputted to the controller communication means.

In the gas safety control system, a higher level of safety is provided in the event of such abnormal condition as gas leakage, and the system is given an extendibility, since communication can be achieved even when an inspection meter and a gas appliance using different communication modes are connected with each other through the relay unit. In addition, the valve means in the inspection meter and combustion disabling means in the gas appliance can be operated in response to a command from the remote control center. A reading of the inspection means can be also communicated to the remote control center in response to a read command from the remote control center. Besides, since an operating state of the inspection meter and gas appliance and a command from the remote control center can be displayed in the controller, the system is more conveniently operated.

A gas safety control system according to a tenth mode of the invention is characterized in that:
(a) an inspection meter is provided with
  valve means for cutting off supply of a gas from a gas supply source;

inspection means for inspecting an amount of the gas that passes through the valve means;

detection means for detecting an abnormality;

valve control means for actuating the valve means when the detection means detects an abnormality; and meter communication means for communicating with the other apparatus, (b) a gas appliance is provided with appliance communication means for communicating with the meter communication means, (c) the gas safety control system also comprises a terminal network controller for communicating with a remote control center, said terminal network controller providing connection between the remote control center and gas meter for allowing communication between them, and (d) the gas safety control system further comprises a controller, which is provided with controller communication means for communicating with the inspection meter, gas appliance or terminal network controller and display means for displaying information inputted to the controller communication means.

In the gas safety control system, a higher level of safety is provided in the event of such abnormal condition as gas leakage, and the valve means in the inspection meter and combustion disabling means in the gas appliance can be operated in response to a command from the remote control center. A reading of the measuring means can be also communicated to the remote control center in response to a read command from the remote control center. Further, the system is very conveniently operated, because an operating state of the inspection meter and gas appliance and a command from the remote control center can be displayed in the controller.

A gas safety control system according to an eleventh mode of the invention is characterized in that disabling means is adapted to be combustion disabling means for switching a gas appliance to an inoperative state, if the appliance is in an operative state, and valves in the inspection meter and gas appliance are closed in response to an abnormality signal.

A gas safety control system according to a twelfth mode of the invention is characterized in that a terminal network controller is provided with means for communicating to a remote control center information indicating that valve means in an inspection meter is closed. Thus, according to the gas safety control system, it can be recognized at the remote control center that gas leakage or the like is caused, and the valve means in the inspection meter is, therefore, closed.

A gas safety control system according to a thirteenth mode of the invention is characterized in that a gas appliance is provided with means for detecting presence of an abnormality in the gas appliance, and valve means in an inspection meter is adapted to be actuated in response to the detection of abnormality. Thus, in the gas safety control system, because the valve means in the inspection meter is closed in the event such abnormality as gas leakage is caused in the inspection meter as well as the gas appliance connected thereto, an even higher level of safety is provided.

A gas safety control system according to fourteenth mode of the invention is characterized in that a gas appliance is provided with means for detecting presence of an abnormality in the gas appliance, and valve control means in an inspection meter is adapted to be actuated in response to the detection of abnormality, while information on the abnormality detected is communicated from a terminal network controller through a communication medium. Thus, in the gas safety control system, when such abnormality as gas leakage is caused in the gas appliance, because the valve means in the inspection meter is closed, and information on an abnormality is further communicated to a remote control center, presence of the abnormality and closure of the valve means in the inspection meter can be recognized at the remote control center.

A gas safety control system according to a fifteenth mode of the invention comprises flow detection means for detecting an amount of gas that flows through an inspection meter, operation detection means for detecting whether the gas is consumed in a gas appliance or not, comparing means for comparing flow information from the flow detection means with detection information from the operation detection means and cutoff information transmitting means for generating and transmitting information that allows actuation of valve means, if it is determined by the comparing means that the gas is flowing even though no gas is consumed by any gas appliance. Thus, according to the gas safety control system, gas leakage is easily detected, and further leakage of gas can be avoided by closing the valve means in the inspection meter in the event of gas leakage.

A gas safety control system according to a sixteenth mode of the invention is arranged such that a gas appliance is switched to a combustion disabled state in response to a valve closing signal outputted from a remote control center. Thus, according to the gas safety control system, in the case such abnormality as gas leakage is communicated from the inspection meter to the remote control center, or a cutoff instruction is requested, because a gas appliance can be switched to a combustion disabled state by closing a cutoff valve in an inspection meter in response to a command from the remote control center, safety in the event of gas leakage or other abnormal conditions and avoidance of abnormal stop of a gas appliance can be further enhanced.

A gas safety control system according to a seventeenth mode of the invention is characterized in that delay means for closing valve means in an inspection meter a predetermined time after a gas appliance is switched to a combustion disabled state is added to a gas safety control system according to the sixteenth mode of the invention. Thus, according to the gas safety control system, when such abnormality as gas leakage is detected, since a gas appliance is first switched to an inoperative state, then the valve means in the inspection meter is closed, it is assured that such abnormal condition in the gas appliance as cutoff of gas supply is prevented, and a safety level of the system is further increased.

A gas safety control system according to an eighteenth mode of the invention comprises appliance valve position detecting means for determining whether a valve in a gas appliance is open or not and command means for outputting an open command that allows valve means in a closed position in an inspection meter to be opened, wherein valve control means allows the valve means to be opened in response to the open command outputted from the command means, when it is determined that the valve in the gas appliance is closed as a result of an output from the appliance valve position detecting means.

Thus, gas leakage from a gas appliance after the valve is restored can be prevented, and a safety level of the system is further increased.

A gas safety control system according to a nineteenth mode of the invention comprises means for indicating closure of valve means. According to the gas safety control system, because whether the valve means in an inspection meter is closed or not can be checked by means of a controller or the like, a user can readily find out why a particular gas appliance is inoperative.

A gas safety control system according to a twentieth mode of the invention comprises means for displaying a reading of measuring means. Thus, as the reading can be checked at a remote control center and by means of a controller or the like, the system can be more conveniently operated.

A gas safety control system according to a twenty-first mode of the invention comprises reading display means for displaying a reading of measuring means and reading display instruction means for instructing the reading display means to display the reading, wherein the reading is displayed by the reading display means in response to the instruction from the reading display instruction means. Thus, when the reading display means is provided in a controller or the like, because a reading can be checked by means of the controller, the system can be more conveniently operated.

A gas safety control system according to a twenty-second mode of the invention comprises calculation means for calculating an amount of gas consumed by the system after a specified point of time, indication means for indicating the amount calculated and instruction means for instructing the indication means to indicate the amount calculated. Thus, when the indication means is provided in a controller or the like, since a reading, that is, an amount of gas consumed for a preset period of time can be confirmed by means of the controller, a consumption and charges of the gas for each month can be readily checked.

A gas safety control system according to a twenty-third mode of the invention comprises predicting means for predicting closure of valve means in an inspection meter and alarm means for giving an alarm prior to the closure in response to the prediction from the predicting means. Thus, as closure of the valve means in the inspection meter is noticed by the alarm through a controller or the like, a user hearing the alarm can check presence or absence of an abnormality before the closure, and the system can be more conveniently operated.

A gas safety control system according to a twenty-fourth mode of the invention comprises display means for displaying a message that is received through a communication medium. Thus, gas charges, preliminary notice of public works and the like can be informed of from a remote control center to a consumer of the gas more reliably and swiftly than using such means as postal service.

A gas safety control system according to a twenty-fifth mode of the invention comprises valve reset means for resetting valve means in a closed position and valve reset instruction means for instructing to reset the valve means. Thus, by providing the reset means in a controller or the like, a resetting operation can be easily conducted indoors.

A gas safety control system according to a twenty-sixth mode of the invention comprises valve reset means for resetting valve means in a closed position and instruction means for instructing to reset the valve means by activation of a gas appliance. Thus, even if a valve in an inspection meter is closed, when a gas appliance is activated, it comes to be operative immediately, and more convenient operation is assured.

DESCRIPTION OF PREFERRED EMBODIMENTS OF THE INVENTION

Preferred embodiments of the invention are described below by referring to the accompanying drawings.

(1) Embodiment 1

Figure 1:
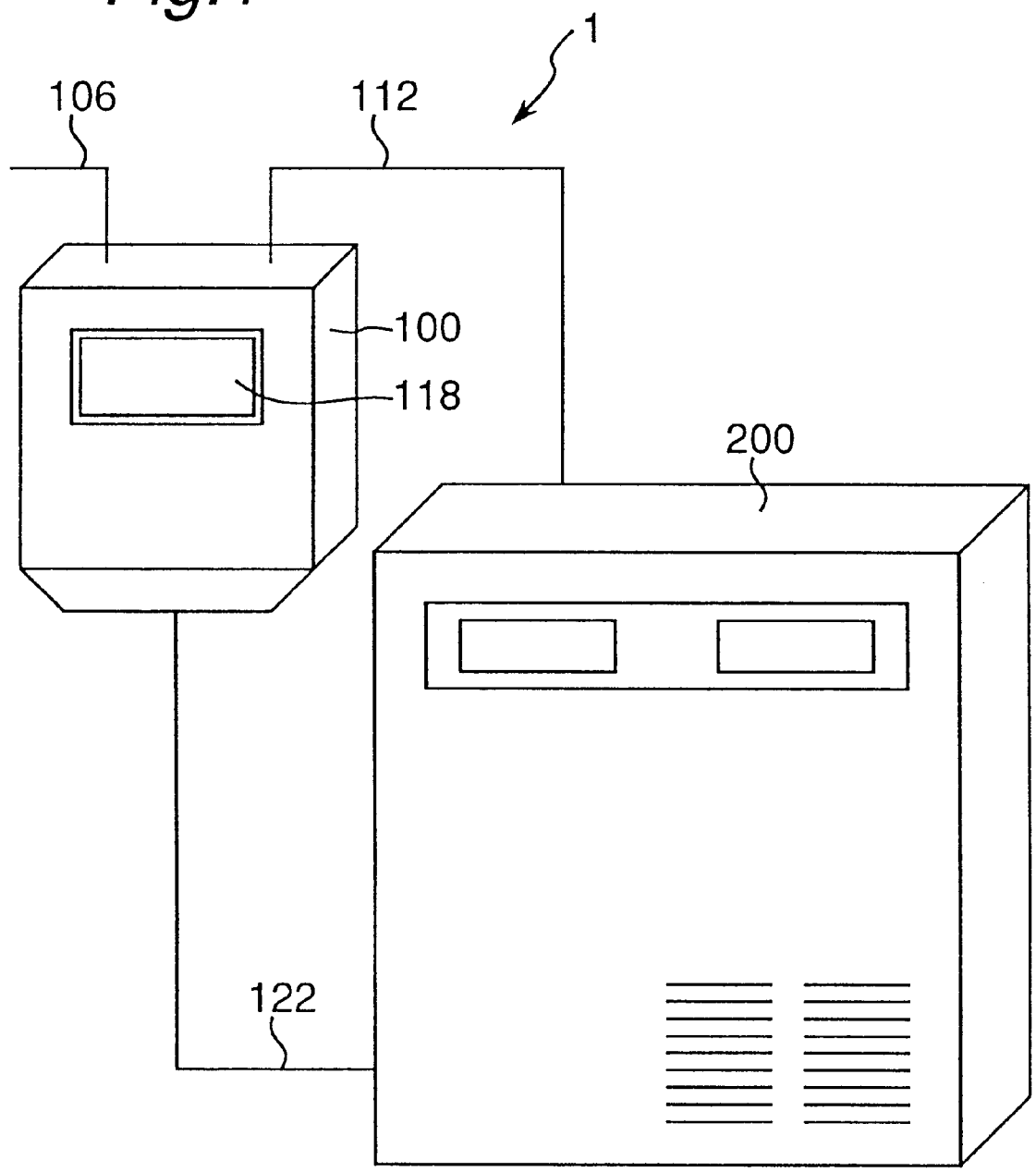
FIG. 1 is a perspective view of a gas safety control system according to a first embodiment of the invention.
Figure 2:
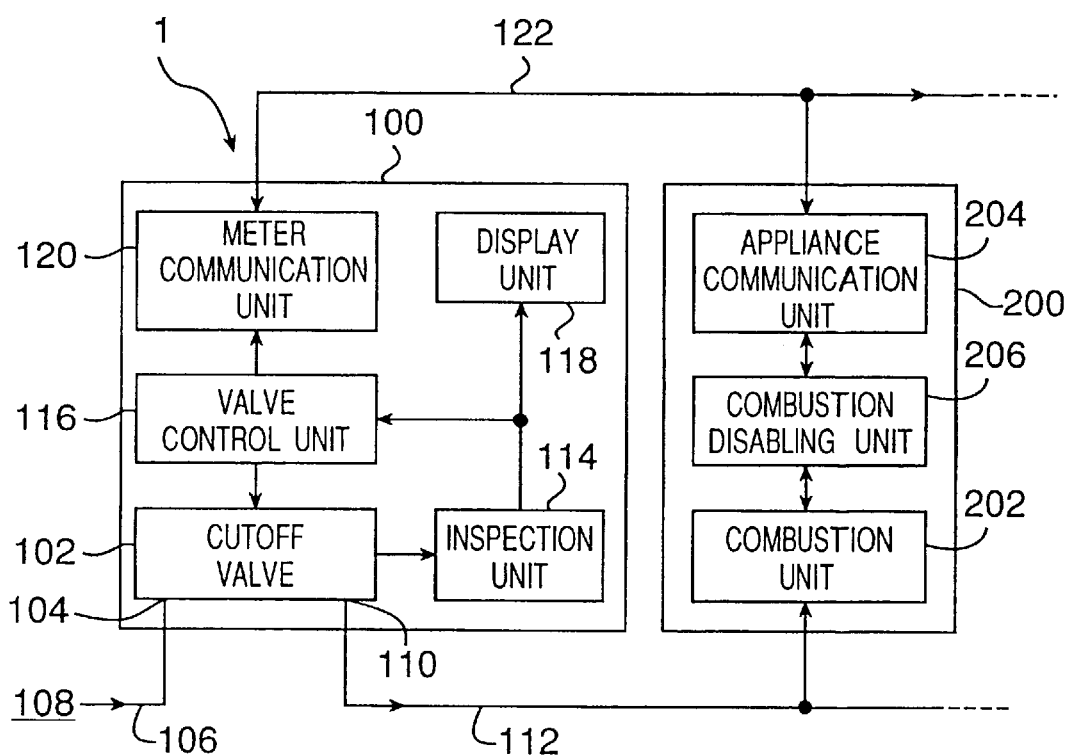
FIG. 2 is a block diagram of the gas safety control system shown in FIG. 1.

FIG. 1 is a perspective view of a gas safety control system according to Embodiment 1 of the invention, and FIG. 2 is a block diagram of the system, wherein the system according to the embodiment depicted as a whole by numeral 1 comprises a flow inspection meter 100 controlled in its entirety by a microcomputer (not shown). The inspection meter 100 is provided with a gas cutoff valve 102, an inlet 104 of which is connected with a gas supply source 108 through a gas supply pipe 106, while an outlet 110 of which is connected with a gas distribution pipe 112 for distributing a gas to one or more gas appliances (for example, gas-fired hot water supply system, gas range and gas-fired room heater). The gas supply source 108 may be a city gas supply pipe, gas tank or the like. The gas flowing into the system through the cutoff valve 102, supply pipe 106 or distribution pipe 112 is measured by an inspection unit 114 for a current flow rate and a total amount of flow (consumption) to date, and the value of current flow rate is applied to a valve control unit 116, while the value of total amount of flow is transmitted to and displayed by a display unit 118. The valve control unit 116 is adapted to compare the value of flow rate received from the inspection unit 114 with a predetermined limit flow rate, and close the cutoff valve 102 if the former is higher than the latter. Preferably, the limit flow rate should be a sum of maximum flow rates of gas consumed by the gas appliances to which the gas is delivered through the inspection meter 110 or said sum multiplied by a predetermined safety factor. The valve control unit also serves for detecting an abnormal minute flow rate of gas, and the inspection meter 100 with the cutoff valve 102 to be closed is further provided with a meter communication unit 120, so that information indicating closure of the cutoff valve 102 by the valve control unit 116 is transmitted to various gas appliances connected with the inspection meter 100 by means of a communication medium 122. As for the communication medium 122, any means known in the art may be employed as far as it is capable of transmitting the information from the inspection meter to the gas appliances, and it may be, for example, either an electrical wire, optical fiber cable or radio communication device. It should be appreciated that the communication medium includes various means already mentioned in other embodiments described below.

A gas appliance 200 is provided with a gas combustion unit 202 to which the gas is supplied through the gas distribution pipe 112. The gas appliance 200 is also provided with an appliance communication unit 204, which is connected with the communication unit 120 in the inspection meter 100 for communicating therewith through the communication medium 122, and the cutoff information regarding the cutoff valve 102 is applied to the appliance communication unit 204. The appliance communication unit 204 is connected with a combustion disabling unit 206, which is adapted to forcibly cut off supply of the gas to the combustion unit 202 by actuating a valve (not shown) that is incorporated in the combustion unit 202.

In the gas safety control system 1 of above constitution, the gas supplied from the gas supply source 108 through the gas supply pipe 106 is fed to the combustion unit 202 of the gas appliance 200 through the cutoff valve 102 and gas distribution pipe 112, and subjected to combustion therein. A flow rate of the gas passing through the cutoff valve 102 and a consumption of the gas are measured by the inspection unit 114, and the consumption of gas is displayed by the display unit 118. The valve control unit 116 constantly monitors the value of flow rate outputted by the inspection unit 114, and cuts off supply of the gas to the gas appliance by closing the cutoff valve 102, if the flow rate of gas through the cutoff valve 102 exceeds a limit flow rate due to gas leakage or the like. On the other hand, the valve control unit 116 provides a combustion disabling signal to a combustion disabling unit 206 through the meter communication unit 120, communication medium 122 and appliance communication unit 204. When the combustion disabling signal is received, the combustion disabling unit 206 determines whether the combustion unit 202 is in combustion enabled state or not, and disables the combustion, if it is in combustion enabled state, by closing a valve in the combustion unit 202.

Although it has been described above that the cutoff valve 102 is closed when the flow rate of gas through the inspection meter 100 exceeds a predetermined level, a leak detector may be provided in the inspection meter or gas appliance so that the cutoff valve is closed by the valve control unit when leakage of the gas is detected by the leak detector.

Thus, according to the gas safety control system 1 of Embodiment 1, because the cutoff valve in the inspection meter and the valve in the combustion unit of gas appliance are closed when the flow rate of gas in the system exceeds a predetermined level, and leakage of the gas is detected, safety of the system can be assured.

In a conventional gas safety control system, although a gas appliance can be resetted to an operative state only when a reset switch is pressed, because the gas appliance is brought into an abnormal stop when the appliance is forcibly set to a combustion disabled state, it is another advantage of the present system that a gas appliance is not unnecessarily brought into an abnormal stop, and can be operated more conveniently without need of resetting the gas appliance in order to start it up after an abnormal condition is removed, because the gas appliance in a combustion enabled state is switched to a combustion disabled state by a combustion disabling signal outputted when an abnormal condition is detected by the inspection meter.

Although the cutoff information is communicated from the inspection meter to the gas appliance in the embodiment, the information is not limited to the cutoff information, and may be communicated from the gas appliance to the inspection meter as well depending on the information.

(2) Embodiment 2

Figure 3:
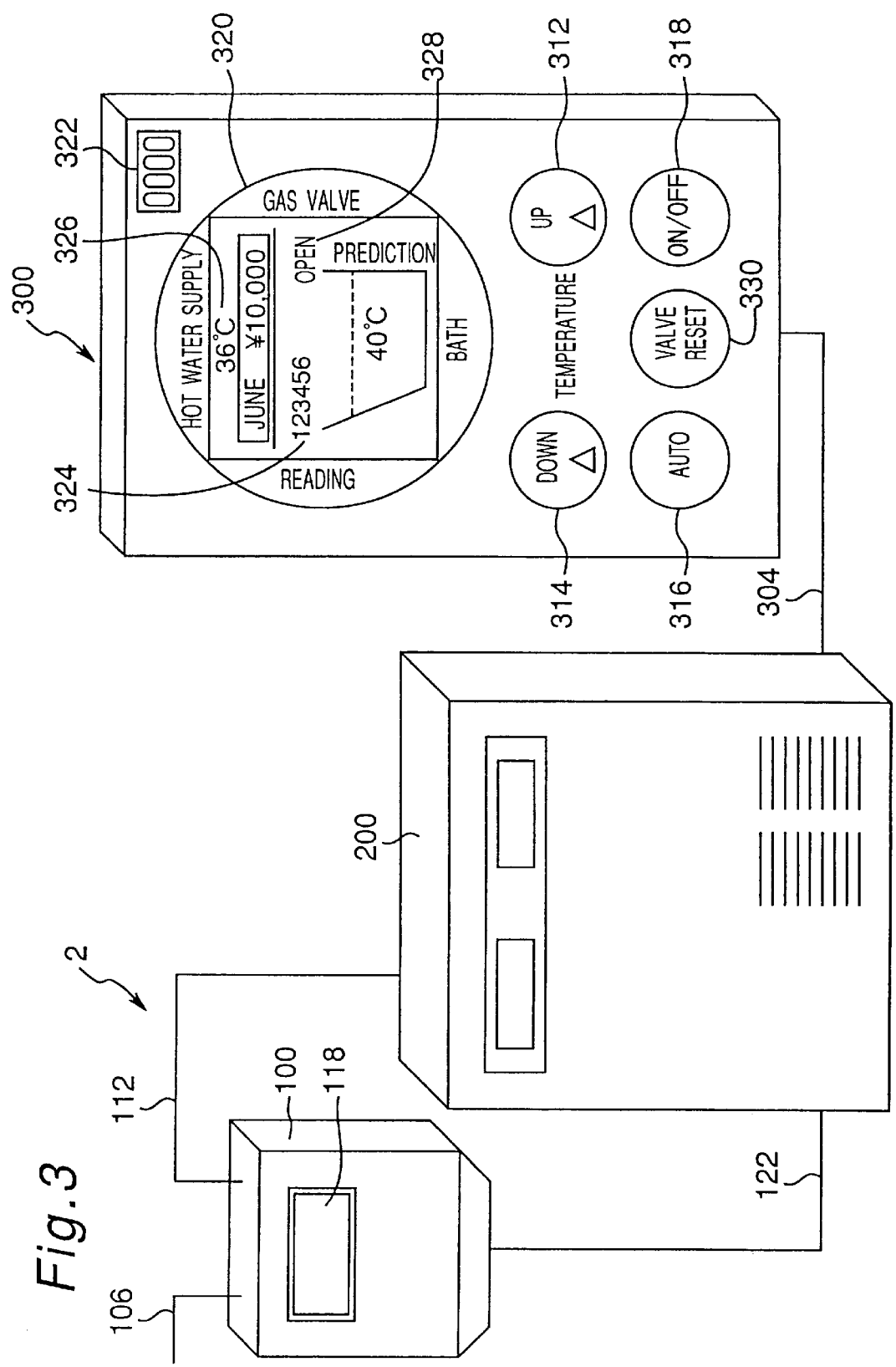
FIG. 3 is a perspective view of a gas safety control system according to a second embodiment of the invention.
Figure 4:
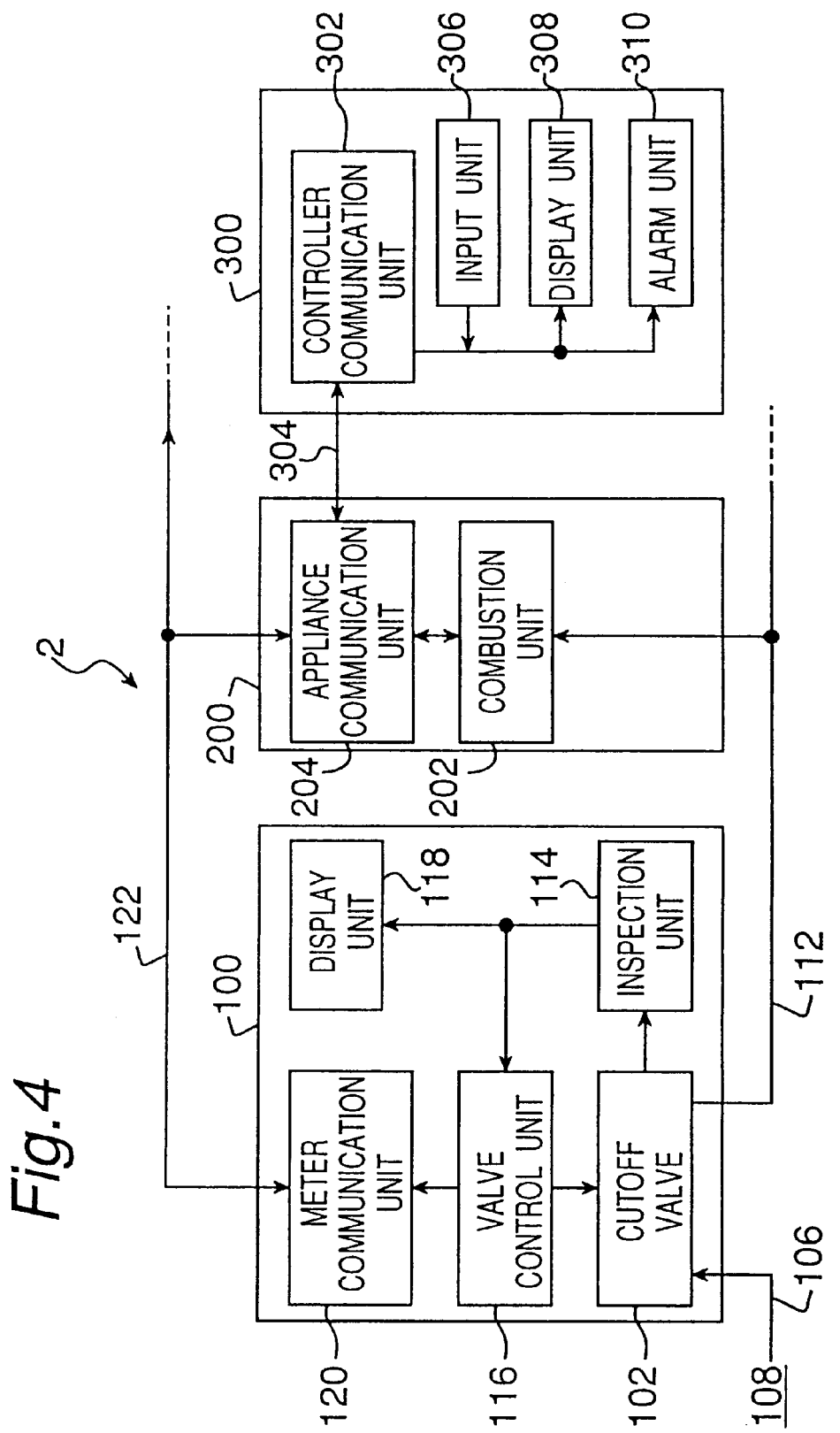
FIG. 4 is a block diagram of the gas safety control system shown in FIG. 3.

FIG. 3 is a perspective view of a gas safety control system according to Embodiment 2 of the invention, and FIG. 4 is a block diagram of the system, wherein the gas safety control system indicated as a whole by numeral 2 is provided with a remote control unit, that is, a controller 300 for each gas appliance 200. The controller 300 comprises a controller communication unit 302 capable of communicating with an appliance communication unit 202 in the gas appliance 200 through an appropriate communication medium 304. The controller 300 is also provided with an input unit 306, a display unit 308 and an alarm unit 310. In the case the gas appliance is a hot water supply system, for example, as shown in detail in FIG. 3, the input unit 306 includes a temperature up switch 312 for increasing the temperature of water to be supplied, a temperature down switch 314 for reducing the temperature of water, a switch 316 for turning on and off an automatic bath preparation function that automatically prepares a bath, a switch 318 for turning on and off the gas appliance 200 and the like, the display unit 308 includes, for example, a liquid crystal display 320, and the alarm unit 310 includes an audible alarm device, that is, a buzzer 322. The liquid crystal display 320 is adapted to display gas consumption (reading) information 324 obtained by the inspection unit 114, water temperature information 326, information 328 indicating whether the cutoff valve 102 in the inspection meter 100 is open or closed and the like. A flashing lamp may be provided in the alarm unit 322 so that it blinks in synchronization with the buzzer 322, or a screen display of the liquid crystal display may alternatively blink at a predetermined short interval of time.

In the gas safety control system 2 of Embodiment 2, when such abnormality as abnormal flow rate and leakage of gas is detected, and the cutoff valve 102 is closed, the cutoff information is applied to the controller-communication unit 302 from the meter communication unit 120 through the appliance communication unit 204, and the cutoff valve closure information 328 is displayed by the liquid crystal display 320. Because supply of the gas to the gas appliances 200 in the system 2 is cut off as soon as the cutoff valve 102 in the inspection meter 100 is closed, no gas leakage is caused through the gas appliances 200.

A valve reset switch 330 may be provided in the controller 300 so that the cutoff valve 102 in the inspection meter 100 is returned to an open position by operating the switch. A reset switch in the gas appliance 200 may also serve as the valve reset switch 330, so that a combustion unit of the gas appliance can be returned to an enabled state by operating the valve reset switch 330.

The gas appliance 200 in the embodiment may be also provided with a combustion disabling unit similar to that of Embodiment 1 for allowing the gas appliance 200 to be automatically set to an inoperative state in response to a combustion disabling signal that is outputted from the inspection meter 100.

Further, the controller 300 may be provided separately from the gas appliance 200 or integrally with the gas appliance.

Although the controller 300 is allowed to communicate with the meter communication unit 120 through the appliance communication unit 204 in Embodiment 2 above, the controller communication unit 320 may directly communicate with the meter communication unit 120.

It is also possible to allow the controller communication unit 302 to communicate with the meter communication unit 120, and the controller communication unit 302 with the appliance communication unit 204, while communication between the meter communication unit 120 and the appliance communication unit 204 is achieved through the controller communication unit 302.

Thus, according to the gas safety control system 2 described above, because an operating state of the meter is displayed in the controller, a user can recognize an abnormality in the system at sight, and reset the gas appliance after the abnormal condition is removed.

(3) Embodiment 3

Figure 5:
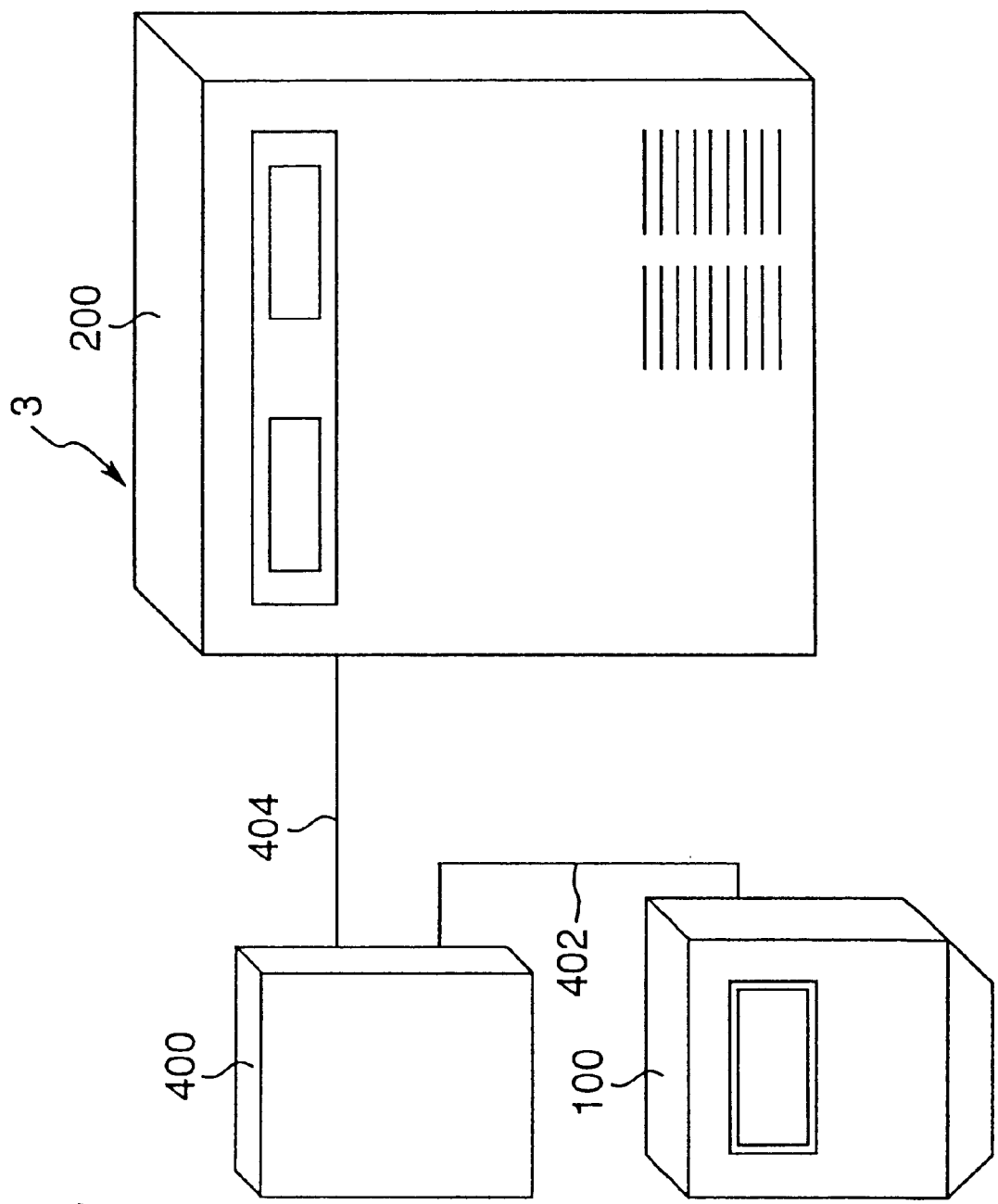
FIG. 5 is a perspective view of a gas safety control system according to a third embodiment of the invention.
Figure 6:
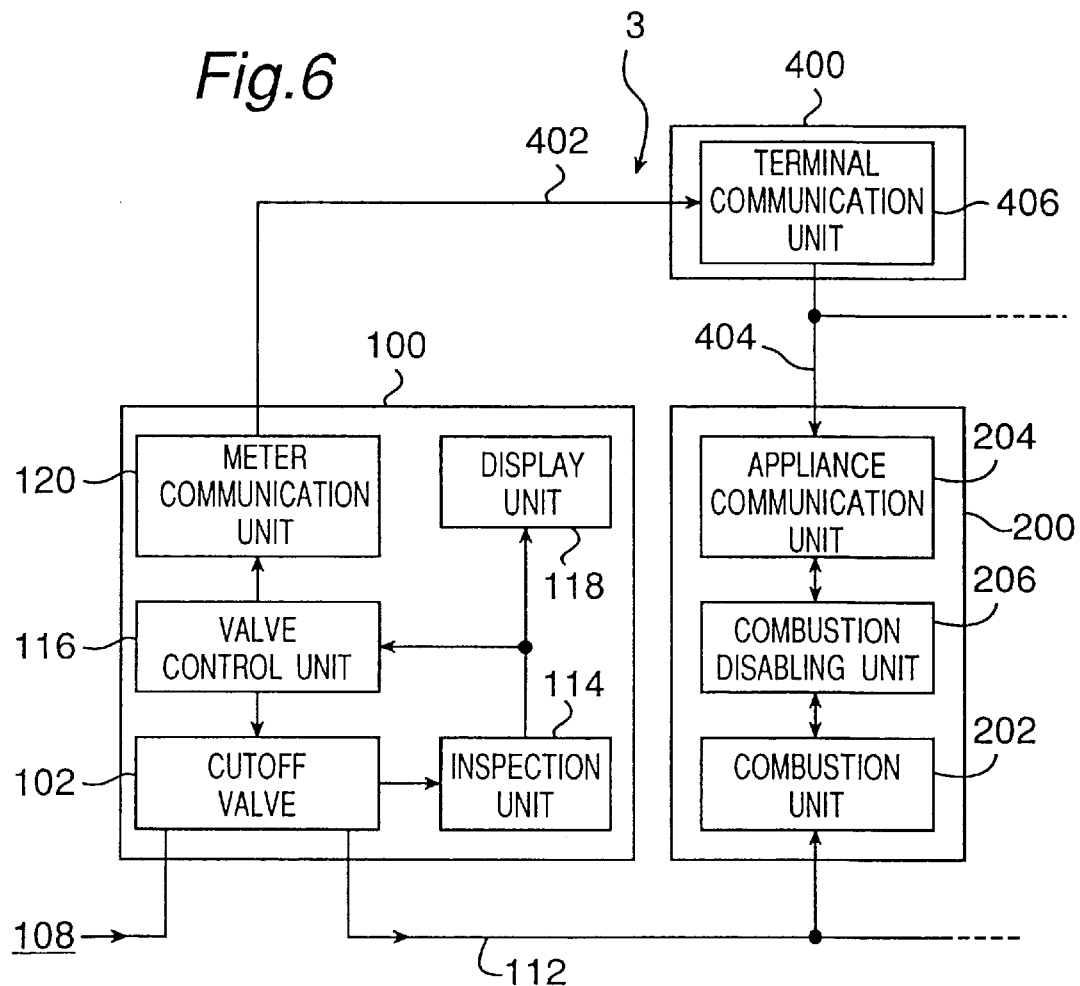
FIG. 6 is a block diagram of the gas safety control system shown in FIG. 5.

FIG. 5 is a perspective view of a gas safety control system according to Embodiment 3 of the invention, and FIG. 6 is a block diagram of the system, wherein the gas safety control system shown as a whole by numeral 3 comprises a meter 100 and a gas appliance 200 connected to a relay unit 400 through appropriate communication media 402, 404, respectively. The relay unit 400 comprises a terminal communication unit 406 for interfacing between the meter 100 and gas appliance 200 to enable exchange of information between them in the case the communication mode of the meter is different from that of the gas appliance.

In the gas safety control system 3, a combustion disabling signal outputted from a meter communication unit 120 is applied through the communication medium to the terminal communication unit 406, and converted there to that of a communication mode consistent with the gas appliance. The combustion disabling signal converted is applied to an appliance communication unit 206, and a combustion disabling unit 206 is activated, if a combustion unit 202 is in a combustion enabled state, for switching the combustion unit 202 in the gas appliance 200 to a combustion disabled state. According to the gas safety control system 3, communication can be achieved between apparatuses using different communication modes, and the system is given an extendibility. The conversion of communication mode covers a physical aspect as well as a logical aspect. In sections using a common communication mode, the inspection meter and gas appliance can also communicate directly with each other.

(4) Embodiment 4

Figure 7:
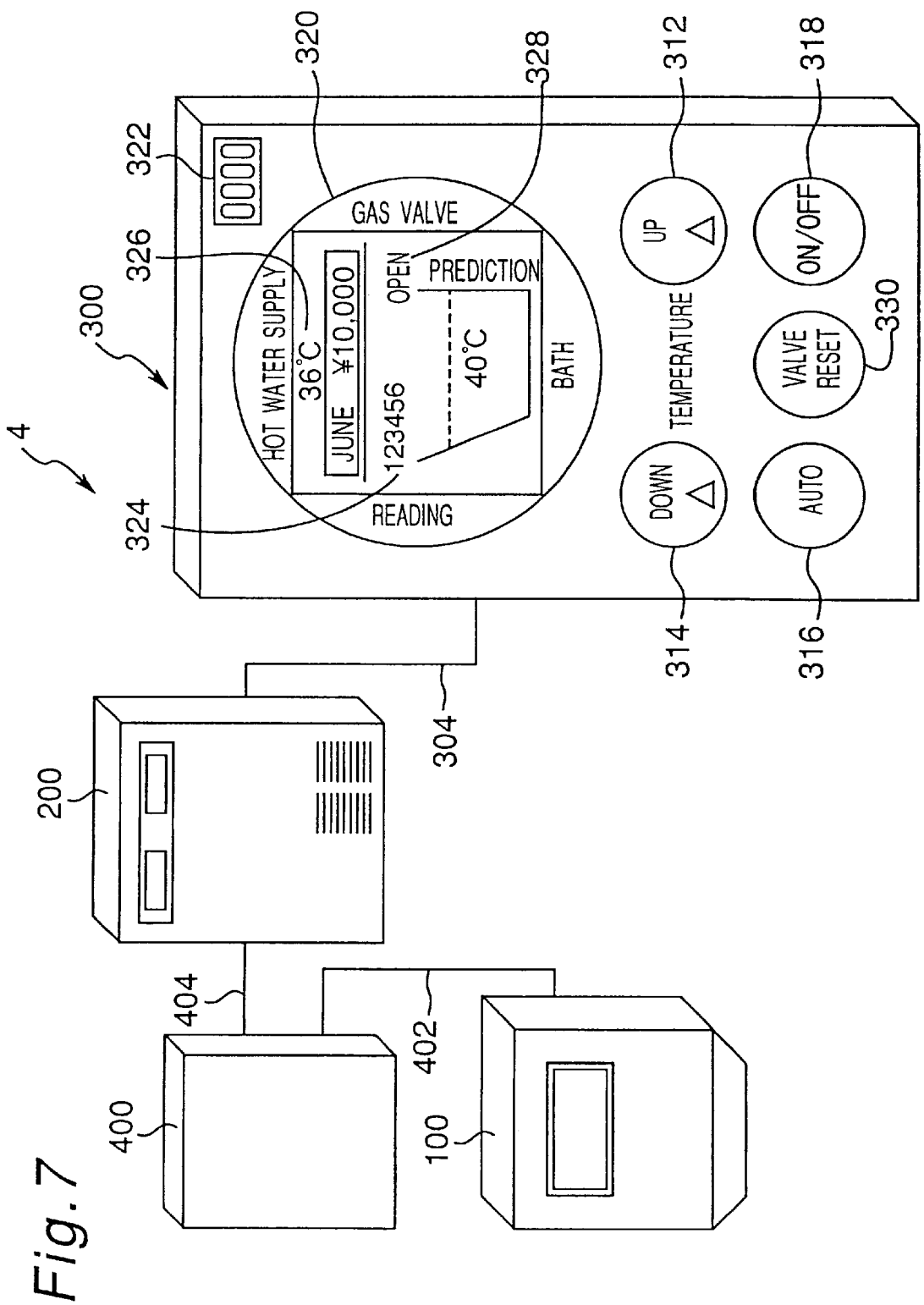
FIG. 7 is a perspective view of a gas safety control system according to a fourth embodiment of the invention.
Figure 8:
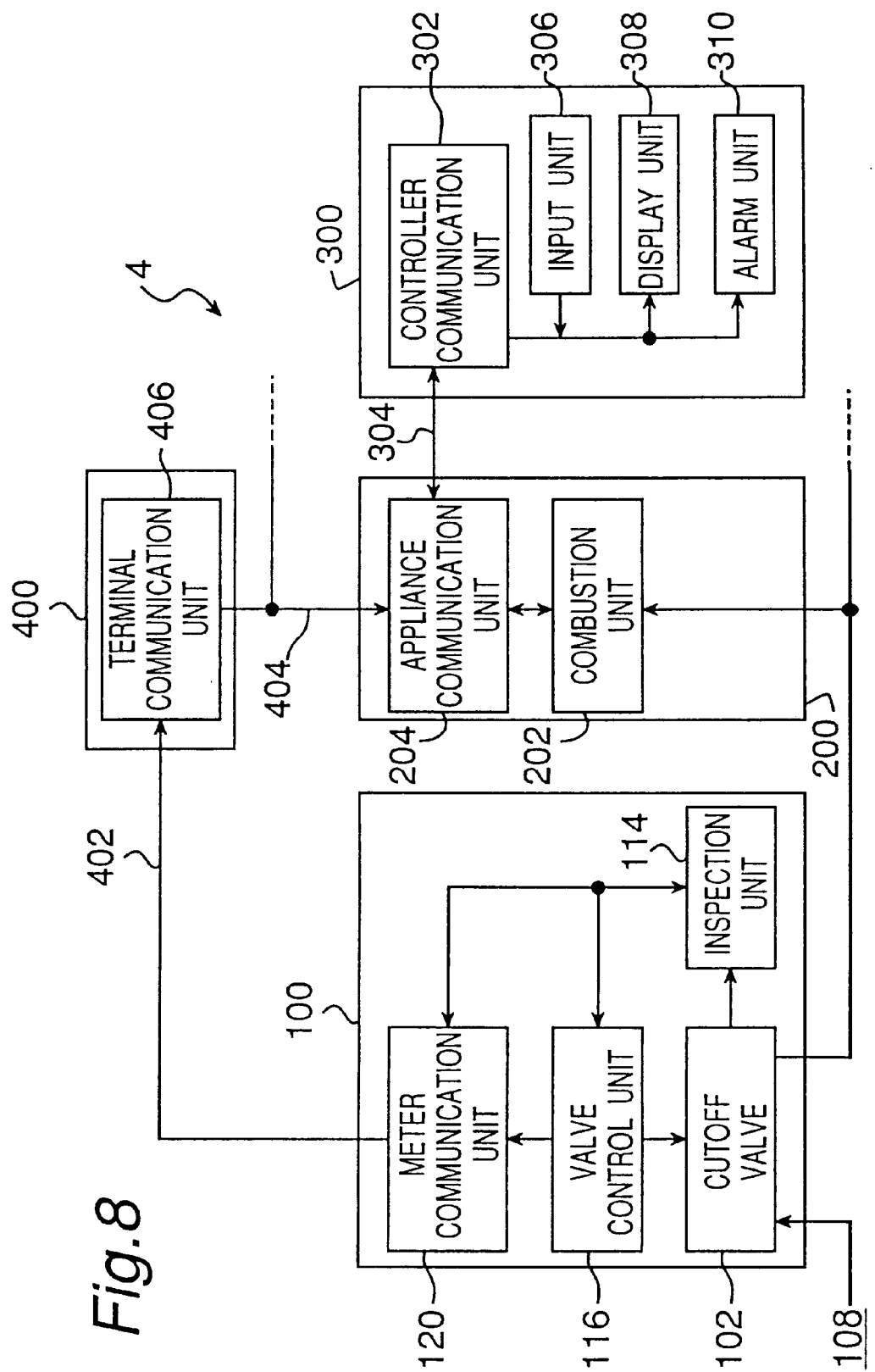
FIG. 8 is a block diagram of the gas safety control system shown in FIG. 7.

FIG. 7 is a perspective view of a gas safety control system according to Embodiment 4 of the invention, and FIG. 8 is a block diagram of the system, wherein the gas safety control system depicted as a whole by numeral 4 comprises a controller 300 added to the gas safety control system 3 according to Embodiment 3 that includes the relay unit 400, and communication units of respective apparatuses are connected with each other by means of appropriate communication media, respectively. Thus, since the gas safety control system is substantially a combination of the gas safety control systems 2 and 3 of Embodiments 2 and 3, its operation is not described further in detail. In the gas safety control system 4, because an operating state of the meter is displayed in the controller, a user can recognize an abnormality in the system at sight, and reset the gas appliance after the abnormal condition is removed. In the embodiment, although the controller 300 is connected for communication with the gas appliance 200, it may be connected for direct communication with the inspection meter 100 and relay unit 400.

It is also possible to allow the controller communication unit 302 to communicate with the terminal communication unit 406, and the controller communication unit 302 with the appliance communication unit 204, while communication between the meter communication unit 120 and appliance communication unit 204 is achieved through the controller communication unit 302.

(5) Embodiment 5

Figure 9:
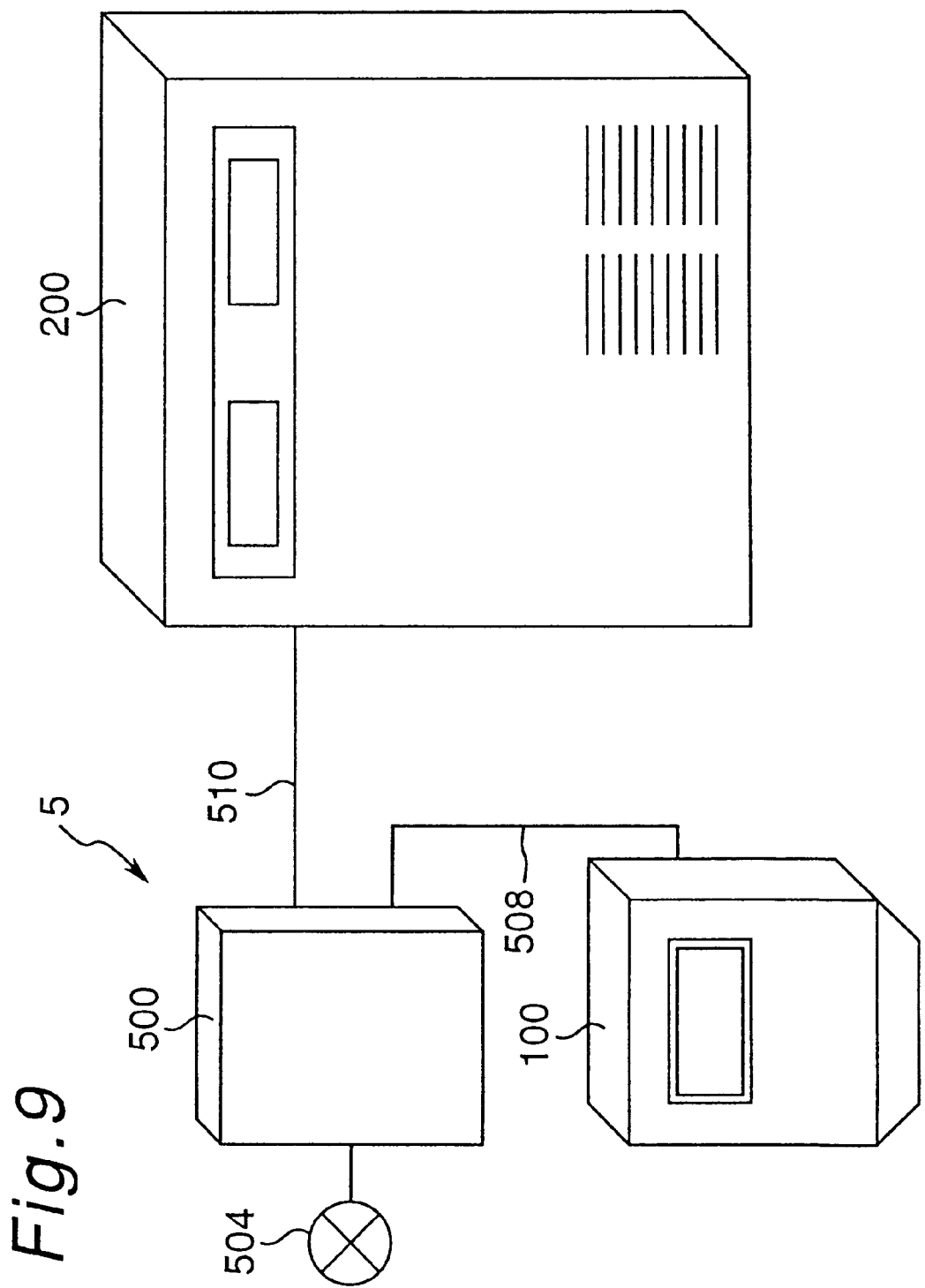
FIG. 9 is a perspective view of a gas safety control system according to a fifth embodiment of the invention.
Figure 10:
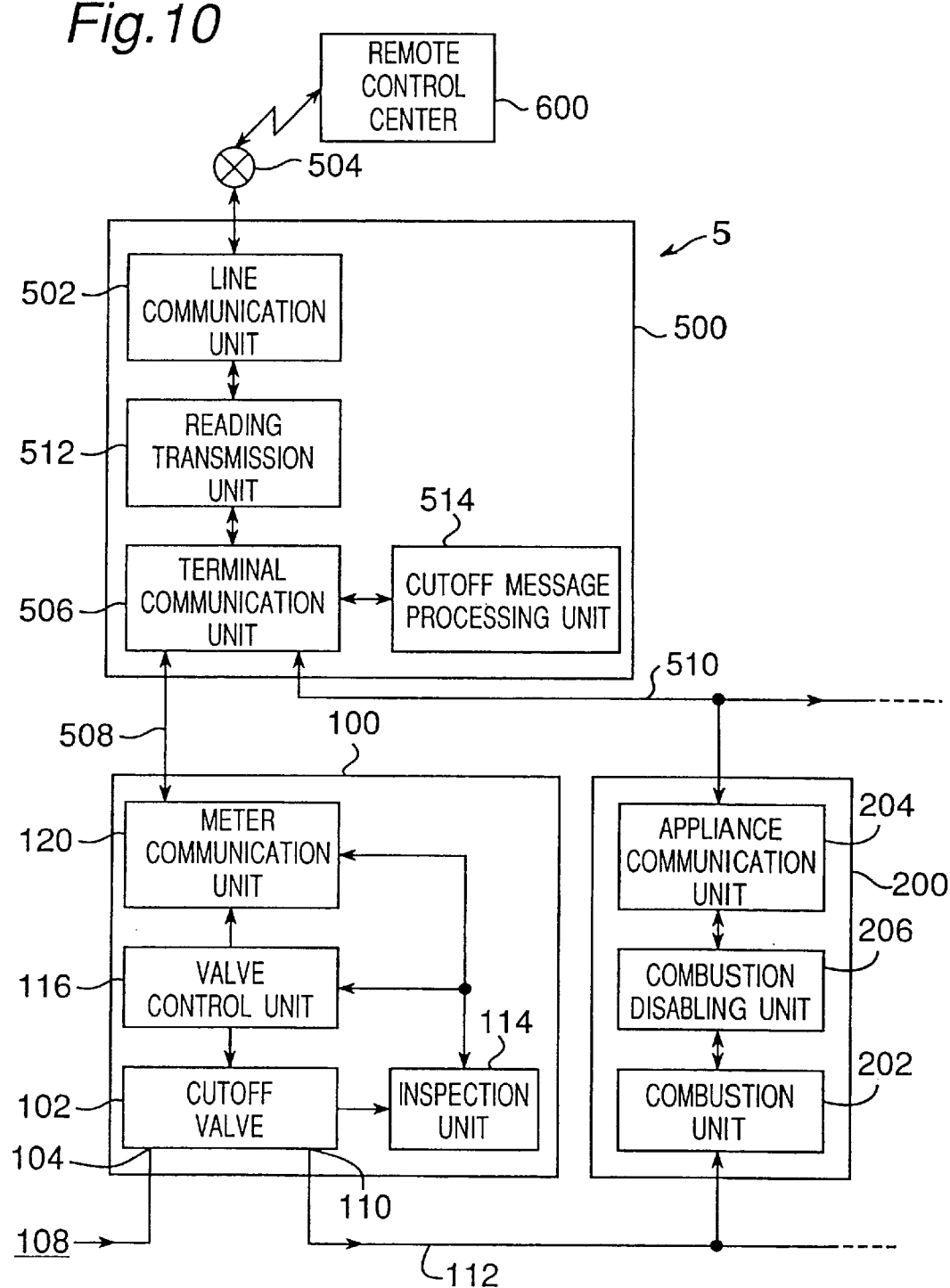
FIG. 10 is a block diagram of the gas safety control system shown in FIG. 9.

FIG. 9 is a perspective view of a gas safety control system according to Embodiment 5 of the invention, and FIG. 10 is a block diagram of the system, wherein the gas safety control system represented as a whole by numeral 5 comprises a terminal network controller 500. The terminal network controller 500 includes a line communication unit 502, and the line communication unit 502 is adapted to mutually communicate with a remote control center 600 through such communication medium 504 as telephone line. The terminal network controller 500 is also provided with a terminal communication unit 506. The terminal communication unit 506 is connected with the meter communication unit 120 and appliance communication unit 204 through appropriate communication media 508, 510, respectively, and communication can be, therefore, achieved between the inspection meter 100 and gas appliance 200 even if the communication mode is different between them.

The line communication unit 502 and terminal communication unit 506 are connected with each other through the intermediary of a reading transmission unit 512, so that information on a consumption of gas measured by the inspection unit 114 in the inspection meter 100 is transmitted from the terminal communication unit 506 to the line communication unit 502 through the reading transmission unit 512, and a read command outputted from the remote control center 600 is transmitted from the line communication unit 502 to the terminal communication unit 506 through the reading transmission unit 506. The terminal communication unit 506 is also connected with a cutoff message processing unit 514, so that a cutoff message, that is, a combustion disabling signal is generated from a signal indicating such abnormal condition as gas leakage, and transmitted to the terminal communication unit 506 as soon as the signal is inputted to the terminal communication unit 506 from the meter 100.

In the gas safety control system 5 of such constitution, a read command outputted by the remote control center 600 is applied to the line communication unit 502 in the terminal network controller 500 through the communication medium 504. The read command received by the line communication unit 502 is transferred to the terminal communication unit 506 through the reading transmission unit 512. The terminal communication unit 506 converts the read command to a reading signal which can be read by the inspection meter 100. The signal converted is applied to the inspection unit 114 through the meter communication unit 120, and the inspection unit 114 transmits reading information, that is, information regarding a consumption of gas in the system 5 through the meter communication unit 120 to the terminal communication unit 506 in response. The reading information is further transmitted through the reading transmission unit 512, line communication unit 502 and communication medium 504 to the remote control center 600.

When a gas leakage, abnormal flow rate of the gas or the like is detected by the inspection meter 100, and the cutoff valve 102 is closed by the valve control unit 116, the cutoff information is sent through the meter communication unit 120 and terminal communication unit 506 to the cutoff message processing unit 514. The cutoff message processing unit 514 generates a gas appliance cutoff message according to the information. The gas appliance cutoff message is transmitted through the terminal communication unit 506 to the appliance communication unit 204 in the gas appliance 200, and activates the combustion disabling unit 206 for switching the combustion unit 200 to a combustion disabled state, if it is in a combustion enabled state.

Alternatively, the message from the meter communication unit 120 may be directly transmitted to the appliance communication unit 204 without the intermediary of the cutoff message processing unit 514 (for direct transmission). In sections using a common communication mode, the inspection meter and gas appliance may also directly communicate with each other without the intermediary of the terminal network controller.

Thus, according to the gas safety control system 5, a gas appliance in the system can be automatically switched to a combustion disabled state when such abnormal condition as gas leakage is caused, and a consumption of the gas in each system can be also known in the remote control center automatically in response to a read command outputted therefrom.

(6) Embodiment 6

Figure 11:
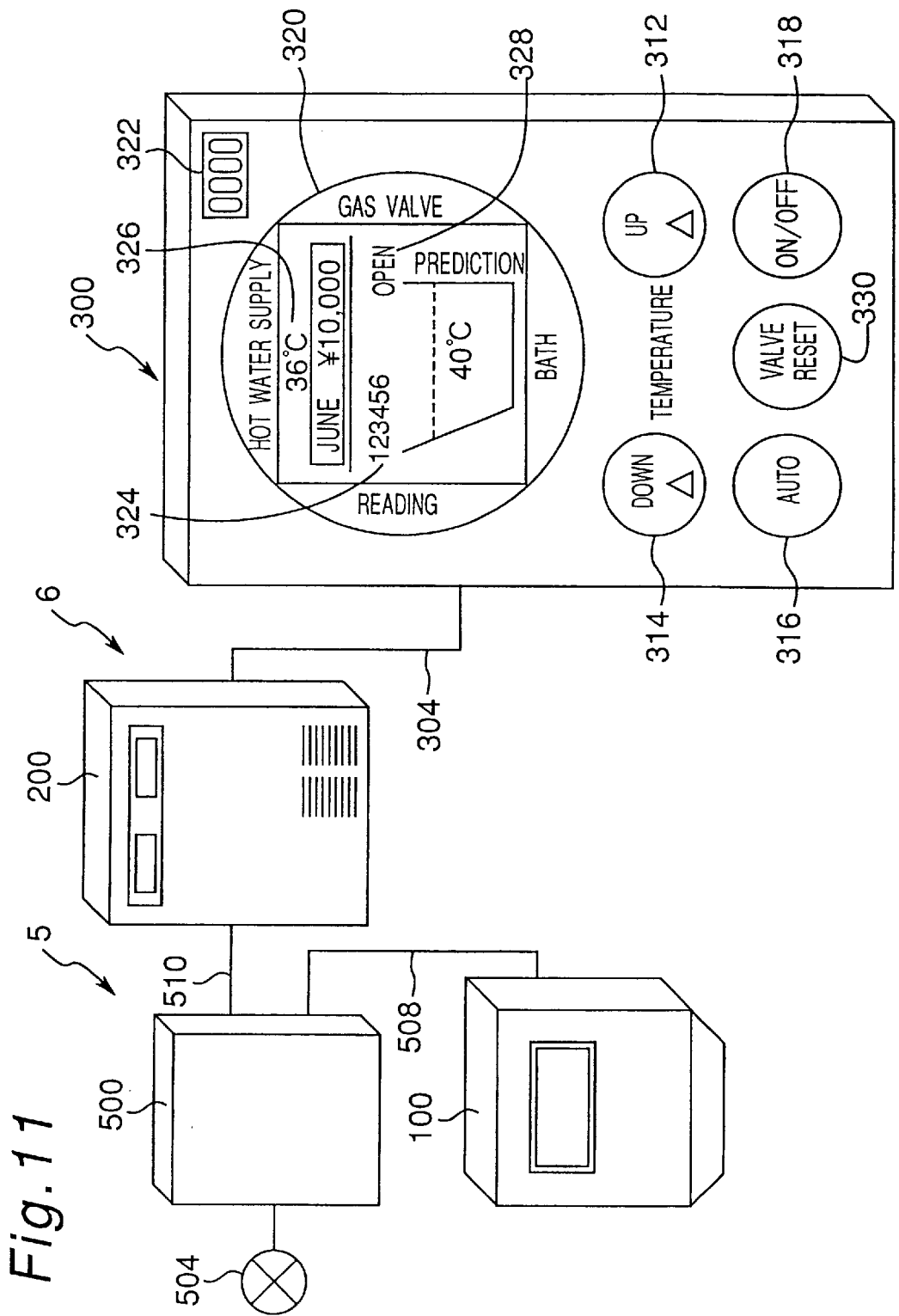
FIG. 11 is a perspective view of a gas safety control system according to a sixth embodiment of the invention.
Figure 12:
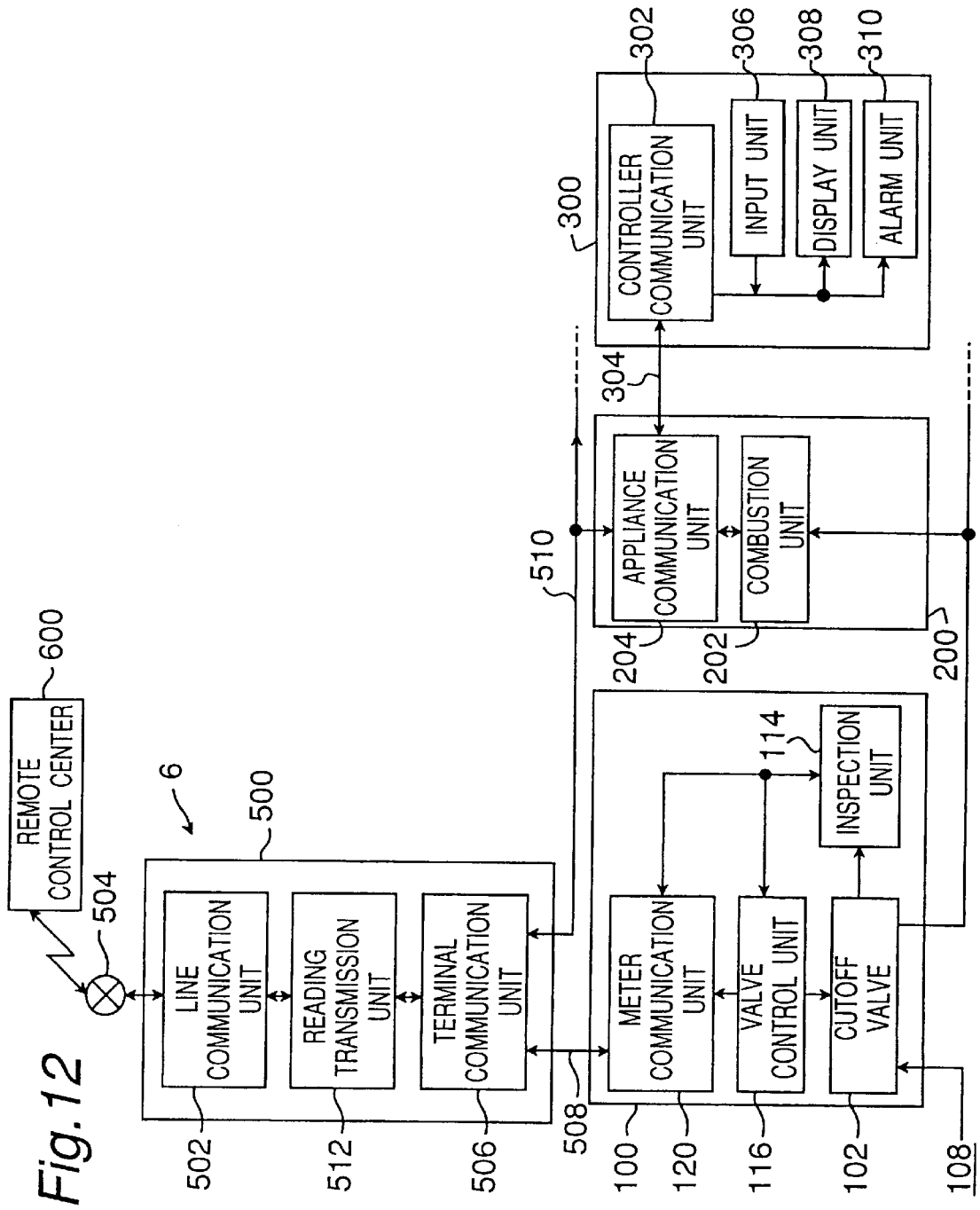
FIG. 12 is a block diagram of the gas safety control system shown in FIG. 11.

FIG. 11 is a perspective view of a gas safety control system according to Embodiment 6 of the invention, and FIG. 12 is a block diagram of the system, wherein the gas safety control system indicated as a whole by numeral 6 is substantially constituted by adding a controller 300 to the gas safety control system 5 according to the embodiment that includes the terminal network controller 500, and communication units of the apparatuses are connected with each other by means of appropriate communication media, respectively. In the embodiment, although the controller 300 is connected for communication with a gas appliance 200, it may be connected with a meter 100, relay unit 400 and terminal network controller 500 for allowing communication between them.

Thus, in the gas safety control system 6, because an operating state of the meter is displayed by the controller, a user can recognize an abnormality in the system at sight, and reset the gas appliance after the abnormal condition is removed.

It is also possible to allow the controller communication unit 302 to communicate with the terminal communication unit 506, and the controller communication unit 302 with the appliance communication unit 204, while communication between the meter communication unit 120 and appliance communication unit 204 is achieved through the controller communication unit 302.

(7) Embodiment 7

Figure 13:
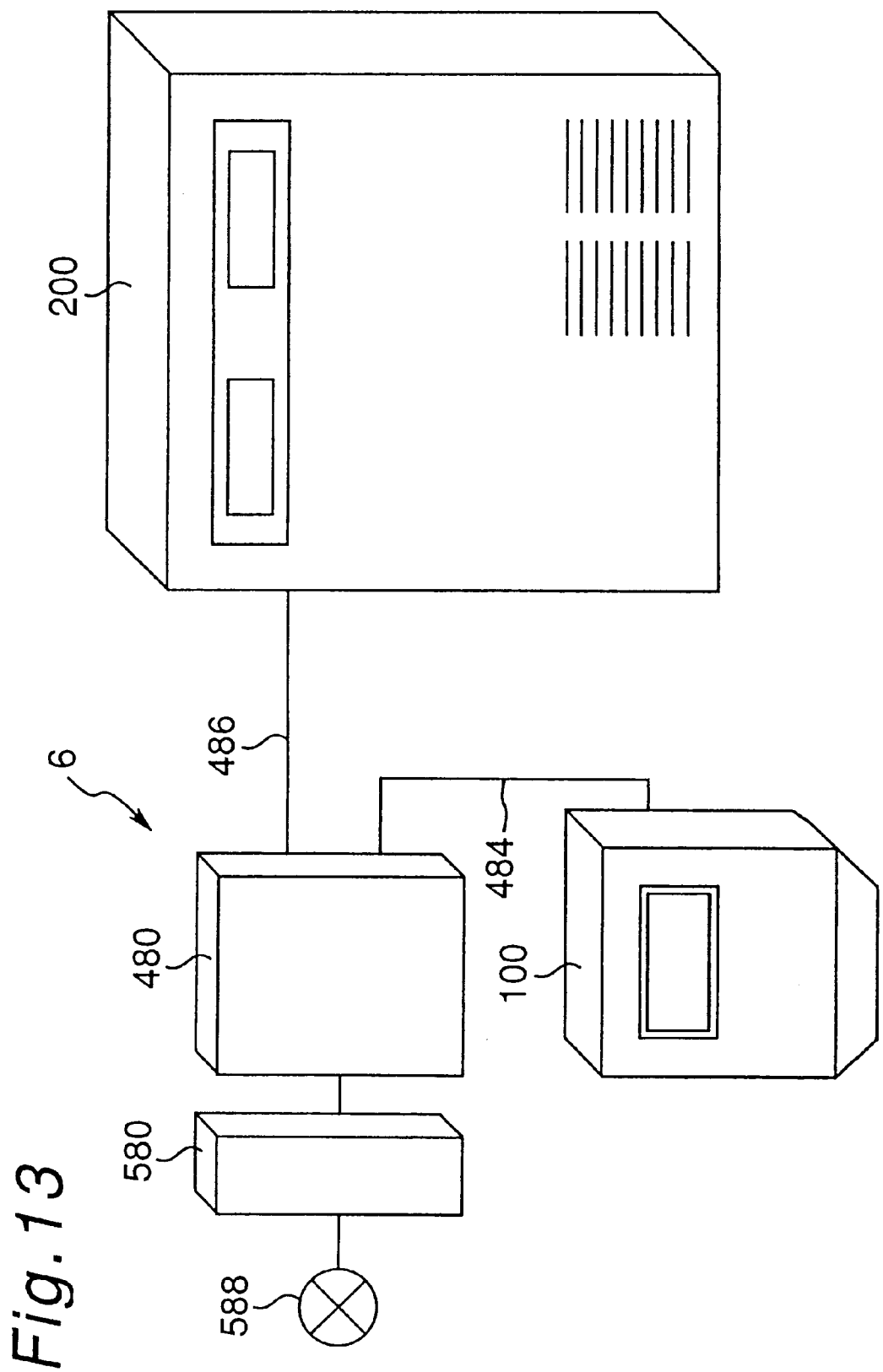
FIG. 13 is a perspective view of a gas safety control system according to a seventh embodiment of the invention.
Figure 14:
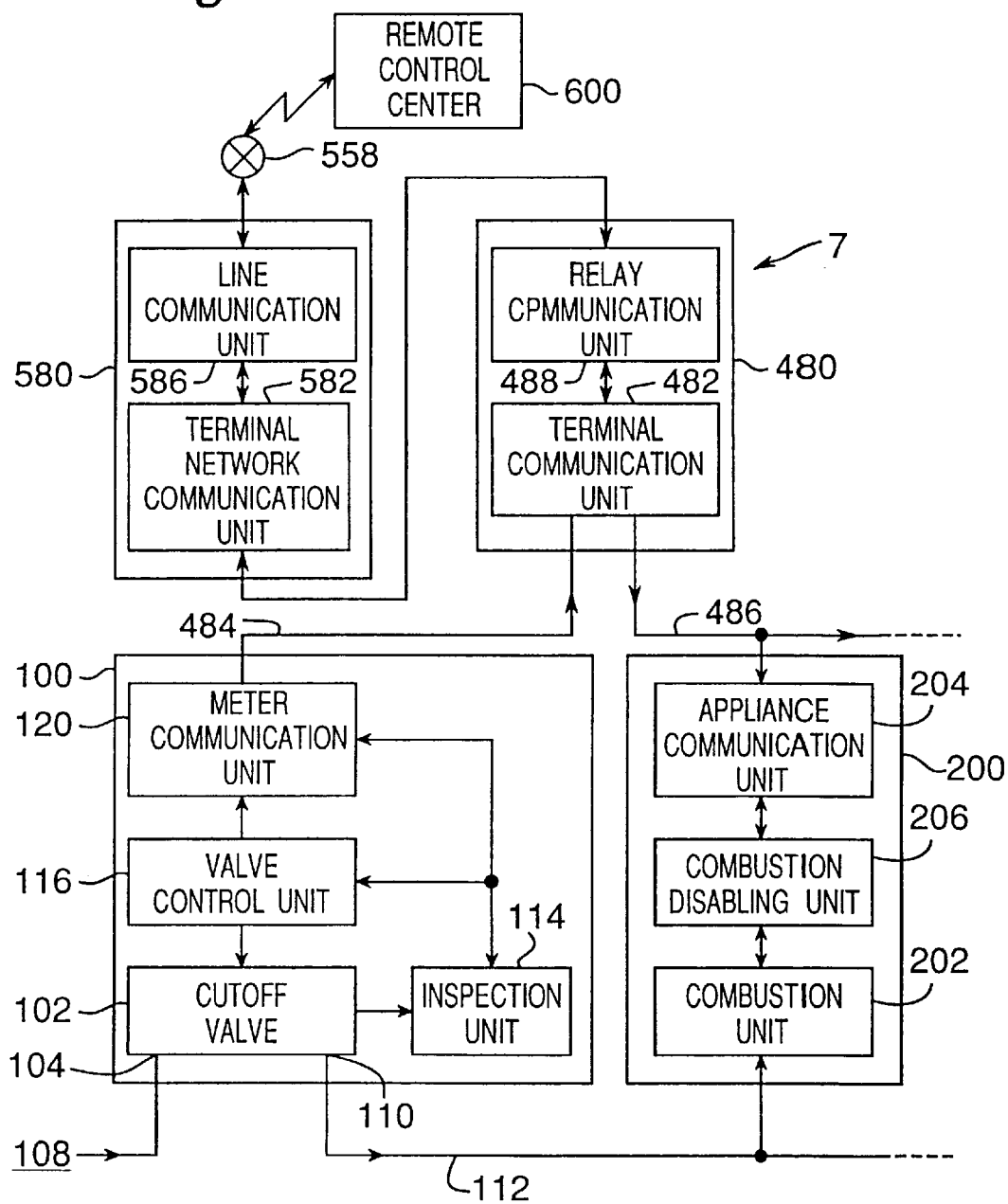
FIG. 14 is a block diagram of the gas safety control system shown in FIG. 13.

FIG. 13 is a perspective view of a gas safety control system according to Embodiment 7 of the invention, and FIG. 14 is a block diagram of the system, wherein the gas safety control system shown as a whole by numeral 7 comprises a relay unit 480 and a terminal network controller 580. The relay unit 480 is provided with a terminal communication unit 482 for enabling communication between a meter 100 and a gas appliance 200 using different communication modes, and the terminal communication unit 482 is connected with a meter communication unit 120 and an appliance communication unit 204 through appropriate communication media 484, 486. The relay unit 480 is also provided with a relay communication unit 488, and communication can be achieved between the relay communication unit 488 and terminal communication unit 482. On the other hand, the terminal network controller 580 is provided with a terminal network controller communication unit 582, and is capable of communicating with the relay communication unit 488 through an appropriate communication medium 584. The line communication unit 586 is capable of communicating with the terminal network controller communication unit 582 and a remote control center 600 through such communication medium 588 as telephone line.

In the gas safety control system 7, a read command outputted from the remote control center 600 is transmitted through the communication medium 588, line communication unit 586, terminal network controller communication unit 582, relay communication unit 488, terminal communication unit 482 and meter communication unit 120 to an inspection unit 114. The inspection unit 114 prepares reading information in response to the read command, and transfer it through the meter communication unit 120, terminal communication unit 482, relay communication unit 488, terminal network controller communication unit 582, line communication unit 586 and communication line 588 to the remote control center 600. When gas leakage, abnormal flow rate of the gas or the like is detected by a meter 100, and a cutoff valve 102 is closed by a valve control unit 116, the cutoff information is sent to a combustion disabling unit 206 through the meter communication unit 120, terminal communication unit 452 and appliance communication unit 204, and the combustion disabling unit 206 switches a combustion unit 202 to a combustion disabled state, if it is in a combustion enabled state.

Thus, according to the gas safety control system 7, a gas appliance is automatically switched to a combustion disabled state when such abnormal condition as gas leakage is caused, and a consumption of gas can be also automatically transmitted to the remote control center in response to a read command outputted therefrom.

(8) Embodiment 8

Figure 15:
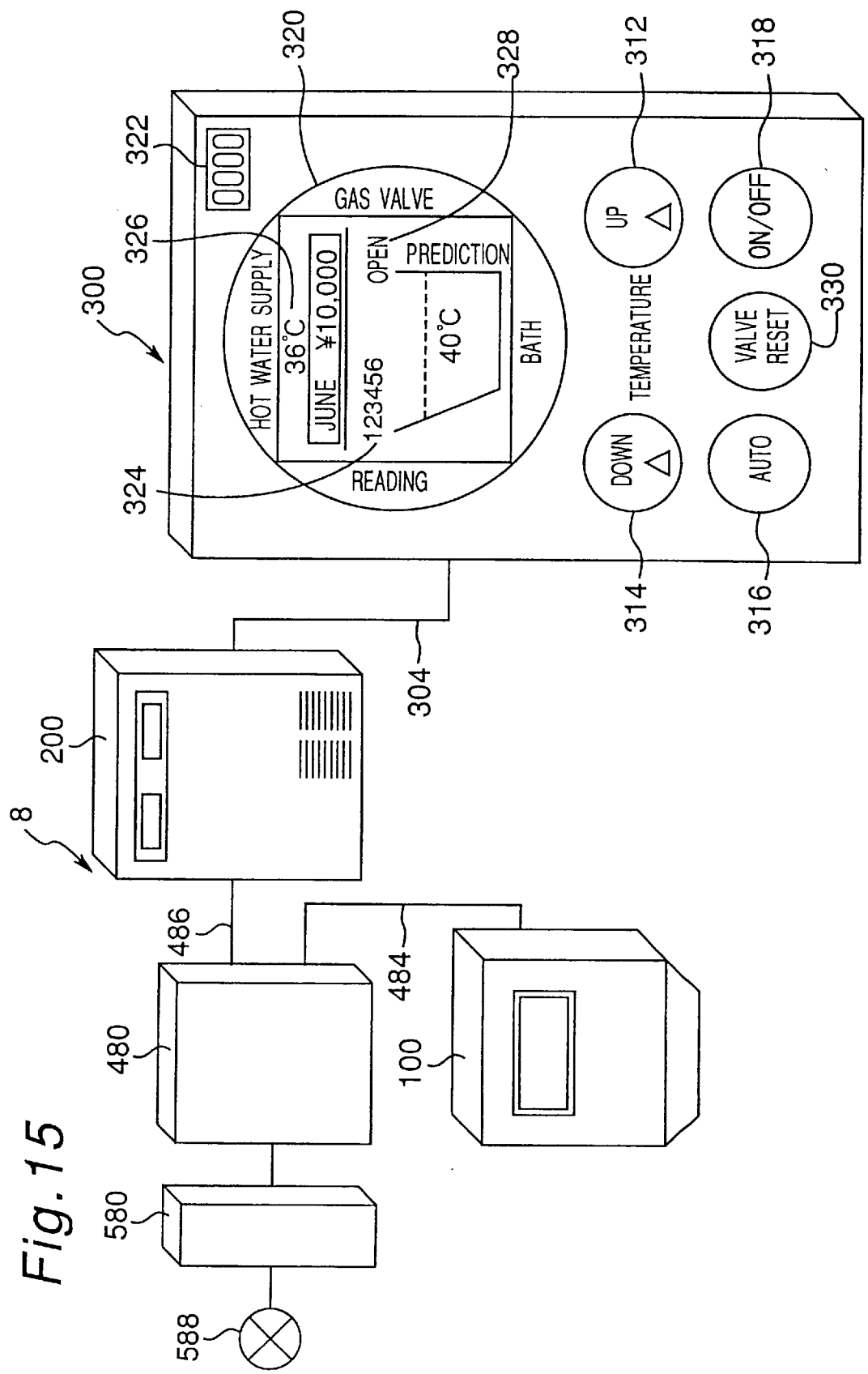
FIG. 15 is a perspective view of a gas safety control system according to an eighth embodiment of the invention.
Figure 16:
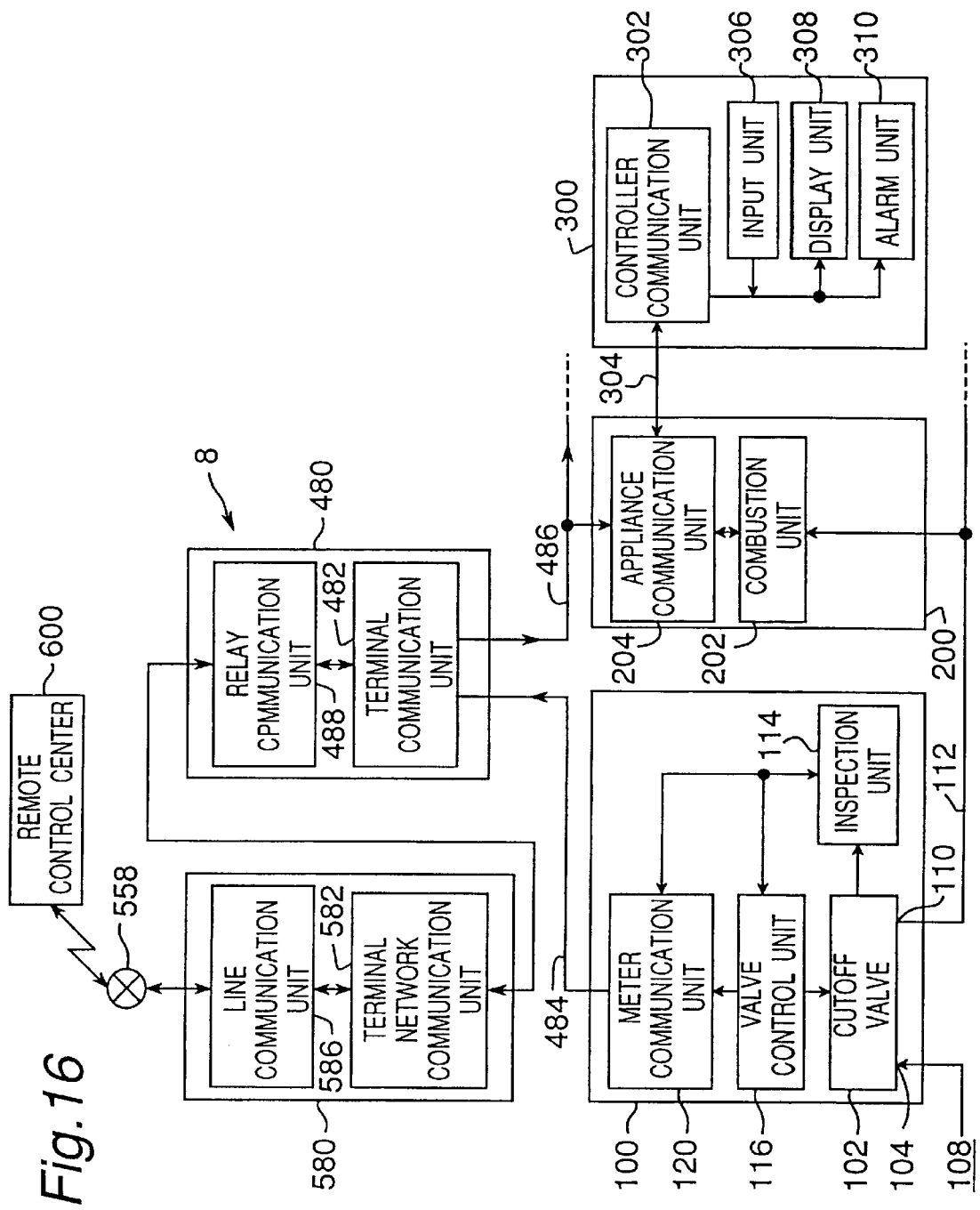
FIG. 16 is a block diagram of the gas safety control system shown in FIG. 15.

FIG. 15 is a perspective view of a gas safety control system according to Embodiment 8 of the invention, and FIG. 16 is a block diagram of the system, wherein the gas safety control system shown as a whole by numeral 8 includes a controller 300 added to the gas safety control system 7 according to the seventh embodiment, and communication units of the apparatuses are connected with each other by means of appropriate communication media, respectively. In the embodiment, although the controller 300 is connected for communication with a gas appliance 200, it may be communicated with a meter 100, a relay unit 480 and a terminal network controller 580 for communication with them.

Thus, in the gas safety control system 8, since an operating state of the meter is displayed by the controller, a user can recognize an abnormality of the system at sight, and reset the gas appliance after the abnormal condition is removed.

It is also possible to allow a controller communication unit 302 to communicate with a terminal communication unit 482, and an appliance communication unit 204 with the controller communication unit 302, while communication between a meter communication unit and the appliance communication unit 204 is achieved through the controller communication unit 302.

(9) Embodiment 9

Figure 17:
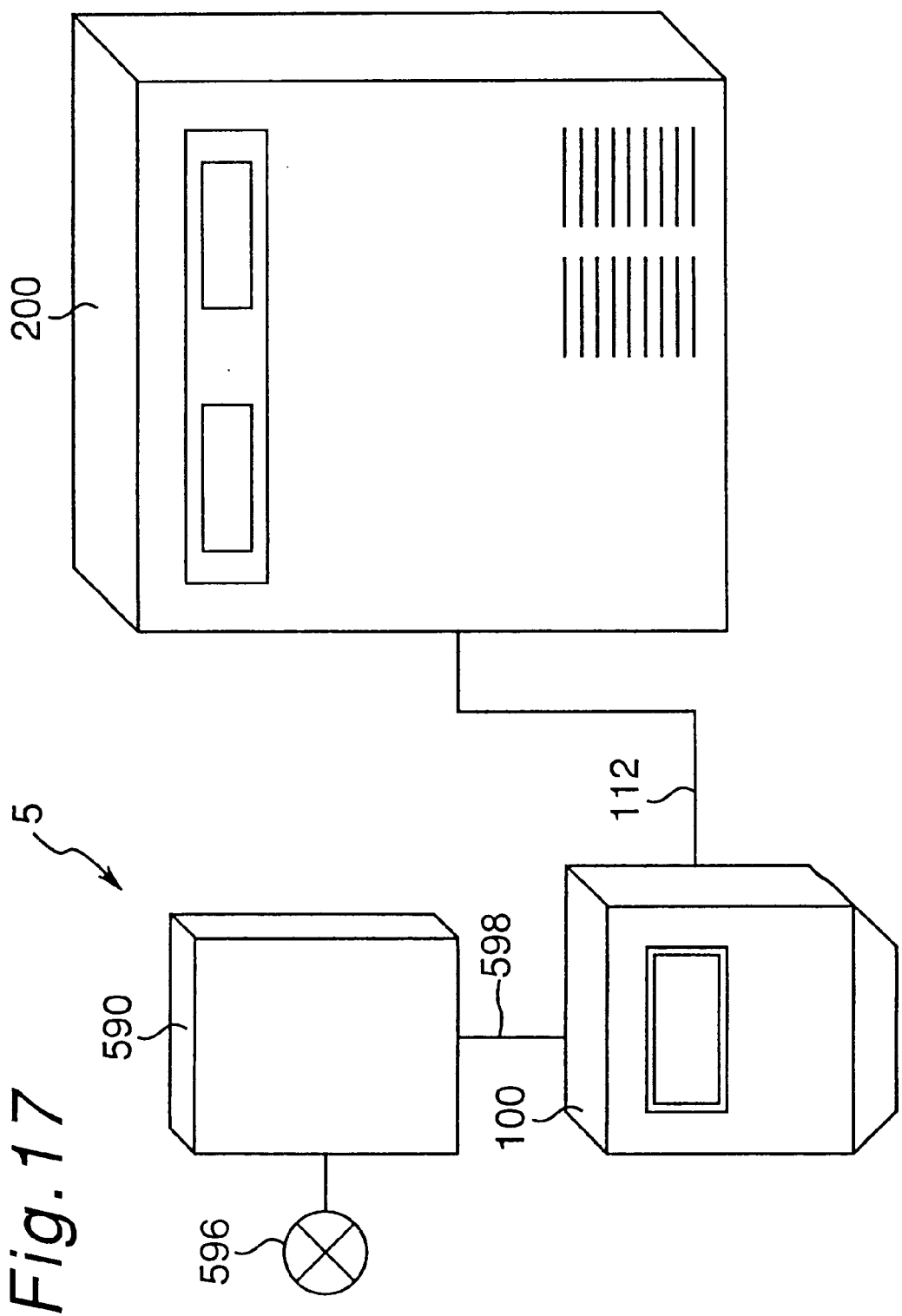
FIG. 17 is a perspective view of a gas safety control system according to a ninth embodiment of the invention.
Figure 18:
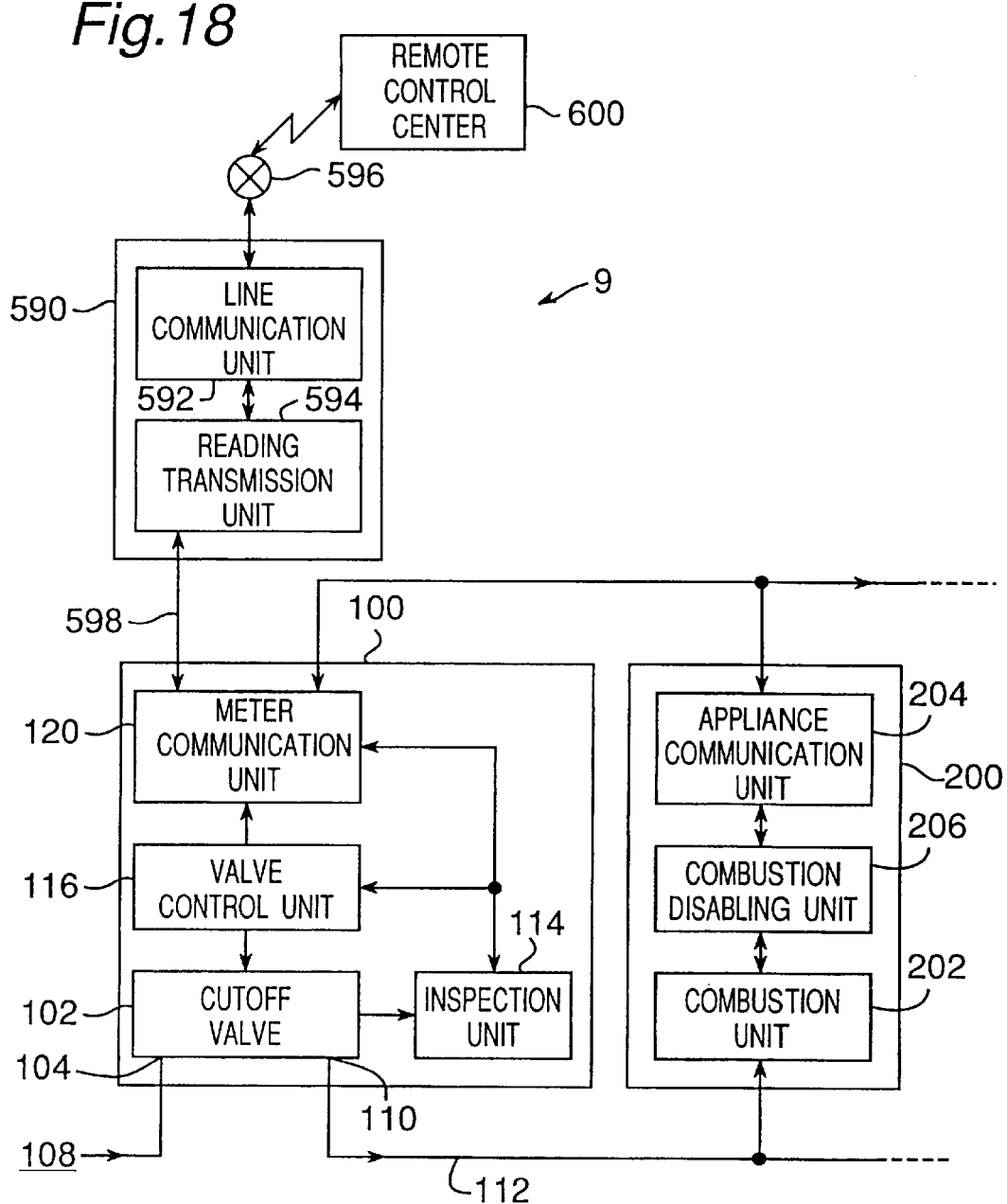
FIG. 18 is a block diagram of the gas safety control system shown in FIG. 17.

FIG. 17 is a perspective view of a gas safety control system according to Embodiment 9 of the invention, and FIG. 18 is a block diagram of the system, wherein the gas safety control system referred to as a whole by numeral 9 is characterized in that a terminal network controller is provided with a line communication unit 592 and a reading transmission unit 594 connected to the line communication unit, and the line communication unit 592 is capable of communicating with a remote control center 600 through such communication medium 596 as telephone line, while the reading transmission unit 594, on the other hand, is capable of communicating with a meter communication unit 120 through an appropriate communication medium 598. A meter 100 and a gas appliance 200 can communicate with each other through the meter communication unit 120 and an appliance communication unit 204 using a common communication mode.

In the gas safety control system 9, a read command outputted from the remote control center 600 is transmitted through the communication medium 596, line communication unit 592 and meter communication unit 120 to an inspection unit 114. The inspection unit 114 prepares reading information in response to the read command, and transfers it through the meter communication unit 120, reading transmission unit 594, line communication unit 592 and communication line 596 to the remote control center 600.

When gas leakage, abnormal flow rate of the gas or the like is detected by the meter, and a cutoff valve 102 is closed by a valve control unit 116, the cutoff information is transferred through the meter communication unit 120 and appliance communication unit 204 to a combustion disabling unit 206, and the combustion disabling unit 206 switches a combustion unit 202 to a combustion disabled state, if it is in a combustion enabled state.

Thus, in the gas safety control system 9 as well, a gas appliance in the system is automatically switched to a combustion disabled state when such abnormal condition as gas leakage is caused, and a consumption of gas in the system can be also transmitted automatically to the remote control center in response to a read command outputted therefrom.

(10) Embodiment 10

Figure 19:
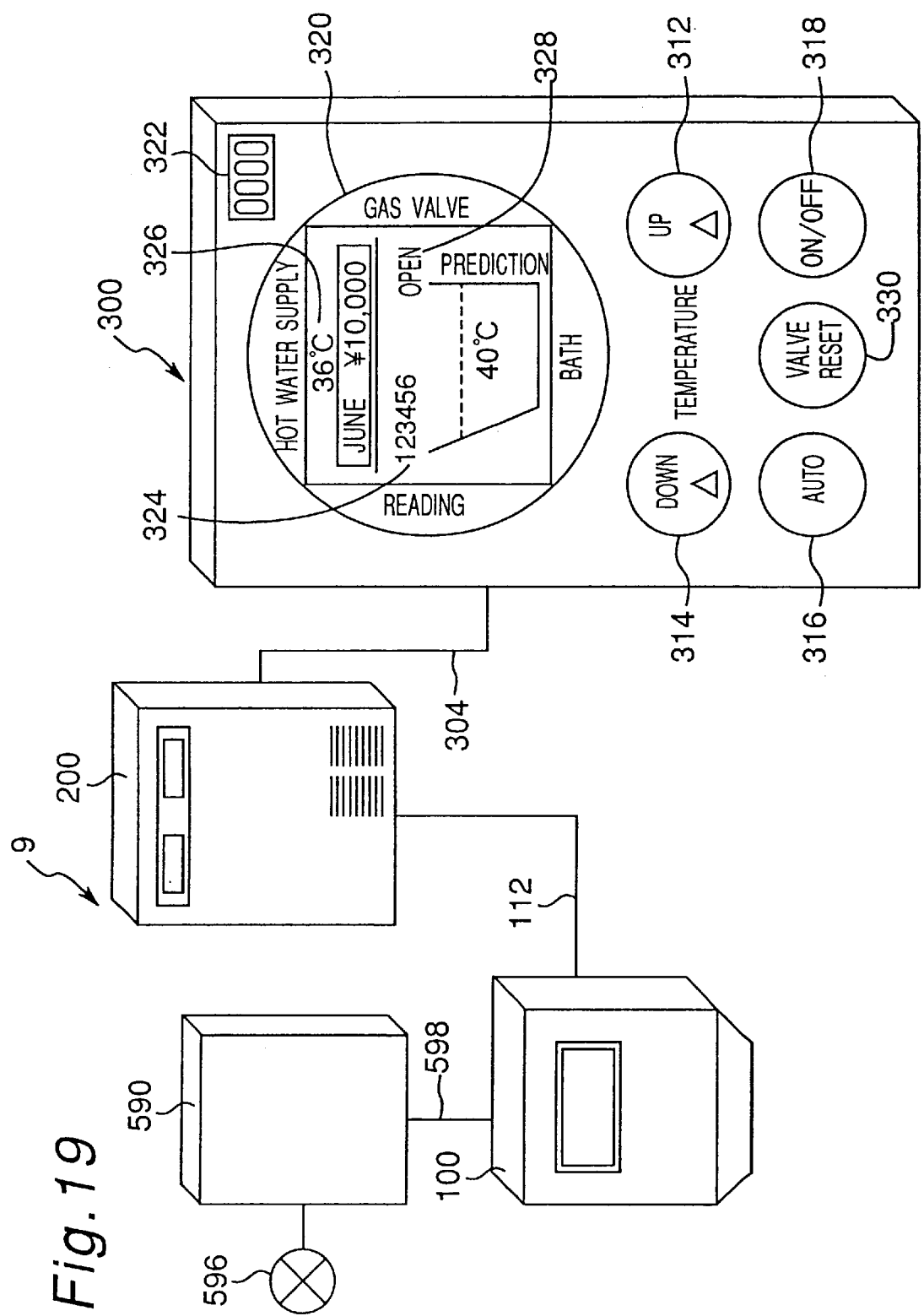
FIG. 19 is a perspective view of a gas safety control system according to a tenth embodiment of the invention.
Figure 20:
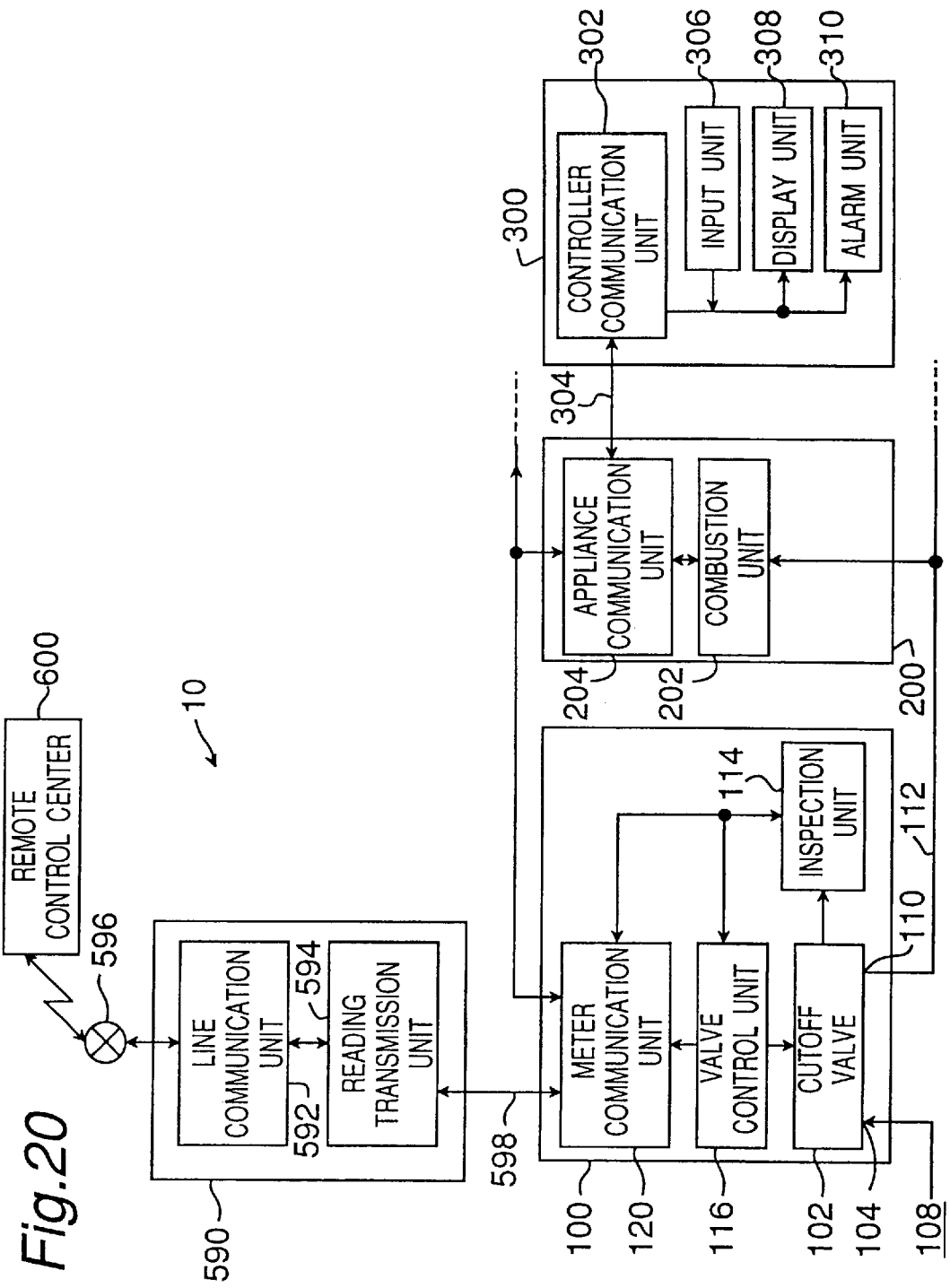
FIG. 20 is a block diagram of the gas safety control system shown in FIG. 19.

FIG. 19 is a perspective view of a gas safety control system according to Embodiment 10 of the invention, and FIG. 20 is a block diagram of the system, wherein the gas safety control system indicated as a whole by numeral 10 includes a controller 300 added to the gas safety control system 9 according to the ninth embodiment, and communication units of different apparatuses are connected with each other by means of appropriate communication media, respectively. However, a gas appliance 200 has no combustion disabling unit, and a combustion unit 202 is switched to a combustion disabled state by operation at the controller 300 when such abnormal condition as gas leakage is detected by a meter 100. In the embodiment, although the controller 300 is connected for communication with the gas appliance 200, it may be connected for communication with the inspection meter and a terminal network controller 590 instead. Thus, according to the gas safety control system 10, because an operating state of the meter is displayed by the controller, a user can recognize an abnormality in the system at sight, and also reset the gas appliance after the abnormal condition is removed.

Alternatively, a controller communication unit 302 may be allowed to communicate with a meter communication unit 120, and the controller communication unit 320 with an appliance communication unit 204, while communication between the meter communication unit 120 and appliance communication unit 204 is achieved through the controller communication unit 302.

(11) Embodiment 11

Figure 21:
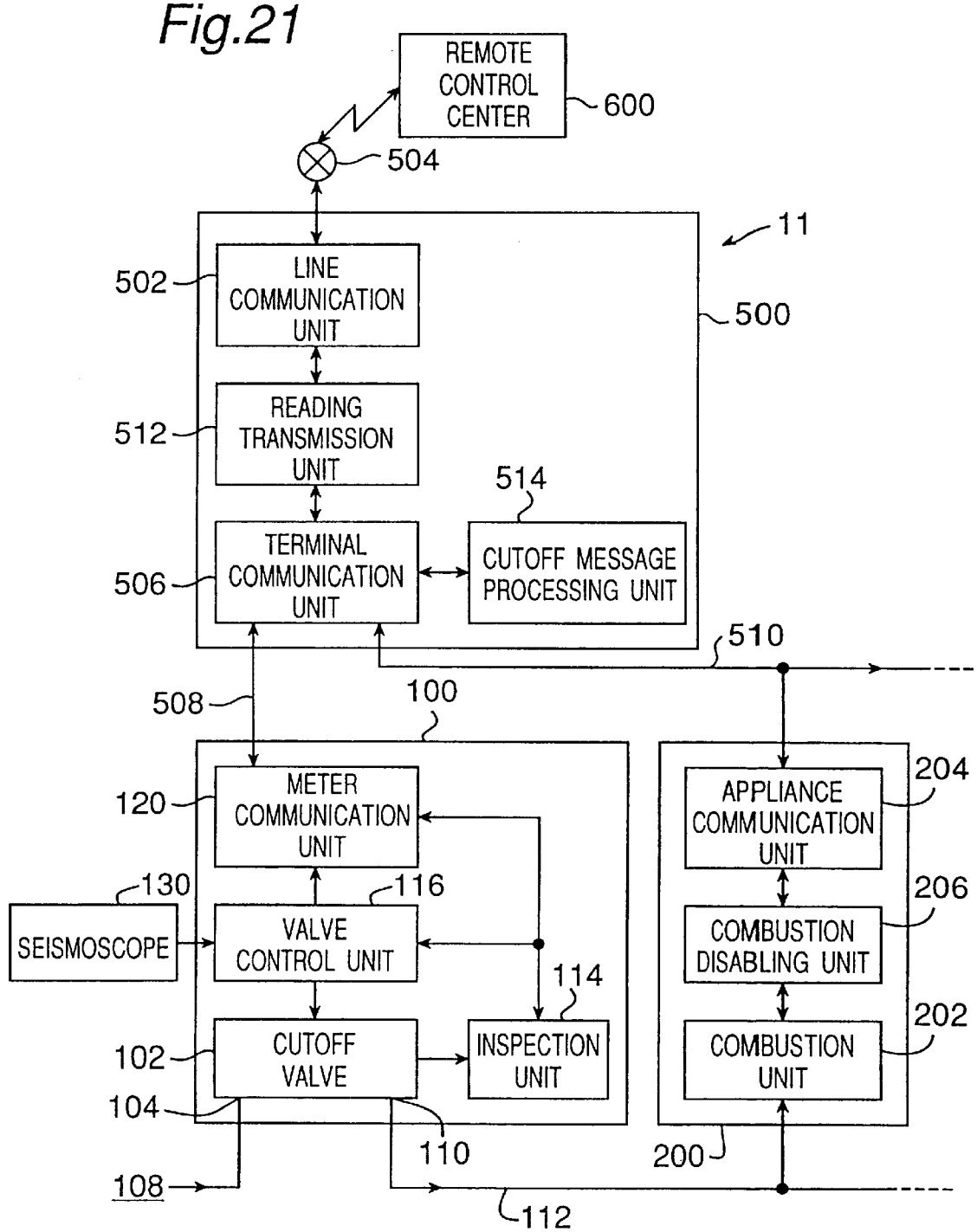
FIG. 21 is a block diagram of a gas safety control system according to an eleventh embodiment of the invention.

FIG. 21 is a block diagram of a gas safety control system according to Embodiment 11 of the invention, wherein the gas safety control system shown as a whole by numeral 11 is a modification of the system according to the fifth embodiment, and a seismoscope 130 for sensing such vibration as that of earthquake is additionally provided in an inspection meter 100. In the gas safety control system 11, when a vibration is detected by the seismoscope 130, the seismoscopic information is sent to a valve control unit 116. The valve control unit 116 determines a seismic intensity from the seismoscopic information, closes a cutoff valve 102 when the seismic intensity is equal to or higher than a predetermined level, prepares cutoff information for a gas appliance connected to the meter 100, and transmits the cutoff information through a meter communication unit 120 to a terminal network controller 500. The terminal network controller 500 prepares a cutoff message consistent with a communication mode of the gas appliance 200 according to the cutoff information, and sends it to the gas appliance 200. In the gas appliance 200, a combustion disabling unit 206 is activated in response to the cutoff message, and a combustion unit 202 is switched to a combustion disabled state, if it is in combustion enabled state. As exchange of reading information between a remote control center 600 and the meter 100 is achieved in a manner similar to that in the fifth embodiment, it is not described further in detail.

A message from the meter communication unit 120 may be communicated directly for direct transmission to an appliance communication unit 204 without the intermediary of a cutoff message processing unit 514.

According to the gas safety control system 11, because a gas appliance in a combustion enabled state can be automatically switched to a combustion disabled state in the event of an earthquake, an accidental fire due to the earthquake can be prevented.

In other embodiments described above and below, a seismoscope may be also employed as means for detecting an abnormality. The seismoscope may be provided either in gas appliances, relay unit or terminal control unit.

(12) Embodiment 12

Figure 22:
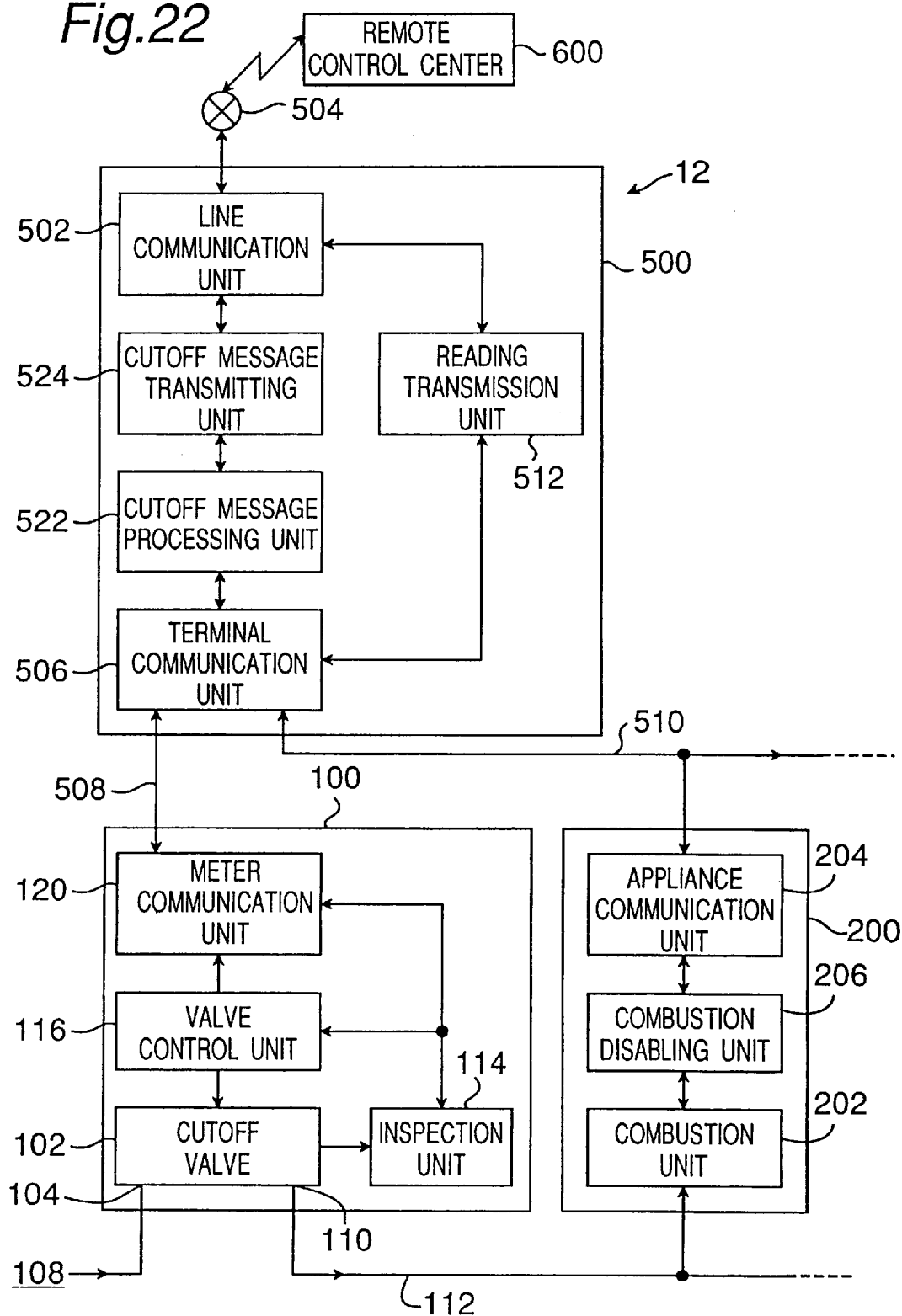
FIG. 22 is a block diagram of a gas safety control system according to a twelfth embodiment of the invention.

FIG. 22 is a block diagram of a gas safety control system according to Embodiment 12 of the invention, wherein the gas safety control system depicted as a whole by numeral 12 is characterized in that a terminal network controller 500 is provided with a cutoff message processing unit 522 and a cutoff message transmitting unit 524 between a terminal communication unit and a line communication unit 502.

In the gas safety control system 12, when such abnormality as gas leakage and abnormal combustion is detected by an inspection meter 100, a valve control unit 116 actuates a cutoff valve 102 to cut off supply of the gas to a gas appliance 200. A signal for closing the cutoff valve 102 is transmitted to the gas appliance 200 through the terminal communication unit 506, and serves for switching a combustion unit 202 to a combustion disabled state, if it is in a combustion enabled state. Information indicating the closure of cutoff valve 102 is converted by the cutoff message processing unit 522 to a form suitable for transmission through a communication medium 504, then transmitted to a remote control center 600 through the cutoff information transmitting unit 524, line communication unit 502 and communication medium 504. Thus, because an immediate action can be taken at the remote control center 600 in response to the information received from the system 12, a further accident can be prevented.

Similarly, an operating state of the gas appliance 200 may be also informed of to the remote control center 600, and a transmission enabling switch may be provided in the controller 300 shown in the other embodiments, so that transmission to the remote control center 600 is enabled by pressing the switch.

(13) Embodiment 13

Figure 23:
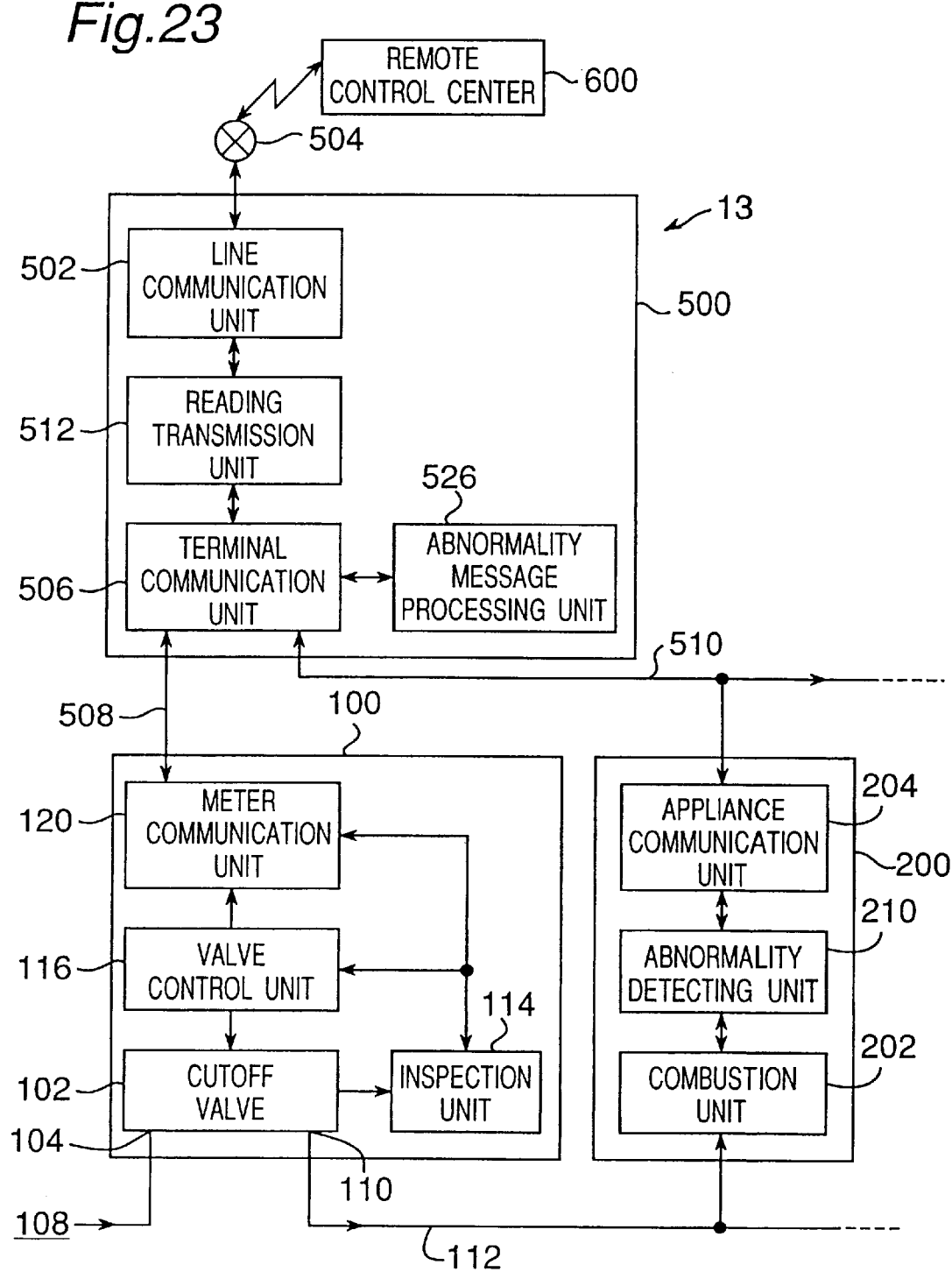
FIG. 23 is a block diagram of a gas safety control system according to a thirteenth embodiment of the invention.

FIG. 23 is a block diagram of a gas safety control system according to Embodiment 13 of the invention, wherein the gas safety control system shown as a whole by numeral 13 is characterized in that a gas appliance 200 is provided with an abnormality detecting unit 210 for detecting such abnormality as gas leakage. A terminal network controller 500 is provided with an abnormality message processing unit 526 which is adapted to communicate with a terminal communication unit 506.

According to the gas safety control system 13, when such abnormality as gas leakage and abnormal combustion is caused in the gas appliance, information on the abnormality is transmitted to the terminal network controller 500. The terminal network controller 500 prepares an abnormality message in the abnormality message processing unit 526, and outputs it to an inspection meter 100. In the inspection meter 100, a valve control unit 116 is activated in response to the abnormality message, and actuates a cutoff valve 104 to cut off supply of the gas to the gas appliance 200. In the other embodiments described above and below, means for detecting an abnormality in a gas appliance may be provided for actuating the cutoff valve in the inspection meter.

A message from an appliance communication unit 204 may be communicated to a meter communication unit 120 through the terminal communication unit 506 by direct transmission without the intermediary of the abnormality message processing unit 526.

(14) Embodiment 14

Figure 24:
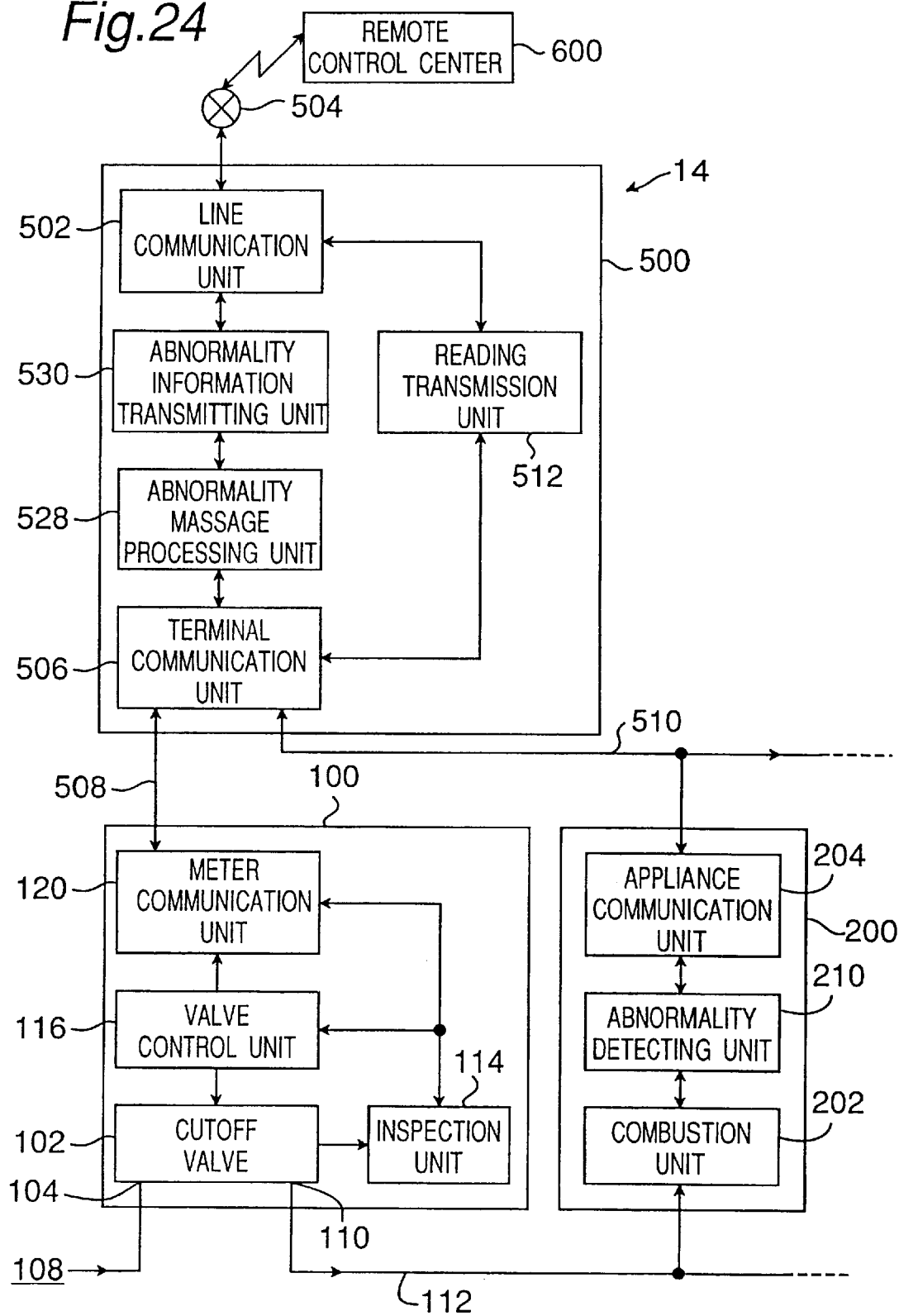
FIG. 24 is a block diagram of a gas safety control system according to a fourteenth embodiment of the invention.

FIG. 24 is a block diagram of a gas safety control system according to Embodiment 14 of the invention, wherein the gas safety control system referred to as a whole by numeral 14 is characterized in that a gas appliance 200 is provided with an abnormality detecting unit 210 for detecting such abnormality as gas leakage. A terminal network controller 500 is provided with an abnormality message processing unit 528 and an abnormality information transmitting unit 530 between a terminal communication unit 506 and a line communication unit 502. According to the gas safety control system, when such abnormality as gas leakage and abnormal condition is caused in the gas appliance 200, information of the abnormality is transmitted to the terminal network controller 500. The terminal network controller prepares an abnormality message in the abnormality message processing unit 528, and applies it to an inspection meter 100. In the inspection meter 100, a valve control unit 116 is activated in response to the abnormality message, and actuates a cutoff valve 102 for cutting off supply of the gas to the gas appliances 200. On the other hand, the abnormality message is transmitted to a remote control center 600 through the abnormality information transmitting unit 530, a line communication unit 502 and a communication medium 504. Thus, an immediate action can be taken in the remote control center 600 upon receipt of the information transmitted from the system 14, and a further accident can be, therefore, prevented.

Information transmitted from an appliance communication unit 204 may be applied to the communication medium 504 without the intermediary of the abnormality message processing unit 528.

Also, a transmission enabling switch may be provided in the controller 300 shown in the other embodiments so that transmission to the remote control center 600 is enabled by pressing the switch.

(15) Embodiment 15

Figure 25:
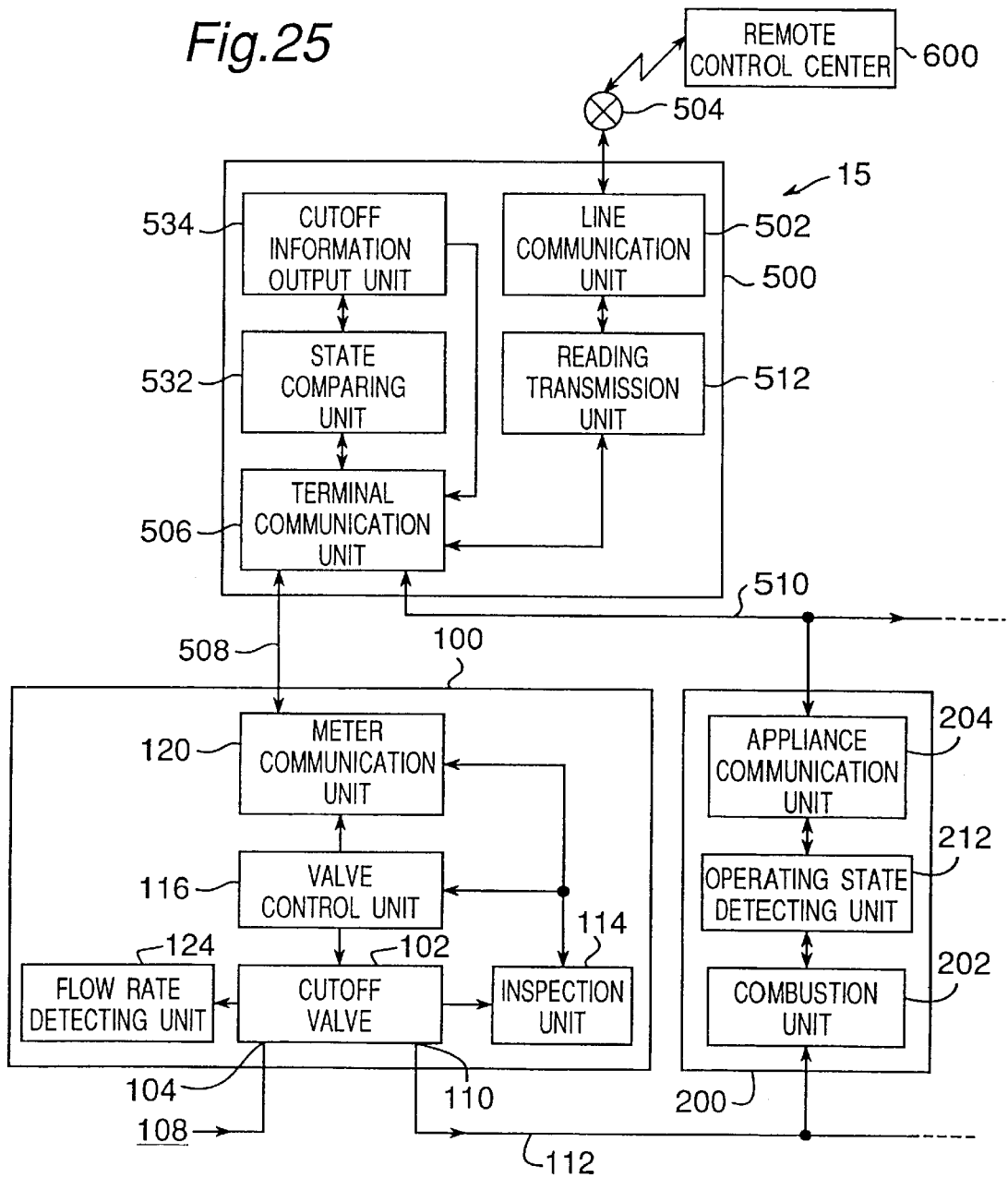
FIG. 25 is a block diagram of a gas safety control system according to a fifteenth embodiment of the invention.

FIG. 25 is a block diagram of a gas safety control system according to Embodiment 15 of the invention, wherein the gas safety control system indicated as a whole by numeral 15 is characterized in that an inspection meter 100 is provided with a flow rate detecting unit 124 for measuring a current flow rate of gas that passes through a cutoff valve 102. A gas appliance 200 is provided with an operating state detecting unit 212 for detecting whether a combustion unit 202 is in a combustion enabled or disabled state. A terminal network controller 500 is provided with a state comparing unit 532 for comparing a signal from the flow rate detecting unit 124 with a signal from the operating state detecting unit 212 to determine whether the gas is flowing or not, nevertheless all gas appliances 200 are in the combustion disabled state, and a cutoff information output unit 534 for preparing and outputting a cutoff enabling signal for a cutoff valve according to a result of the comparison by the state comparing unit 532.

In the gas safety control system 15, the flow rate detecting unit 124 determines whether the gas is flowing through the cutoff valve 102 or not, and a result of the determination is outputted to the terminal network controller 500. In the gas appliance, on the other hand, the operating state detecting unit 212 determines whether a combustion unit 202 is in a combustion enabled state or not, and a result of the determination is outputted to the terminal network controller 500. The outputs are compared with each other in the state comparing unit 532, and it is determined whether the gas is flowing through the cutoff valve 102 or not, although no gas is consumed by any of the gas appliances 200, that is, whether gas leakage is caused in any part of the system 15 or not. Then, if it is determined that gas leakage is present, the cutoff information output unit 534 transmits valve cutoff information to the inspection meter 100 through the terminal communication unit 506. In the inspection meter, a valve control unit 116 is activated in response to the valve cutoff information to actuate the cutoff valve for cutting off supply of the gas to the gas appliances 200.

The state comparing unit and cutoff information output unit may be provided in any apparatus except the terminal network controller, for example, either in the inspection meter, gas appliance or relay unit.

(16) Embodiment 16

Figure 26:
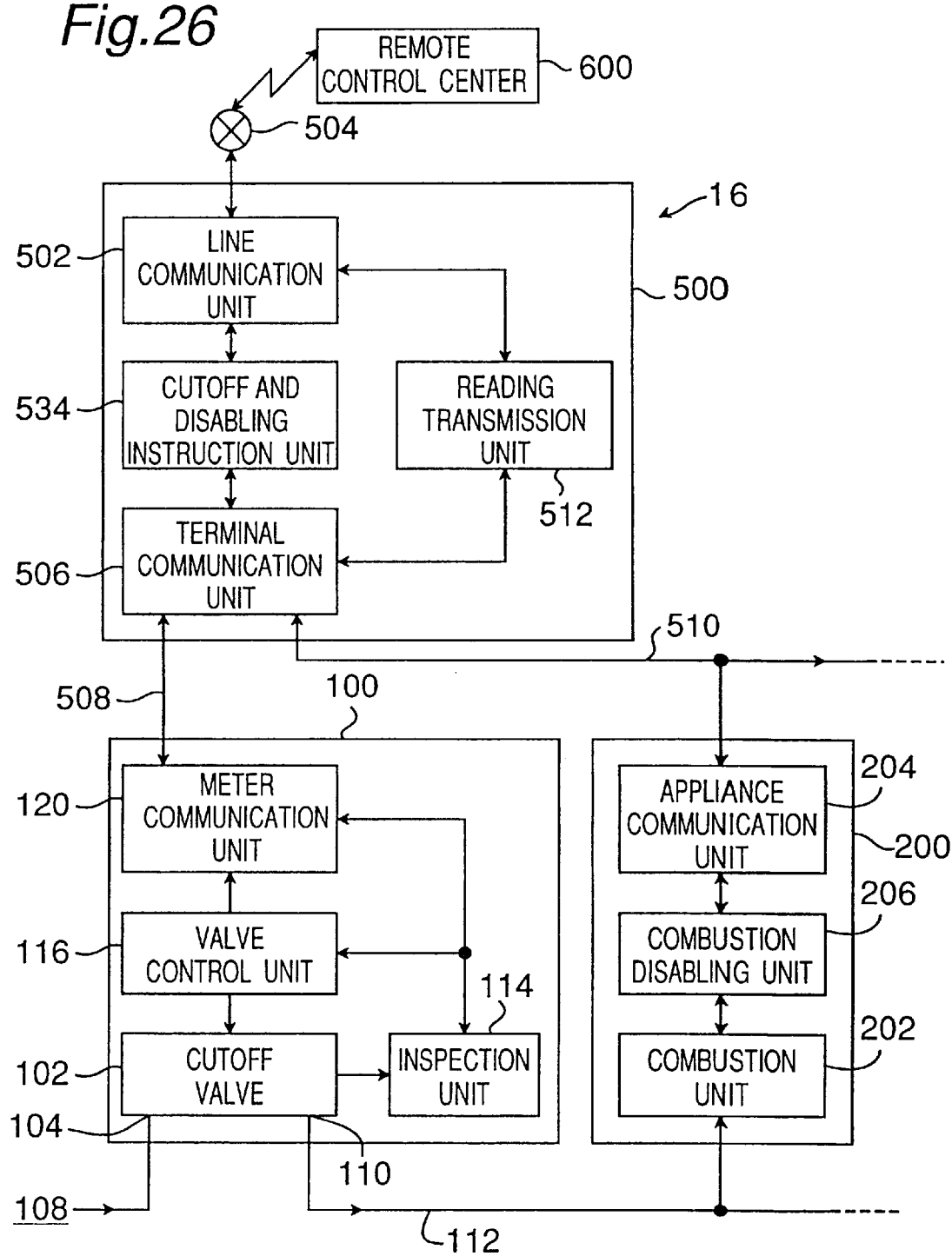
FIG. 26 is a block diagram of a gas safety control system according to a sixteenth embodiment of the invention.

FIG. 26 is a block diagram of a gas safety control system according to Embodiment 16 of the invention, wherein the gas safety control system shown as a whole by numeral 16 is characterized in that a terminal network controller 500 is provided between a line communication unit 502 and a terminal communication unit 506 with a cutoff and disabling instruction unit 534 for processing a cutoff command to a cutoff valve 102, which is outputted from a remote control center 600.

In the gas safety control system 16, when a valve closing instruction for closing the cutoff valve 102 is outputted from the remote control center 600, the signal is applied to the terminal network controller 500 through a communication medium 504, and processed by the cutoff and disabling instruction unit 534. The signal processed is transferred to an inspection meter 100 and a gas appliance 200. The inspection meter 100 allows a valve control unit 116 to be activated upon receipt of the signal for closing the cutoff valve 104. On the other hand, the gas appliance 200 allows a combustion disabling unit 206 to be activated upon receipt of the signal for switching a combustion unit 202 to a combustion disabled state, if it is in a combustion enabled state.

Although it has been described that combustion is disabled by the combustion disabling unit 206 in response to a disabling signal outputted from the terminal network controller 500, in a system including a controller 300, the disabling signal may be applied to the controller 300, so that the gas appliance 200 is switched to a combustion disabled state by means of a signal from the controller 300.

Further, the valve cutoff instruction from the remote control center may be directly transmitted to the inspection meter and gas appliance without the intermediary of the cutoff and disabling instruction unit 534.

(17) Embodiment 17

Figure 27:
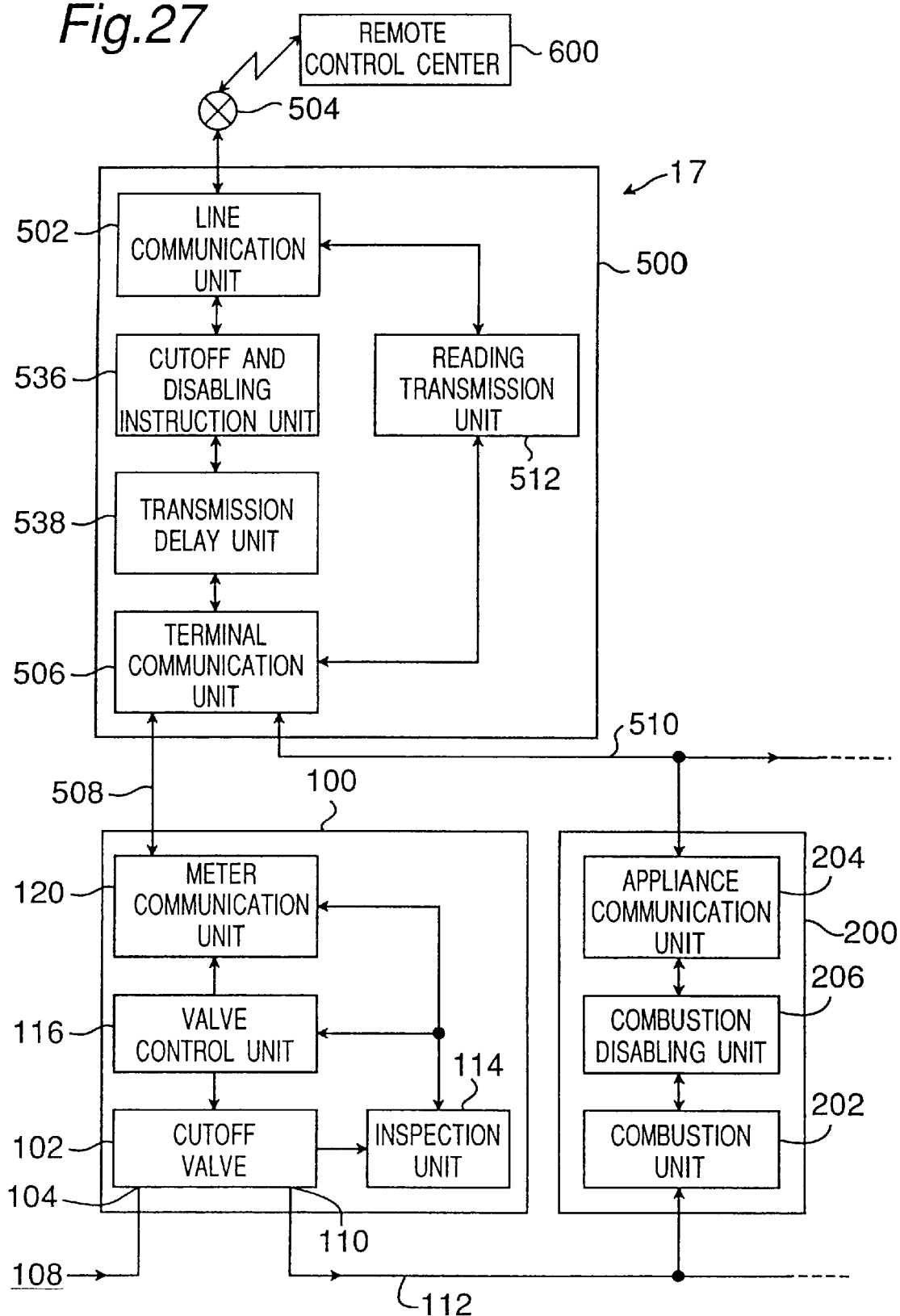
FIG. 27 is a block diagram of a gas safety control system according to a seventeenth embodiment of the invention.

FIG. 27 is a block diagram of a gas safety control system according to Embodiment 17 of the invention, wherein the gas safety control system referred to as a whole by numeral 17 is characterized in that a terminal network controller 500 is provided with a cutoff and disabling instruction unit 536 and a transmission delay unit 538 between a line communication unit 502 and a terminal communication unit 506.

In the gas safety control system 17, after a command signal is outputted from a remote control center 600 for closing a cutoff valve 102 and setting a gas appliance 200 to a combustion disabled state, the command signal is processed by the cutoff and disabling instruction means 536, then a gas appliance disabling signal is first outputted from the transmission delay unit 538 for switching the gas appliance 200 to a combustion disabled state, whereby a combustion disabling unit 206 in the gas appliance 200 is activated, and switches a combustion unit 202 to a combustion disabled state. Then, after a predetermined time, the transmission delay unit 538 outputs a cutoff signal for closing the cutoff valve 102, and the cutoff valve in the inspection meter 100 is thereby switched to a closed state. Thus, according to the system 17, the gas appliance 200 can be prevented from being in such abnormal state as cutoff of gas supply.

Although it has been described that combustion is disabled by the combustion disabling unit 206 in response to a gas appliance disabling signal outputted from the terminal network controller 500, in a system including a controller 300, the disabling signal may be applied to the controller 300, so that the gas appliance is switched to a combustion disabled state by means of a signal from the controller 300.

(18) Embodiment 18

Figure 28:
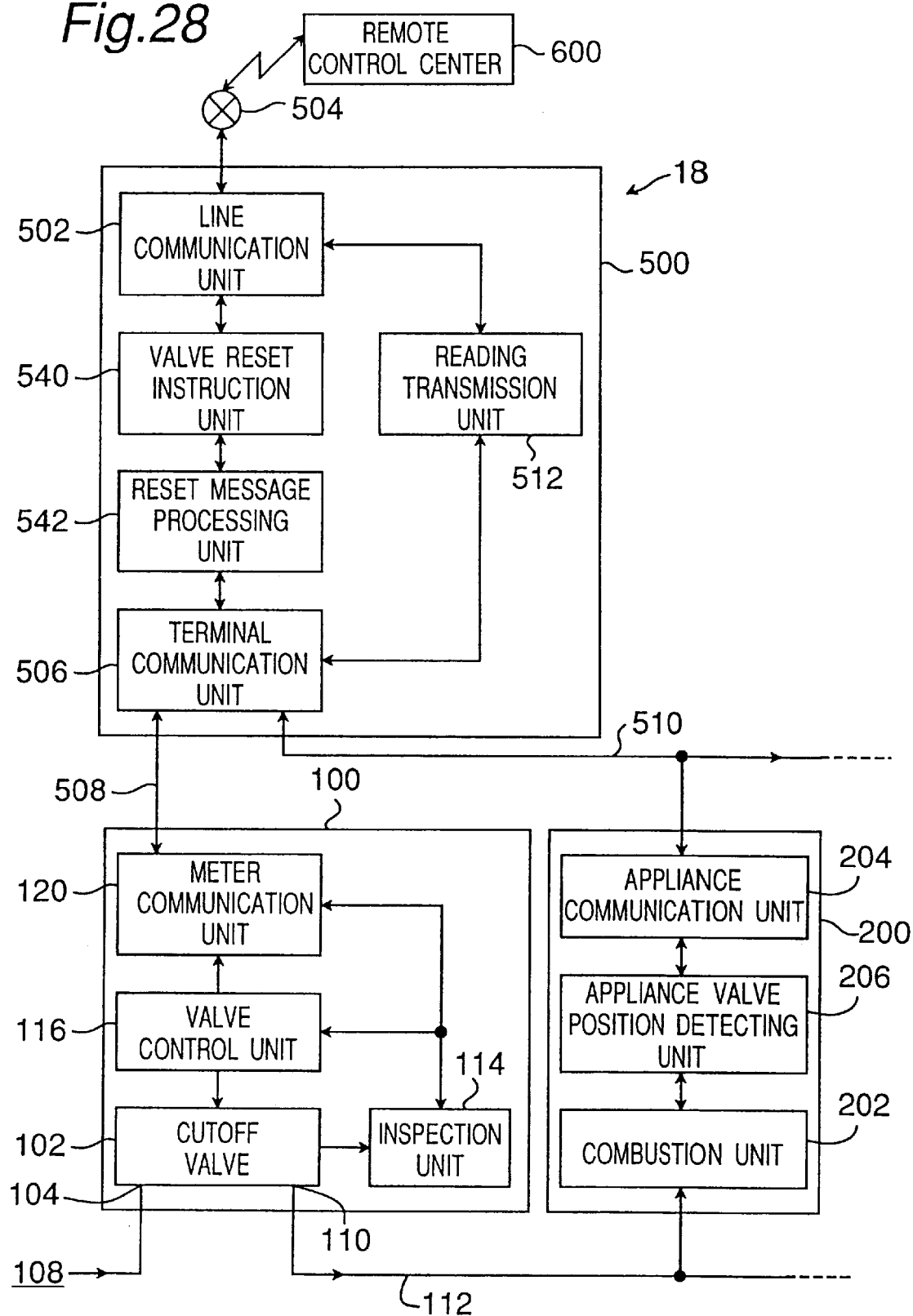
FIG. 28 is a block diagram of a gas safety control system according to an eighteenth embodiment of the invention.

FIG. 28 is a block diagram of a gas safety control system according to Embodiment 18 of the invention, wherein the gas safety control system depicted as a whole by numeral 18 is characterized in that a terminal network controller 500 is provided with a valve reset instruction unit 540 for processing an instruction that effects to activate a valve control unit 116 in an inspection meter 100 for returning a cutoff valve 102 to an open position and a reset message processing unit 542 for preparing a message for the valve reset instruction. On the other hand, a gas appliance is provided with an appliance valve position detecting unit 212 for detecting whether a valve in a combustion unit 202 is in an open position or closed position.

In the gas safety control system 18, when a command for opening (resetting) the cutoff valve 102 in the inspection meter is transmitted, for example, from a remote control center 600 to the terminal network controller 500, the valve reset instruction unit 540 in the terminal network controller 500 processes the reset instruction. Then, according to information outputted from the appliance valve position detecting unit 212, that is, information of whether the valve in the combustion unit 202 is open or closed, the reset message processing unit 542 ignores the reset command, if the valve in the combustion unit 202 is open, or outputs a reset message to the inspection meter 100, if the valve in the combustion unit 202 is closed. Then, the inspection meter 100 allows the valve control unit 116 to open the cutoff valve 102 upon receipt of the reset message.

Although it has been described that the cutoff valve 102 in the inspection meter is resetted (that is, opened) in response to the command from the remote control center 600, in a system including a controller 300, a command for resetting the cutoff valve may be outputted from the controller 300. Further, it is not required to provide means for determining whether the cutoff valve should be resetted or not in the terminal network controller, and the determination means may be provided in a relay unit or controller in the case of a system including a relay unit or controller.

Thus, according to the gas safety control system of the embodiment, because it is first determined whether a gas valve in the gas appliance is closed or not, and the cutoff valve in the inspection meter is opened after closure of the gas valve is confirmed, when a command for opening the cutoff valve in the inspection meter is applied after inspection of the system or repair or inspection of the gas appliance, gas leakage from the gas appliance cannot be caused due to inadvertent opening of the gas cutoff valve in the inspection meter.

(19) Embodiment 19

Figure 29:
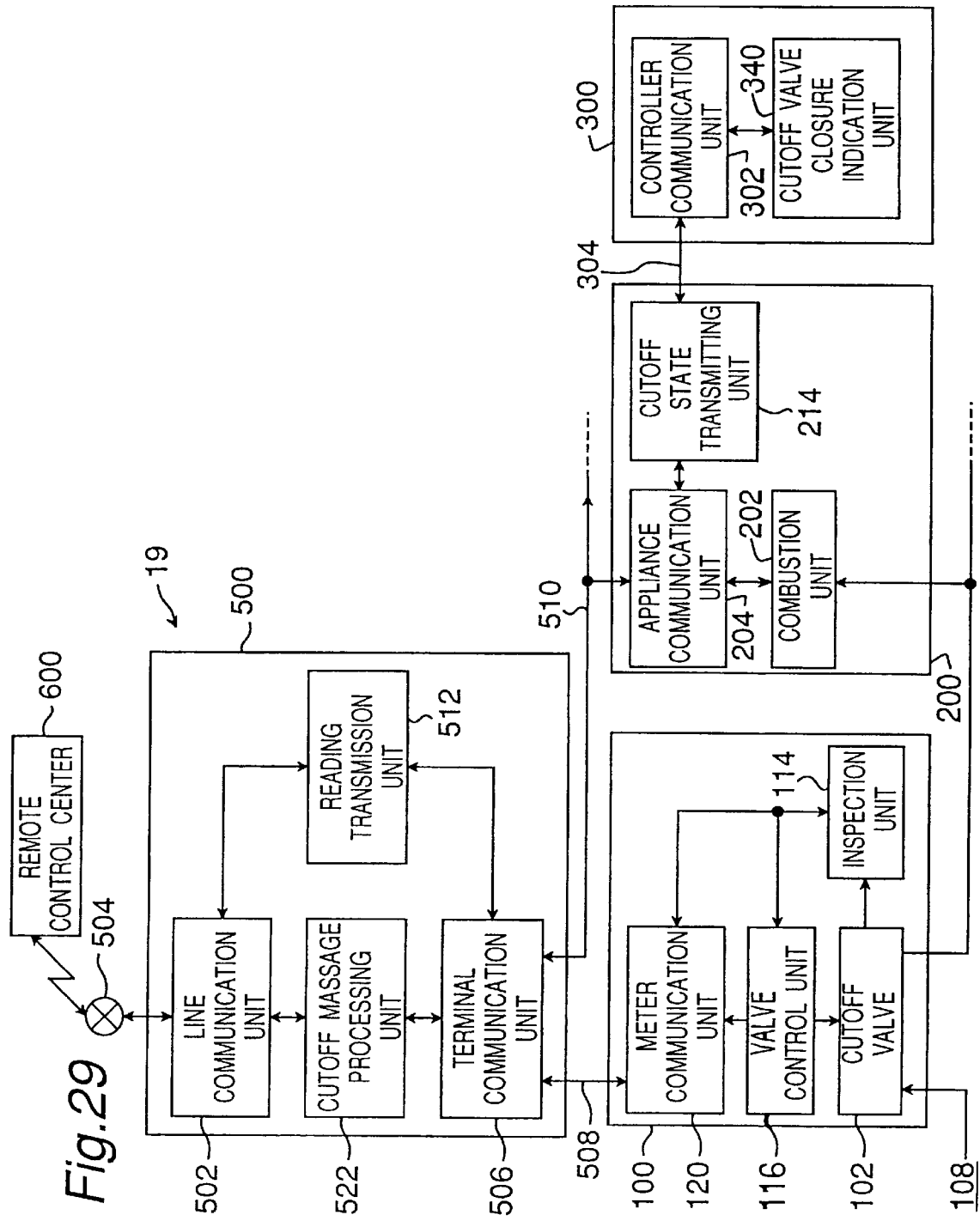
FIG. 29 is a block diagram of a gas safety control system according to a nineteenth embodiment of the invention.

FIG. 29 is a block diagram of a gas safety control system according to Embodiment 19 of the invention, wherein the gas safety control system represented as a whole by numeral 19 is characterized in that a gas appliance 200 is provided with a cutoff state transmitting unit 214. Further in a controller 300, an indication unit 340 for indicating closure of a cutoff valve 102 in the inspection meter 100 is employed. In the gas safety control system 19, when such abnormality as gas leakage or abnormal flow rate is detected by the inspection meter, the information is inputted to a terminal network controller 500, and a cutoff signal is generated by a cutoff message processing unit 522. The cutoff signal is sent to the controller 300 from a terminal communication unit 506 through an appliance communication unit 204 in the gas appliance and the cutoff message transmitting unit 214, and displayed by the cutoff valve closure indication unit 340, whereby a user can be informed of closure of the cutoff valve in the inspection meter 100.

A combustion disabling unit 212 in the gas appliance 200 may be activated in response to the cutoff signal for switching a combustion unit 202 to a combustion disabled state, if it is in a combustion enabled state. Also, the cutoff signal may be transmitted through a communication medium 504 to a remote control center 60, or cutoff information with respect to the cutoff valve may be displayed in the controller 300 according to an instruction from the remote control center 600.

(20) Embodiment 20

Figure 30:
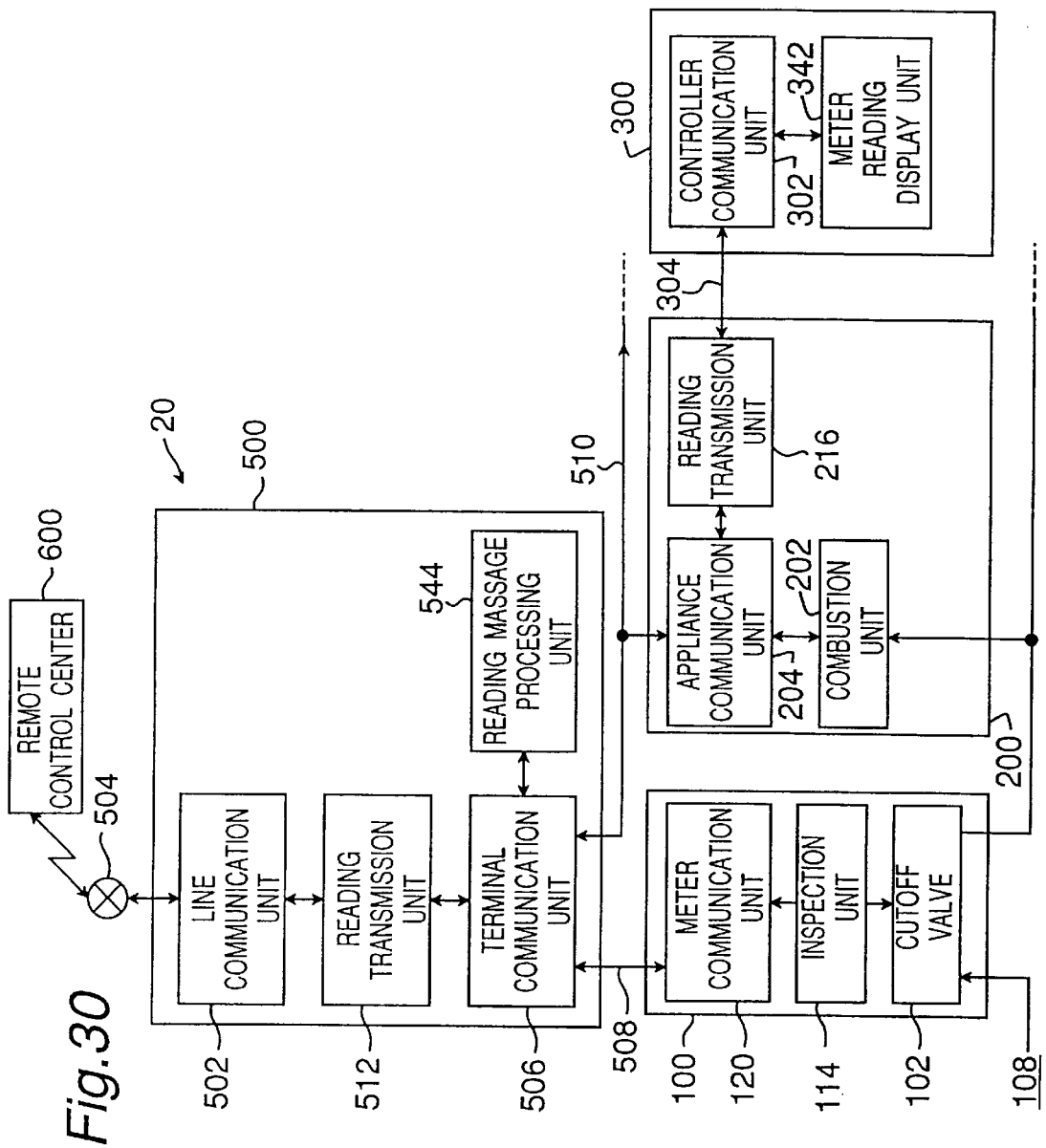
FIG. 30 is a block diagram of a gas safety control system according to a twentieth embodiment of the invention.

FIG. 30 is a block diagram of a gas safety control system according to Embodiment 20 of the invention, wherein the gas safety control system referred to as a whole by numeral 20 is characterized in that a terminal network controller 500 is provided with a reading message processing unit 544, a gas appliance 200 with a meter reading transmission unit 216, and a controller 300 with a meter reading display unit 342. In the gas safety control system, a meter reading obtained at an inspection unit 114 in an inspection meter 100 is transmitted to a remote control center 600 through the terminal network controller 500. The reading message processing unit 544 prepares a reading message according to the meter reading, and transfers it through an appliance communication unit 204 in the gas appliance 200 and the reading transmission unit 216 to the controller 300 so that the meter reading is displayed by the meter reading display unit 342. As a result, a user can check a consumption of gas from the meter reading displayed in the controller 300.

Provision of the display unit for the meter reading is not limited to the controller 300, and it may be provided either in the gas appliance 200, relay unit 40 or terminal network controller 500 instead.

(21) Embodiment 21

Figure 31:
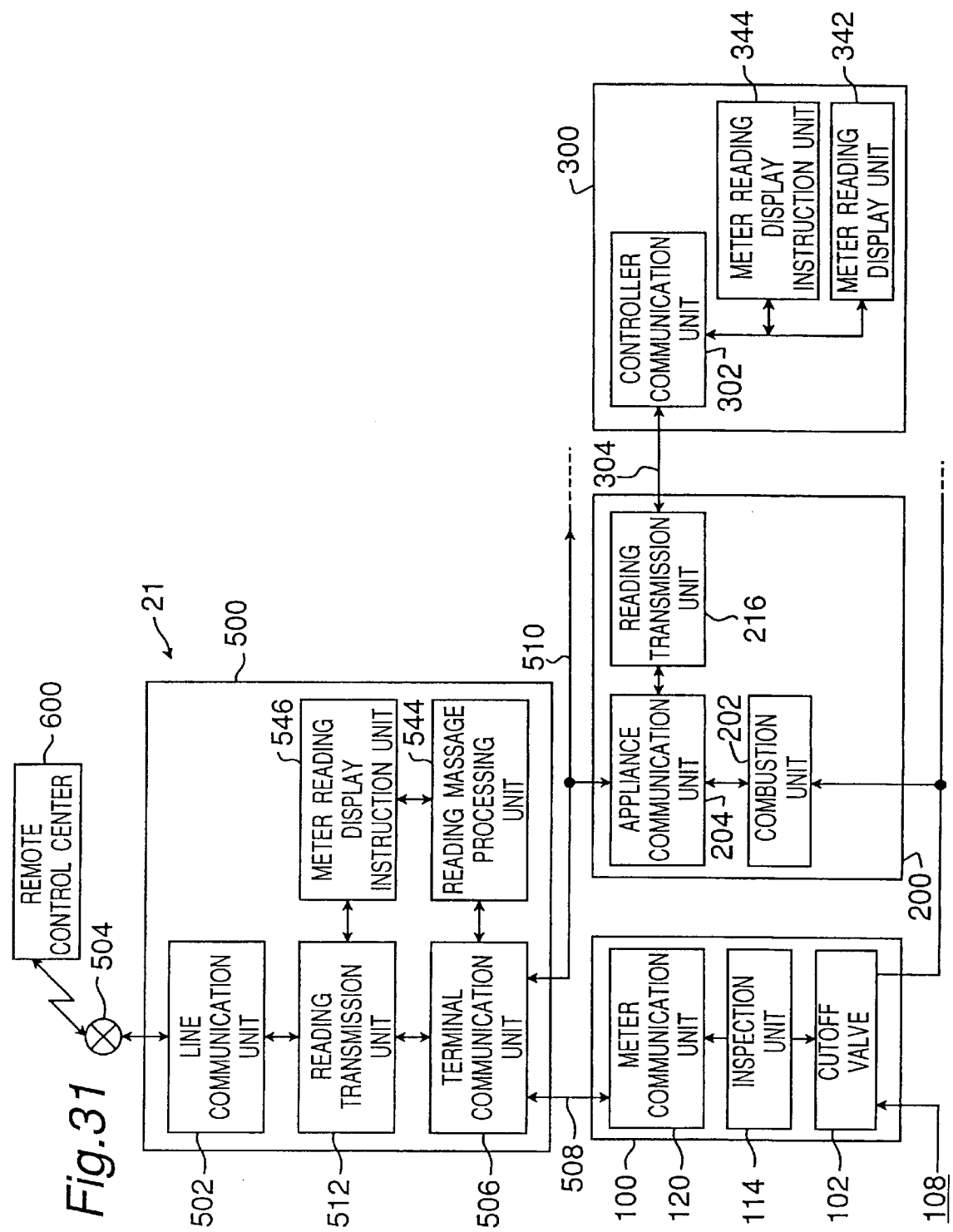
FIG. 31 is a block diagram of a gas safety control system according to a twenty-first embodiment of the invention.

FIG. 31 is a block diagram of a gas safety control system according to Embodiment 21 of the invention, wherein the gas safety control system shown as a whole by numeral 21 is characterized in that a terminal network controller 500 is provided with a reading message processing unit 544 and a meter reading display instruction unit 546, and a gas appliance 200 with a meter reading transmission unit 216. Further, a controller 300 is provided with a meter reading display unit 342 and a meter reading display instruction unit 344. In the gas safety control system 21, when display of a meter reading is requested from the meter reading display instruction unit 344 in the controller 300, the request is transmitted through a controller communication unit 302, a meter reading transmission unit 216, an appliance communication unit 204 and a terminal network communication unit 506 to the terminal network controller 500. In the terminal network controller 500, in response to the instruction from the meter reading display instruction unit 546, a reading message for displaying the meter reading of an inspection unit 114 is prepared by the reading message processing unit 544. The reading message is transferred through the terminal communication unit 506, appliance communication unit 204, meter reading transmission unit 216 and controller communication unit 302 to the meter reading display unit 342, and the meter reading is displayed by the meter reading display unit 342. The meter reading display request may be outputted from a remote control center 600 so that the meter reading display unit 342 in the controller provides the display in response thereto. Provision of the meter reading display unit and display instruction unit is not limited to the controller 300, and they may be provided either in the gas appliance 200, relay unit 400 or terminal network controller 500 instead.

(22) Embodiment 22

Figure 32:
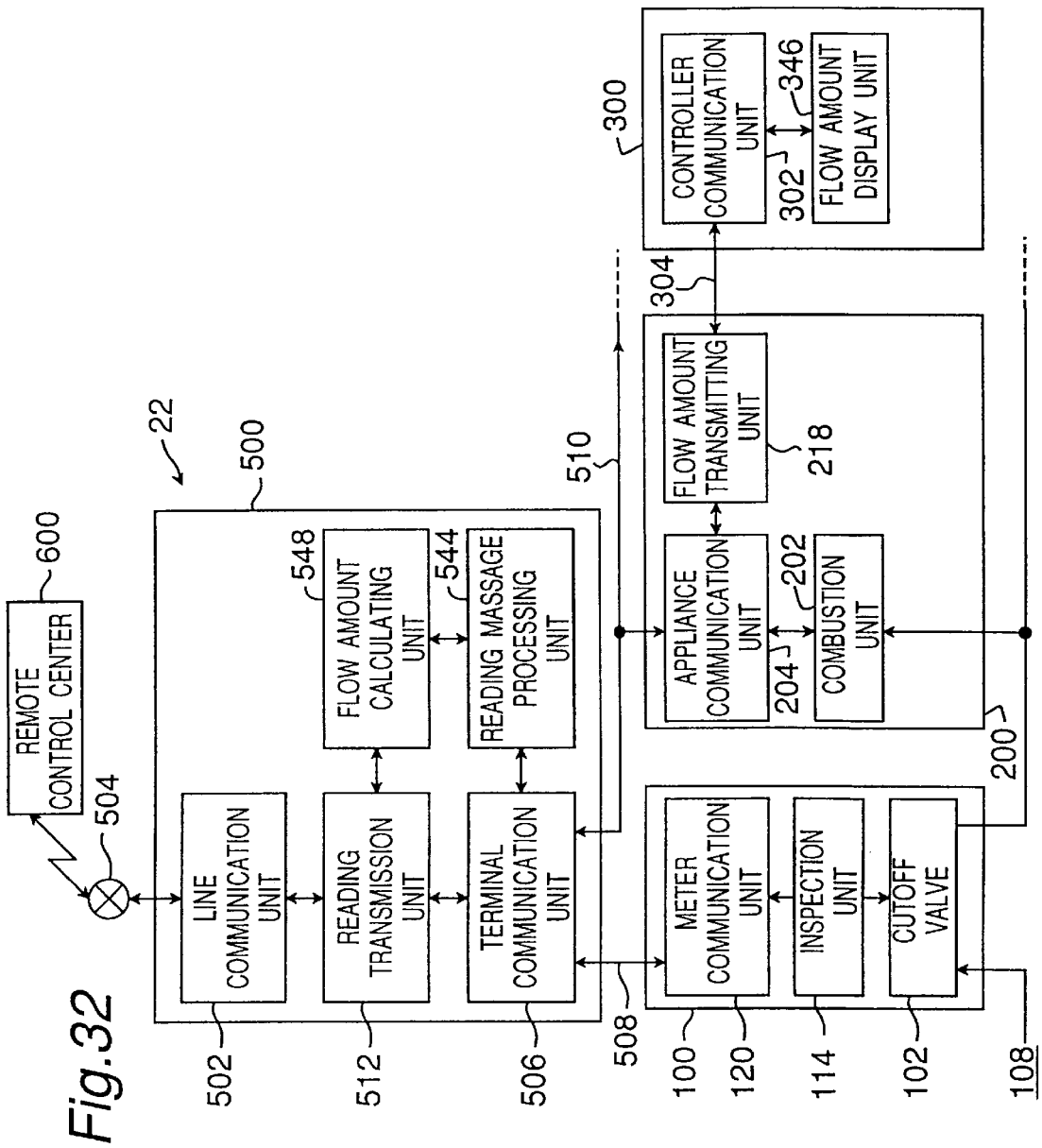
FIG. 32 is a block diagram of a gas safety control system according to a twenty-second embodiment of the invention.

FIG. 32 is a block diagram of a gas safety control system according to Embodiment 22 of the invention, wherein the gas safety control system depicted as a whole by numeral 22 is characterized in that a terminal network controller 500, a gas appliance 200 and a controller 300 are provided with a flow amount calculating unit 548, a flow amount transmitting unit 218 and a flow amount display unit 346, respectively. In the gas safety control system 22, the flow amount calculating unit 548 calculates an amount of flow, that is, a consumption of gas from a predetermined point of time to date. Then, a reading message processing unit 544 prepares a reading message corresponding to the amount of flow calculated, and transmits it through a terminal communication unit 506, an appliance communication unit 204, the flow amount transmitting unit 218 and a controller communication unit 302 to the flow amount display unit 346 so that the amount of flow is displayed by the flow display unit 346. Calculation and display commands for the amount of flow may be outputted at the end of a timed period of a one-month timer that is provided in the flow amount calculating unit 548 or at a predetermined interval in response to a command from the controller 300 or remote control center 600.

(23) Embodiment 23

Figure 33:
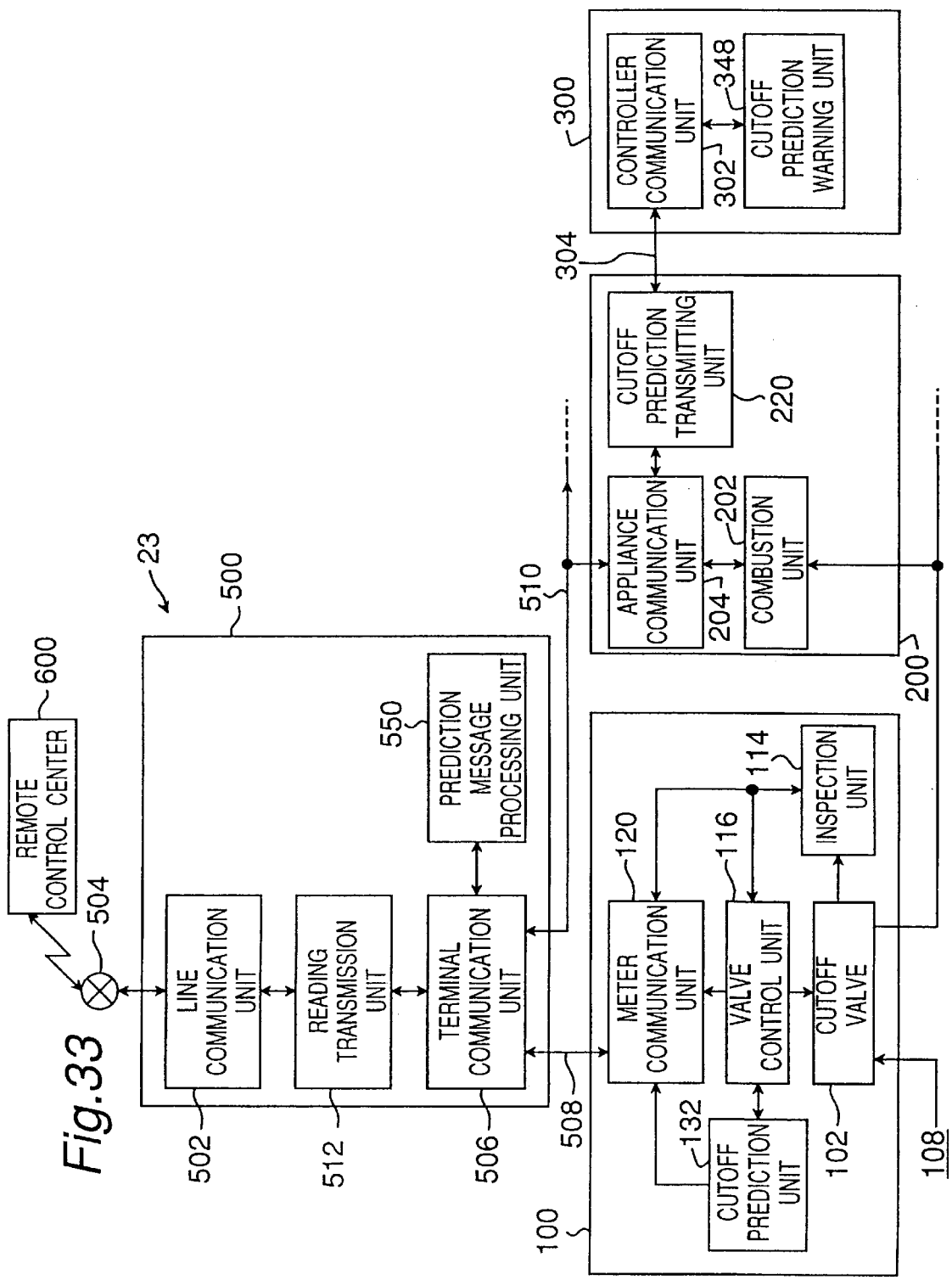
FIG. 33 is a block diagram of a gas safety control system according to a twenty-third embodiment of the invention.

FIG. 33 is a block diagram of a gas safety control system according to Embodiment 23, wherein the gas safety control system referred to as a whole by numeral 23 is characterized in that an inspection meter 100, a gas appliance 200, a controller 300 and a terminal network controller 500 are provided with a cutoff prediction unit 132, a cutoff prediction transmitting unit 220, a cutoff prediction warning unit 348 and a prediction message processing unit 550, respectively. In the gas safety control system 23, when an abnormal flow rate, for example, is detected by an inspection unit 114, a valve control unit 116 outputs a signal to the cutoff prediction unit 132. The cutoff prediction unit 132 prepares cutoff prediction information upon receipt of the signal from the valve control unit 116, and outputs it to the terminal network controller 500 through a meter communication unit 120. Then, the terminal network controller 500 prepares a cutoff prediction message in the cutoff prediction message processing unit 550, and transmits it through a terminal communication unit 506, an appliance communication unit 204, the cutoff prediction transmitting unit 220 and a controller communication unit 302 to the cutoff prediction warning unit 348. Accordingly, the cutoff prediction warning unit 348 gives a warning that a cutoff valve 102 in the inspection meter 100 is to be closed in a predetermined time. Thus, a user can be noticed that the cutoff valve 102 is to be closed in the predetermined time, and confirm whether any abnormality is present in the inspection meter 100 or gas appliance 200 before the time of closure.

The cutoff prediction information from the meter communication unit 120 may be directly sent to the appliance communication unit 204 by direct transmission without the intermediary of the prediction message processing unit 550.

(24) Embodiment 24

Figure 34:
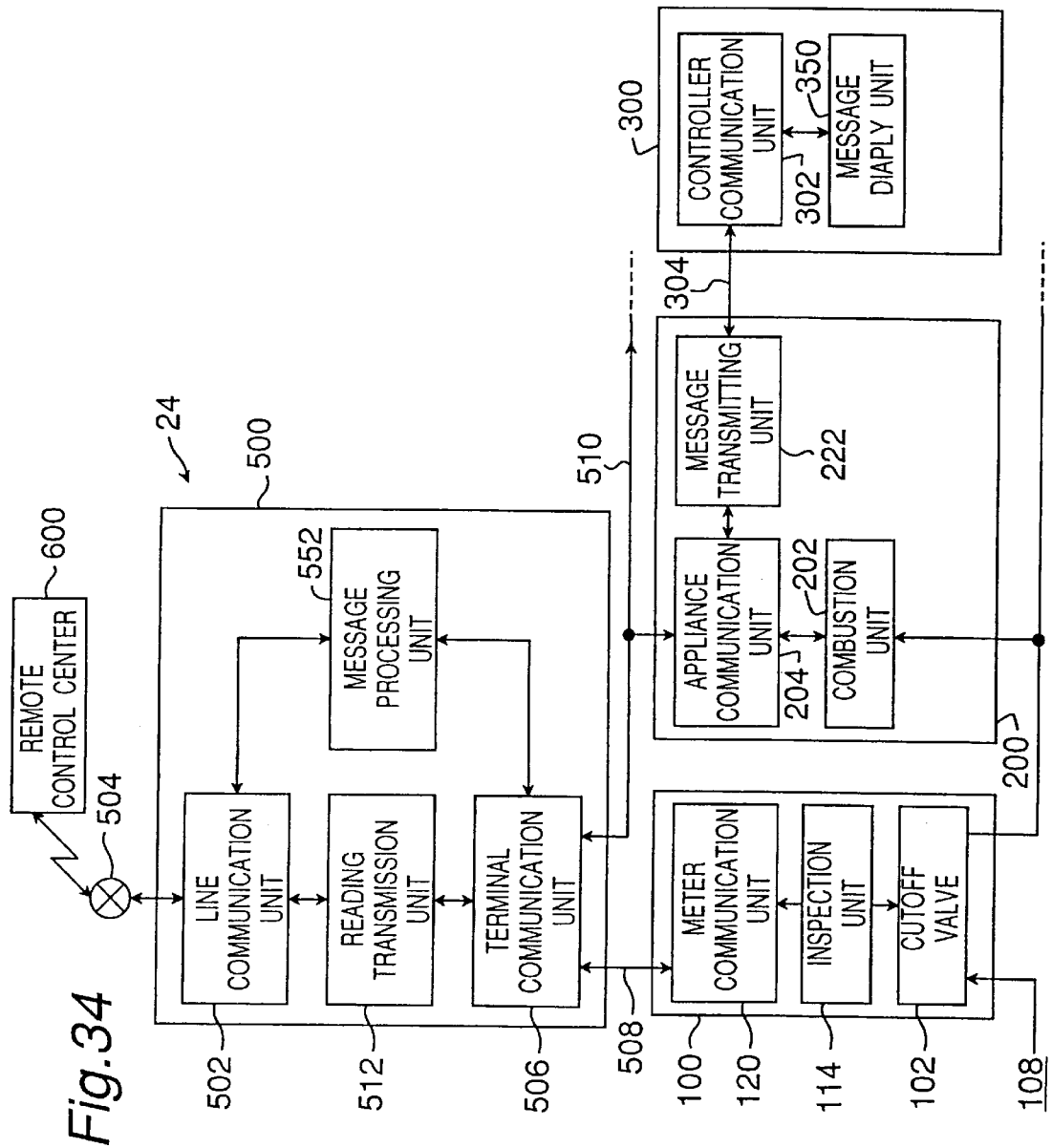
FIG. 34 is a block diagram of a gas safety control system according to a twenty-fourth embodiment of the invention.

FIG. 34 is a block diagram of a gas safety control system according to Embodiment 24 of the invention, wherein the gas safety control system shown as a whole by numeral 24 is characterized in that a gas appliance 200, a controller 300 and a terminal network controller 500 are provided with a message transmitting unit 222, a message display unit 350 and a message processing unit 552, respectively. In the gas safety control system 24, when such message as information on charges for the amount of gas consumed and preliminary notice of gas-related public works is outputted from a remote control center 600, the message information is processed by the message processing unit 552 in the terminal network controller 500. Then, the message information is transferred through a terminal communication unit 506, an appliance communication unit 204, the message transmitting unit 222 and a controller communication unit 302 to the message display unit 350, and the message is displayed by the message display unit 350. Thus, the remote control center 500 can directly inform of details of charges for the amount of gas consumed and preliminary notice of gas-related public works to a user in a swift and reliable manner without need of using such information transmitting means as postal service. On the other hand, a user can obtain such information as details of charges for the gas and preliminary notice of public works from messages displayed by the message display unit 350.

(25) Embodiment 25

Figure 35:
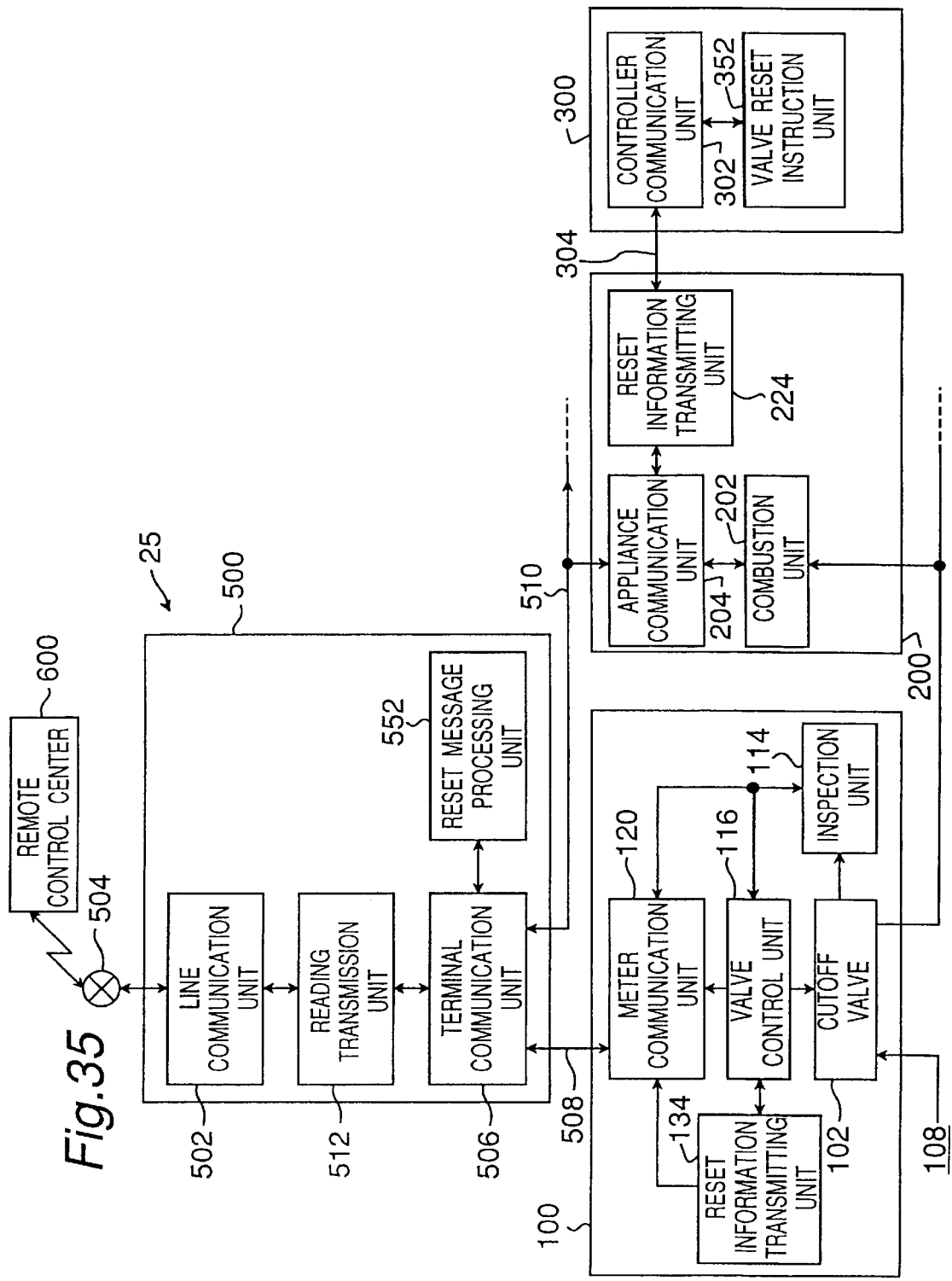
FIG. 35 is a block diagram of a gas safety control system according to a twenty-fifth embodiment of the invention.

FIG. 35 is a block diagram of a gas safety control system according to Embodiment 25 of the invention, wherein the gas safety control system shown as a whole by numeral 25 is characterized in that an inspection meter 100, a gas appliance 200, a controller 300 and a terminal network controller 500 are provided with a reset information transmitting unit 134, a reset information transmitting unit 224, a valve reset instruction unit 352 and a reset message processing unit 552, respectively. In the gas safety control system 25, when the valve reset instruction unit 352 in the controller 300 is operated for instructing resetting or opening of the cutoff valve 102 in the inspection meter with a cutoff valve 102 placed in a closed position in the inspection meter, the reset instruction is applied to the reset message processing unit 552 through a controller communication unit 302, the reset information transmitting unit 224, an appliance communication unit 204 and a terminal communication unit 552. Then, the reset message processing unit 552 prepares a reset message for the cutoff valve 102, and applies it to a valve control unit 116 through the terminal communication unit 506, a meter communication unit 120 and the reset information transmitting unit 134. Accordingly, the valve control unit 116 resets the cutoff valve 102 in response to the reset message for restoring supply of the gas to the gas appliance 200. The controller 300 may be arranged such that closure and resetting of the cutoff valve 102 can be instructed by using a single switch.

The valve reset instruction information from the appliance communication unit 204 may be transmitted to the meter communication unit 120 only through the intermediary of the terminal communication unit 506 and without the intermediary of the reset message processing unit 552. Further, the valve reset instruction unit 352 may be a transmitter of a reset message for resetting the valve, without provision of any operating element.

(26) Embodiment 26

Figure 36:
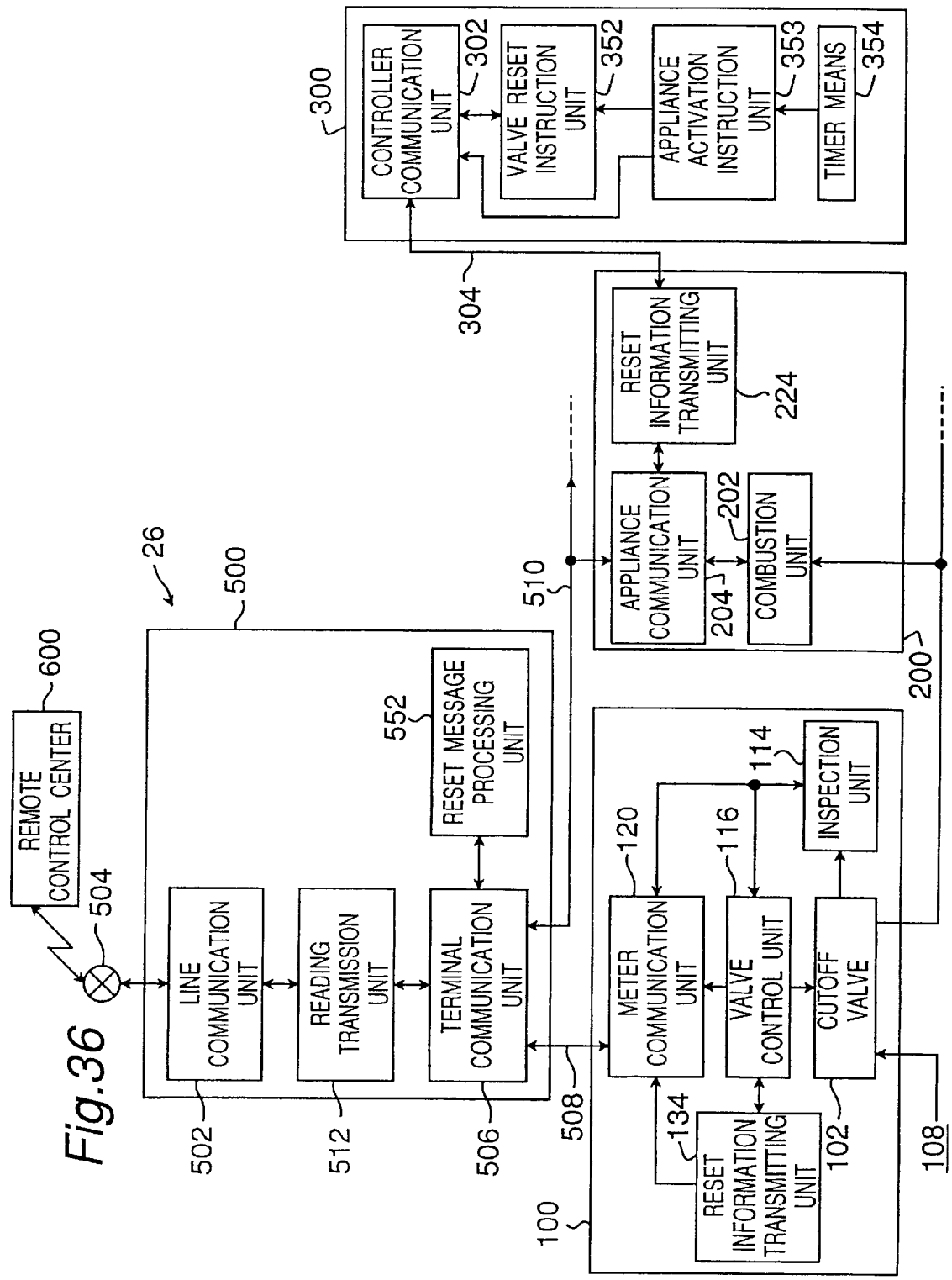
FIG. 36 is a block diagram of a gas safety control system according to a twenty-sixth embodiment of the invention.
Figure 37:
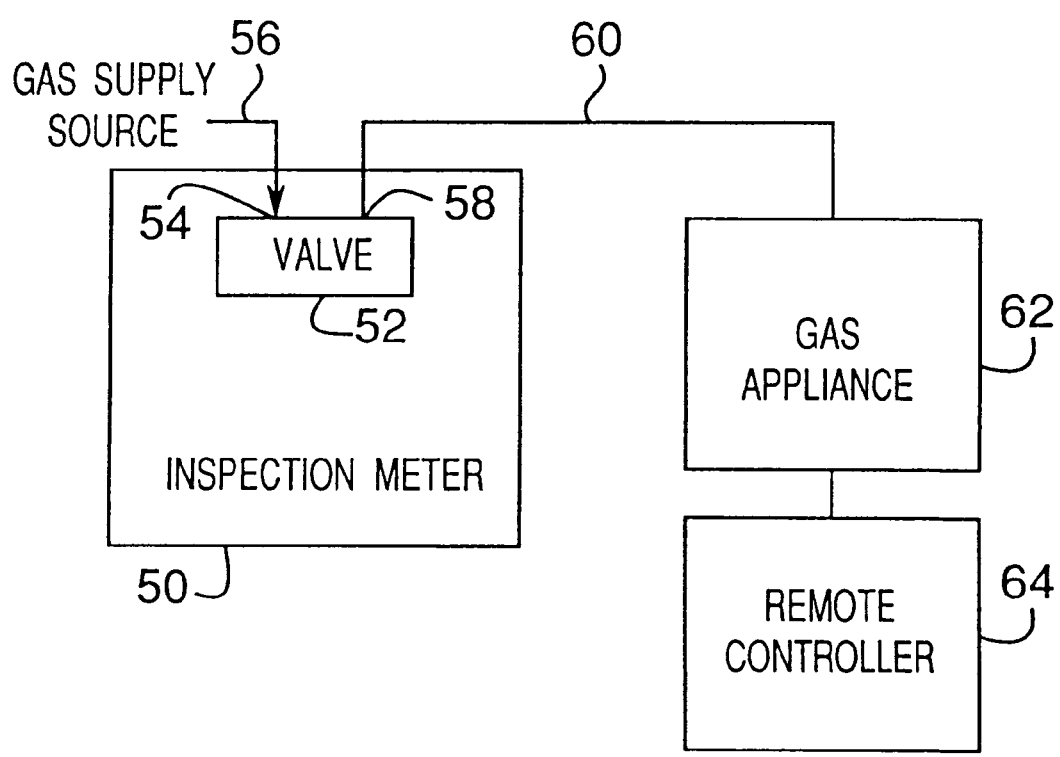
FIG. 37 is a block diagram of a conventional gas safety control system.
Figure 38:
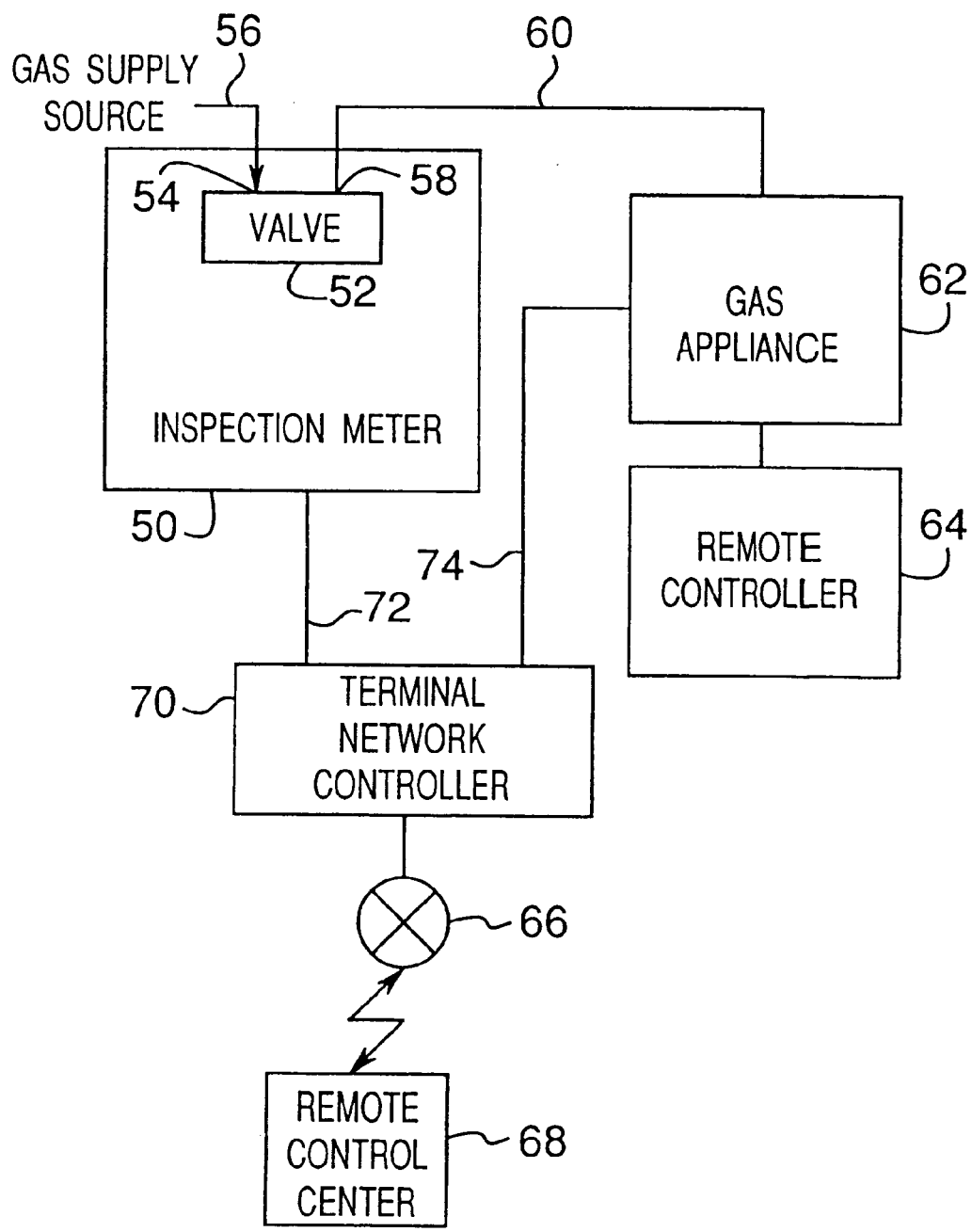
FIG. 38 is a block diagram of the other conventional gas safety control system.

FIG. 36 is a block diagram of a gas safety control system according to Embodiment 26 of the invention, wherein the gas safety control system indicated as a whole by numeral 26 is characterized in that an inspection meter 100, a gas appliance 200, a controller 300 and a terminal network controller 500 are provided with a reset information transmitting unit 134, a reset information transmitting unit 224, a valve reset instruction unit 352, an appliance activation instruction unit 353, timer means 354 and a reset message processing unit 552. In the gas safety control system 26, when the appliance activation instruction unit 353 in the controller 300 is operated for activating the gas appliance 200 with a cutoff valve 102 placed in a closed position in the inspection meter 100, the activation instruction is transmitted through a controller communication unit 302 for allowing the gas appliance 200 to be activated, and also given to the valve reset instruction unit 352, if resetting of the valve is required, and a reset instruction from the valve reset instruction unit 352 is applied to the reset message processing unit 552 through the controller communication unit 302, reset information transmitting unit 224, appliance communication unit 204 and terminal communication unit 506. Then, the reset message processing unit 552 prepares a reset message for the cutoff valve 102, and applies it to a valve control unit 116 through the terminal communication unit 506, meter communication unit 120 and reset information transmitting unit 134. Accordingly, the valve control unit 116 allows the cutoff valve 102 to be resetted in response to the reset message for restoring supply of the gas to the gas appliance. Thus, even though the cutoff valve is closed, as it is resetted as soon as the gas appliance 200 is activated, normal operation of the gas appliance can be assured. This also applies to when operation of the gas appliance is controlled by the timer means 354.

Similarly, the cutoff valve 102 may be closed simultaneously as the gas appliance is disabled. In such case, the valve is preferably closed when all gas appliances in the system are inoperative. Further, the valve reset instruction unit 352, appliance activation instruction unit 353 and timer means 354 may be provided in the gas appliance 200.

We claim:

1. A gas safety control system for supplying a gas that is forwarded from a gas supply source through an inspection meter to one or more gas appliances characterized in that:
   the inspection meter is provided with valve means for cutting off the supply of gas from the gas supply source, detection means for detecting an abnormality, valve control means for actuating the valve means when the detection means detects an abnormality and meter communication means, and
   the gas appliance is provided with appliance communication means and disabling means for switching the gas appliance to an inoperative state, if it is in an operative state, when cutoff information is received from the meter communication means through the appliance communication means.

2. A gas safety control system for supplying a gas that is forwarded from a gas supply source through an inspection meter to one or more gas appliances characterized in that:
   the inspection meter is provided with valve means for cutting off the supply of gas from the gas supply source, detection means for detecting an abnormality, valve control means for actuating the valve means when the detection means detects an abnormality and meter communication means,
   the gas appliance is provided with appliance communication means and disabling means for switching the gas appliance to an inoperative state, if it is in an operative state, when cutoff information is received from the meter communication means through the appliance communication means, and
   the gas safety control system further comprises a controller, which comprises controller communication means for communication with the meter communication means or appliance communication means and display means for displaying information that is applied to the controller communication means.

3. A gas safety control system for supplying a gas that is forwarded from a gas supply source through an inspection meter to one or more gas appliances according to claim 1 characterized in that:
   the inspection meter is provided with inspection means for inspecting an amount of gas that passes through the valve means, and the gas safety control system comprises a terminal network controller for communicating through a communication medium, said terminal network controller providing connection between the meter communication means and the appliance communication means for allowing communication between them.

4. A gas safety control system for supplying a gas that is forwarded from a gas supply source through an inspection meter to one or more gas appliances according to claim 1 characterized in that:
   the inspection meter is provided with inspection means for inspecting an amount of gas that passes through the inspection meter, and the safety control system comprises a terminal network controller for communicating through a communication medium, said terminal network controller providing connection between the communication medium and the inspection meter for allowing communication between them.

5. A gas safety control system for supplying a gas that is forwarded from a gas supply source through an inspection meter to one or more gas appliances according to claim 2 characterized in that:
   inspection means is provided for inspecting an amount of gas that passes through the valve means,
   the gas safety control system comprises a terminal network controller for communicating through a communication medium, said terminal network controller providing connection between the meter communication medium and appliance communication medium for allowing communication between them, and
   the controller communication medium is capable of communicating with the meter communication medium, appliance communication medium or terminal network controller.

6. A gas safety control system for supplying a gas that is forwarded from a gas supply source through an inspection meter to one or more gas appliances according to claim 2 characterized in that:
   the inspection meter is provided with inspection means for inspecting an amount of gas that passes through the valve means,
   the safety control system comprises a terminal network controller for communicating through a communication medium, said terminal network controller providing connection between the communication medium and gas meter, and
   the controller communication means is capable of communicating with the meter communication means, appliance communication means or terminal network controller.

7. A gas safety control system according to claim 1, wherein the gas appliance is provided with means for detecting presence of an abnormality in the gas appliance, and the valve control means in the inspection meter is adapted to be activated in response to the detection of abnormality.

8. A gas safety control system according to claim 3, wherein the gas appliance is provided with means for detecting presence of an abnormality in the gas appliance, the valve control means in the inspection meter is activated in response to the detection of abnormality, and information on the abnormality detected is transmitted from the terminal network controller through the communication medium.

9. A gas safety control system according to claim 2, wherein the gas appliance is switched to a combustion disabled state in response to a valve closure signal to the inspection meter.

10. A gas safety control system according to claim 9 comprising delay means for closing the valve means in the inspection meter a predetermined time after the gas appliance is switched to a combustion disabled state.

11. A gas safety control system according to claim 2 comprising appliance valve position detecting means for determining whether a valve in the gas appliance is open or not and command means for outputting an open command to open the valve means in the inspection meter when it is in a closed position, wherein the valve means is opened by the valve control means in response to the open command from the command means when it is determined from an output of the appliance valve position detecting means that a valve in the gas appliance is closed.

12. A gas safety control system according to claim 2 comprising reading display means for displaying a reading of the inspection means that is separated from a gas inspection meter appliance.

13. A gas safety control system according to any of claims 2, 5 and 6 comprising reading display means for displaying a reading of the inspection means that is separated from a gas inspection meter appliance and reading display instruction means for instructing the reading display means to display the reading, wherein the reading is displayed by the reading display means in response to an instruction from the reading display instruction means.

14. A gas safety control system according to claim 12 comprising calculation means for calculating an amount of gas consumed by the system after a certain point of time, display means for displaying the amount calculated and instruction means for instructing the display means to display the amount calculated.

15. A gas safety control system according to claim 1 comprising valve reset means for resetting the valve means that is in a closed position by means of an activation instruction for the gas appliance.

16. A gas safety control system according to claim 2, wherein the gas appliance is provided with means for detecting presence of an abnormality in the gas appliance, and the valve control means in the inspection meter is adapted to be activated in response to the detection of abnormality.

17. A gas safety control system according to claim 3, wherein the gas appliance is provided with means for detecting presence of an abnormality in the gas appliance, and the valve control means in the inspection meter is adapted to be activated in response to the detection of abnormality.

18. A gas safety control system according to claim 4, wherein the gas appliance is provided with means for detecting presence of an abnormality in the gas appliance, and the valve control means in the inspection meter is adapted to be activated in response to the detection of abnormality.

19. A gas safety control system according to claim 5, wherein the gas appliance is provided with means for detecting presence of an abnormality in the gas appliance, and the valve control means in the inspection meter is adapted to be activated in response to the detection of abnormality.

20. A gas safety control system according to claim 6, wherein the gas appliance is provided with means for detecting presence of an abnormality in the gas appliance, and the valve control means in the inspection meter is adapted to be activated in response to the detection of abnormality.

21. A gas safety control system according to claim 4, wherein the gas appliance is provided with means for detecting presence of an abnormality in the gas appliance, the valve control means in the inspection meter is activated in response to the detection of abnormality, and information on the abnormality detected is transmitted from the terminal network controller through the communication medium.

22. A gas safety control system according to claim 5, wherein the gas appliance is provided with means for detecting presence of an abnormality in the gas appliance, the valve control means in the inspection meter is activated in response to the detection of abnormality, and information on the abnormality detected is transmitted from the terminal network controller through the communication medium.

23. A gas safety control system according to claim 6, wherein the gas appliance is provided with means for detecting presence of an abnormality in the gas appliance, the valve control means in the inspection meter is activated in response to the detection of abnormality, and information on the abnormality detected is transmitted from the terminal network controller through the communication medium.

24. A gas safety control system according to claim 3, wherein the gas appliance is switched to a combustion disabled state in response to a valve closure signal to the inspection meter.

25. A gas safety control system according to claim 4, wherein the gas appliance is switched to a combustion disabled state in response to a valve closure signal to the inspection meter.

26. A gas safety control system according to claim 5, wherein the gas appliance is switched to a combustion disabled state in response to a valve closure signal to the inspection meter.

27. A gas safety control system according to claim 6, wherein the gas appliance is switched to a combustion disabled state in response to a valve closure signal to the inspection meter.

28. A gas safety control system according to claim 3, comprising appliance valve position detecting means for determining whether a valve in the gas appliance is open or not and command means for outputting an open command to open the valve means in the inspection meter when it is in a closed position, wherein the valve means is opened by the valve control means in response to the open command from the command means when it is determined from an output of the appliance valve position detecting means that a valve in the gas appliance is closed.

29. A gas safety control system according to claim 4, comprising appliance valve position detecting means for determining whether a valve in the gas appliance is open or not and command means for outputting an open command to open the valve means in the inspection meter when it is in a closed position, wherein the valve means is opened by the valve control means in response to the open command from the command means when it is determined from an output of the appliance valve position detecting means that a valve in the gas appliance is closed.

30. A gas safety control system according to claim 5, comprising appliance valve position detecting means for determining whether a valve in the gas appliance is open or not and command means for outputting an open command to open the valve means in the inspection meter when it is in a closed position, wherein the valve means is opened by the valve control means in response to the open command from the command means when it is determined from an output of the appliance valve position detecting means that a valve in the gas appliance is closed.

31. A gas safety control system according to claim 6, comprising appliance valve position detecting means for determining whether a valve in the gas appliance is open or not and command means for outputting an open command to open the valve means in the inspection meter when it is in a closed position, wherein the valve means is opened by the valve control means in response to the open command from the command means when it is determined from an output of the appliance valve position detecting means that a valve in the gas appliance is closed.

32. A gas safety control system according to claim 5 comprising reading display means for displaying a reading of the inspection means that is separated from a gas inspection meter appliance.

33. A gas safety control system according to claim 6 comprising reading display means for displaying a reading of the inspection means that is separated from a gas inspection meter appliance.

34. A gas safety control system according to claim 5 comprising reading display means for displaying a reading of the inspection means that is separated from a gas inspection meter appliance and reading display instruction means for instructing the reading display means to display the reading, wherein the reading is displayed by the reading display means in response to an instruction from the reading display instruction means.

35. A gas safety control system according to claim 6 comprising reading display means for displaying a reading of the inspection means that is separated from a gas inspection meter appliance and reading display instruction means for instructing the reading display means to display the reading, wherein the reading is displayed by the reading display means in response to an instruction from the reading display instruction means.

36. A gas safety control system according to claim 2 comprising valve reset means for resetting the valve means that is in a closed position by means of an activation instruction for the gas appliance.

37. A gas safety control system according to claim 3 comprising valve reset means for resetting the valve means that is in a closed position by means of an activation instruction for the gas appliance.

38. A gas safety control system according to claim 4 comprising valve reset means for resetting the valve means that is in a closed position by means of an activation instruction for the gas appliance.

39. A gas safety control system according to claim 5 comprising valve reset means for resetting the valve means that is in a closed position by means of an activation instruction for the gas appliance.

* * * * *